United States Patent
Shveidel et al.

(10) Patent No.: US 12,204,412 B2
(45) Date of Patent: Jan. 21, 2025

(54) REPLICATION TECHNIQUES USING A METADATA LOG

(71) Applicant: Dell Products L.P., Hopkinton, MA (US)

(72) Inventors: Vladimir Shveidel, Pardes-Hana (IL); Vamsi K. Vankamamidi, Hopkinton, MA (US)

(73) Assignee: Dell Products L.P., Hopkinton, MA (US)

( * ) Notice: Subject to any disclaimer, the term of this patent is extended or adjusted under 35 U.S.C. 154(b) by 23 days.

(21) Appl. No.: 18/095,159

(22) Filed: Jan. 10, 2023

(65) Prior Publication Data
US 2024/0232020 A1     Jul. 11, 2024

(51) Int. Cl.
*G06F 11/00*     (2006.01)
*G06F 11/14*     (2006.01)
*G06F 16/182*     (2019.01)

(52) U.S. Cl.
CPC ...... *G06F 11/1435* (2013.01); *G06F 11/1417* (2013.01); *G06F 11/1471* (2013.01); *G06F 16/1844* (2019.01)

(58) Field of Classification Search
CPC ............. G06F 11/1435; G06F 11/1471; G06F 11/1446; G06F 11/1448; G06F 11/1451; G06F 11/1456; G06F 11/1458; G06F 11/1658; G06F 11/2094; G06F 11/2097; G06F 16/1844
See application file for complete search history.

(56) References Cited

U.S. PATENT DOCUMENTS

| | | | |
|---|---|---|---|
| 11,875,060 B2 * | 1/2024 | Shveidel | G06F 3/067 |
| 2023/0333777 A1 * | 10/2023 | Shveidel | G06F 3/0619 |

OTHER PUBLICATIONS

U.S. Appl. No. 17/722,649, filed Apr. 18, 2022, entitled Replication Techniques Using a Replication Log, to Vladimir Shveidel, et al.
U.S. Appl. No. 17/856,436, filed Jul. 1, 2022, entitled Techniques for Efficient User Log Flushing With Shortcut Logical Address Binding and Postponing Mapping Information Updates, to Vladimir Shveidel, et al.

* cited by examiner

*Primary Examiner* — Philip Guyton
(74) *Attorney, Agent, or Firm* — Muirhead and Saturnelli, LLC

(57) ABSTRACT

Data replication techniques can include receiving, at a source system, a write directed to a source logical device configured for asynchronous remote replication to a destination system; performing processing that flushes a transaction log entry for the write; and performing replication processing that uses a replication queue including a replication queue entry corresponding to the write that stores the first content to a logical address. The processing can create a metadata (MD) log entry in a MD log for the write responsive to determining that the write is directed to the source logical device configured for asynchronous remote replication and that the first content has not been replicated. Responsive to the first content not being in cache, the first content can be retrieved using the reference to a storage location storing the first content. The reference can be obtained from the MID log entry or the replication queue entry.

19 Claims, 23 Drawing Sheets

REPLICATION TECHNIQUES USING A METADATA LOG

BACKGROUND

Systems include different resources used by one or more host processors. The resources and the host processors in the system are interconnected by one or more communication connections, such as network connections. These resources include data storage devices such as those included in data storage systems. The data storage systems are typically coupled to one or more host processors and provide storage services to each host processor. Multiple data storage systems from one or more different vendors can be connected to provide common data storage for the one or more host processors.

A host performs a variety of data processing tasks and operations using the data storage system. For example, a host issues I/O (input/output) operations, such as data read and write operations, that are subsequently received at a data storage system. The host systems store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device is provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host are directed to a particular storage entity, such as a file or logical device. The logical devices generally include physical storage provisioned from portions of one or more physical drives. Allowing multiple host systems to access the single data storage system allows the host systems to share data stored therein.

SUMMARY

Various embodiments of the techniques of the present disclosure can include a computer-implemented method, a system and a non-transitory computer readable medium. The system can include one or more processors and a memory including code stored therein that, when executed, performs the method. The non-transitory computer readable medium can include code stored thereon that, when, executed, performs the method. The method can comprise: receiving, at a source system, a first write directed to a source logical device configured for asynchronous remote replication to a target logical device of a destination system; performing first processing on the source system that flushes a first transaction log entry of a transaction log of the source system, said first processing including: determining for the first transaction log entry, which represents the first write storing first content to a target logical address, that the first write is directed to the source logical device configured for asynchronous remote replication and that the first content has not been replicated from the source system to the destination system; and creating a first metadata (MD) log entry for the first write and the first content in a MD log of the source system, wherein the first MD log entry includes a reference to a first storage location of the first content, wherein the MD log includes entries corresponding to other entries of the transaction log which have been flushed from the transaction log and which represent content and checkpoint commands that have not been replicated from the source system to the destination system; and performing replication processing that uses a replication queue including a first replication queue entry corresponding to the first write that stores the first content to the target logical address, the replication processing including: determining, for the first replication queue entry, that the first content written to the target logical address is not in a cache of the source system thereby resulting in a cache miss; responsive to the cache miss, retrieving the first content from the first storage location using the reference to the first storage location, wherein the reference to the first storage location is obtained from the first MD log entry or the first replication queue entry corresponding to the first write; and replicating the first content stored at the target logical address by the first written operation from the source system to the destination system.

In at least one embodiment, the transaction log can include a second transaction log entry for a first checkpoint command. Processing can include: issuing, by a replication service of the source system, a request to create a snapshot for the source logical device configured for asynchronous remote replication; and responsive to said issuing, creating the second transaction log entry in the transaction log and creating a second replication queue entry in the replication queue for include: performing second processing on the source system that flushes the second transaction log entry, said second processing including: determining the first checkpoint command of the second transaction log entry has not been replicated from the source system to the destination system; and creating a second MD log entry for the first checkpoint command in the MD log. Processing can include replicating, in accordance with the second replication queue entry, the first checkpoint command from the source system to the target system.

In at least one embodiment, replication processing can include: replicating a first checkpoint command and a second checkpoint command from the source system to the destination system; replicating a plurality of writes from the source system to the destination system, wherein each of the plurality of writes is included between the first checkpoint command and the second checkpoint command, and wherein the second plurality of writes are directed to the source logical device; and creating, on the destination system in accordance with the first checkpoint command and the second checkpoint command, a first snapshot of the target logical device on the destination system, wherein the first snapshot includes the plurality of writes.

In at least one embodiment, the replication queue can be stored in volatile memory of the source system, the MD log can include a first MD log persistently stored on the source system, and the transaction log can be persistently stored on the source system. Processing can include performing restoration processing that restores the replication queue using the MD log and the transaction log. Restoration processing that restores the replication queue can include: identifying a plurality of unreplicated transaction log entries, wherein the plurality of unreplicated transaction log entries includes at least one entry of the transaction log for a write operation that writes content which has not been replicated from the source system to the target system, and wherein the plurality of unreplicated transaction log entries includes at least one entry of the transaction log for a checkpoint operation or command corresponding to a snapshot creation command in accordance with a replication schedule; and constructing the replication queue which includes the plurality of unreplicated transaction log entries and one or more entries from the MD log, wherein the one or more entries of the MD log each denote a flushed entry of the transaction log which has also not been replicated from the source system to the target system. Restoration processing can include sorting, based on a time order, the plurality of the unreplicated transaction log entries and the one or more entries of the MD log. The time order can indicate a relative logical ordering in which to process entries of the replication queue. The restoration processing can be performed responsive to rebooting the source system. The restoration processing can be included in recovery processing performed on the source system responsive to an event causing the source system to become unavailable or go offline.

In at least one embodiment, processing can include: receiving a plurality of writes at the source system, wherein each of the plurality of writes is directed to a logical device of the source system configured for asynchronous remote replication; creating a plurality of replication queue entries in the replication queue of the source system for the plurality of write operations; and creating a plurality of transaction log entries in the transaction log of the source system for the plurality of write operations.

In at least one embodiment, the first MD log entry can include a first type indicating that the first MD log entry identifies a mapping between a logical address and a storage location including content stored at the logical address. The MD log can include a second MD log entry for a first checkpoint command which has been flushed from the transaction log and which has not been replicated from the source system to the destination system, and the second MD log entry can include a second type indicating that the second MD log entry represents a checkpoint command.

BRIEF DESCRIPTION OF THE DRAWINGS

Features and advantages of the present disclosure will become more apparent from the following detailed description of exemplary embodiments thereof taken in conjunction with the accompanying drawings in which.

DETAILED DESCRIPTION OF EMBODIMENT(S)

Figure 1:
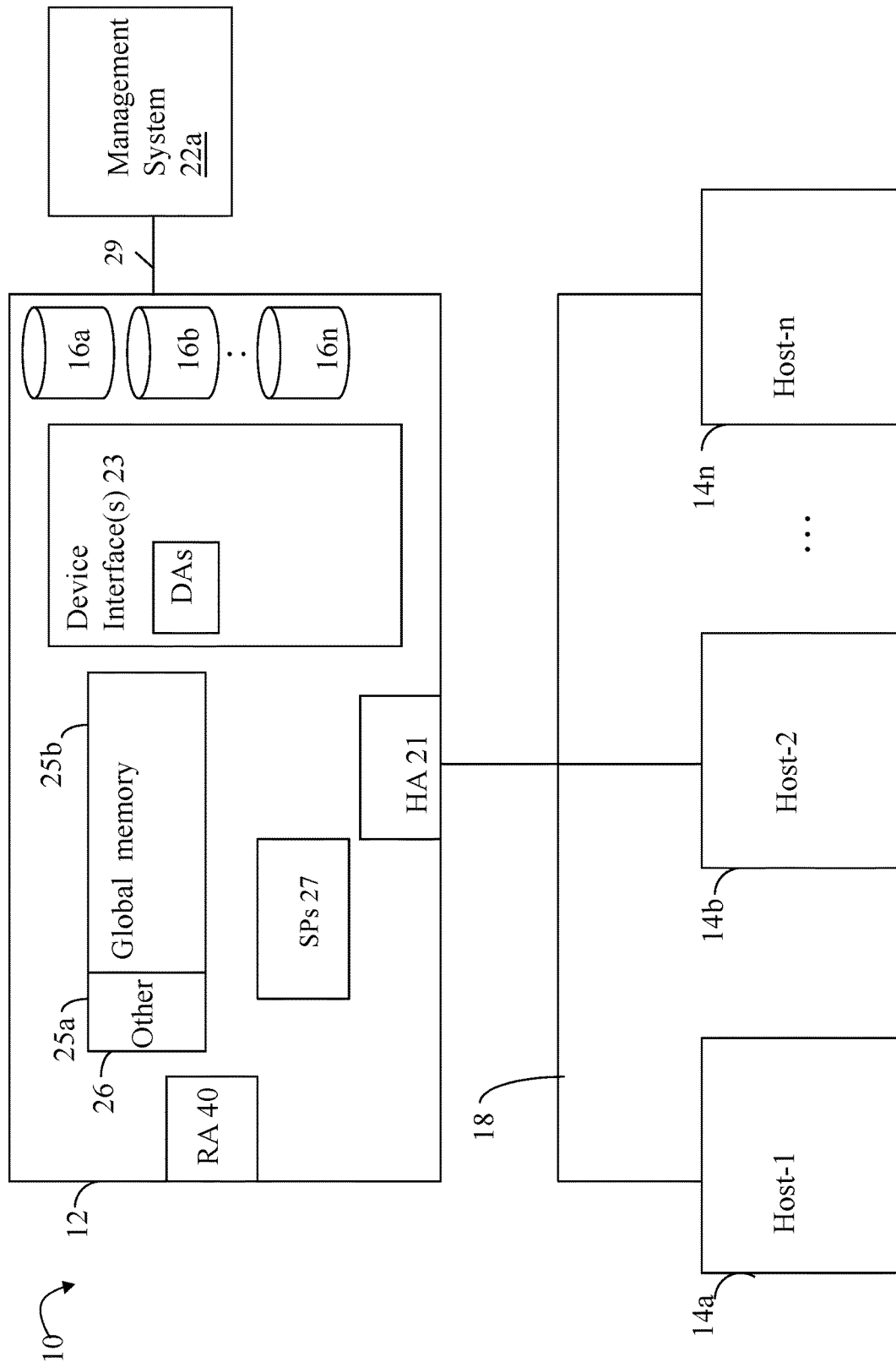
FIG. 1 is an example of components included in a system in accordance with the techniques of the present disclosure.

Data storage systems can perform different data services such as remote data replication (also referred to as remote replication). Generally remote replication provides for replicating data from a source system to a remote target system. For example, data on the source system can be a primary copy of a storage object which is remotely replicated to a counterpart remote storage object on the remote system. The remote storage object can be used, for example, in the event that the primary copy or source data storage system experiences a disaster where the primary copy is unavailable. Generally, remote replication can be used for any suitable purpose to increase overall system reliability and data availability. Remote data replication can be performed in a continuous ongoing manner where data changes or writes made to a source object on the source system over time can be replicated to the remote target system.

In at least one existing data storage system, the remote replication can be performed by a remote replication service or facility executing on the source system where the remote replication facility can use a technique referred to as a snapshot difference or snap diff technique. The snap diff technique provides for taking two successive snapshots of the logical device or other storage object on the source system that is replicated on the target system, and then determining the data difference with respect to the two successive snapshots. The data difference denotes the data blocks that have been written or modified in the time interval from a first point in time to a second later point in time, where a first snapshot is taken at the first point in time and a second successive snapshot is taken at the second point in time. The time interval may correspond, for example, to a recovery point objective (RPO) defined as the maximum amount of allowable data loss, as measured by time, that can be lost after a recovery from a disaster, failure, or comparable event before data loss will exceed what is acceptable to an organization. The snap diff technique can provide for taking a snapshot at each RPO interval. For example, for an RPO of 5 hours, a snapshot of the logical device can be taken on the source system every 5 hours and compared to the immediately prior snapshot to determine the data differences including data blocks that have been modified since the immediately prior snapshot. The data differences including the modified or newly written data blocks of the logical device are then transferred from the source system to the target system and applied to the remote copy of the logical device on the target or remote system.

The snap diff technique can be characterized as an expensive operation generally having a significant processing overhead. For example, in one embodiment of remote replication using the snap diff technique, creating a snapshot can include enforcing barriers used to denote points in time between writes where the writes between two such barriers can denote the writes included in a particular snapshot instance. In such an embodiment in which writes from a log are flushed to backend (BE) non-volatile storage, the recorded writes in the log between two barriers can denote the recorded writes of the log for a single snapshot. In some systems, flushing of recorded writes of the log can occur in parallel by multiple flushing threads. Additional dependencies and overhead can be incurred when enforcing such barriers and when synchronizing access to the records between the multiple flushing threads. In at least one system, snapshot creation can also require allocating new metadata pages used with the snapshot. Furthermore, once a particular snapshot used with replication is no longer needed, additional processing overhead can be incurred in connection with other operations such as deleting the snapshot.

High processing costs can also be incurred in connection with accessing data on the source system that is to be replicated to the target system, for example, in the event of a cache miss with respect to the write data or modified data content to be replicated. Replication processing on the source system can replicate write data stored in the cache. If the write data is not stored in the cache at the time needed for the replication processing, a cache miss occurs and the write data (denoting a modified data portion or block) is then accessed from the BE non-volatile storage. For example, in at least one system, the write data can remain in the cache until it is flushed from the log to the BE non-volatile storage. On the source system, snapshots can be created in connection with the snap diff technique with respect to a storage object, such as a logical device, while also flushing the write data stored in the cache for the same logical device. In some instances, the write data can be flushed from the cache and log before the write data has been replicated to the remote target system. In this case, when the time arrives to replicate the write data from the source system to the remote system, replication processing on the source system experiences a cache miss with respect to the write data and must then read the write data from the BE non-volatile storage. Reading the write data from the BE non-volatile storage can be an expensive processing operation as compared to reading the write data from the cache. For example in at least one existing system, accessing the write data on the BE non-volatile storage can require reading multiple layers of mapping information to identify the particular storage location of the write data on the BE non-volatile storage. Additionally, cache misses can result when attempting to read the foregoing mapping information since the mapping information is also required to be in cache in order to be read and used to identify the storage location of the write data on the BE non-volatile storage.

Some existing solutions can include a general approach of maintaining and using an additional dedicated persistent replication log to persistently store entries of the user data (UD) log of user data or operations. The dedicated replication log can be in addition to the UD log. The dedicated replication log can be used solely to persistently store entries of the user data log which have not yet been replicated from the source system to the target system. In one implementation, rather than store the actual user data or content of logical addresses, the replication log can store a pointer or address used to access the content stored at a logical address. In implementations using such a replication log and where processing determines the requested user data is not stored in cache and results in a cache miss, the replication log can be used as a shortcut to obtain the requested user data as opposed to more expensive alternatives such as using the mapping information which can include a chain of metadata pages. However, implementation of solutions including such a dedicated persistent replication log can have associated complexity and overhead with maintaining and using such a separate log.

To overcome the foregoing drawbacks, described in the following paragraphs are techniques used to provide efficient data replication without using a separate additional persistent replication log on the source system.

In at least one existing data storage system such as with a dual node configuration, each storage node can maintain a single local instance of an in-memory metadata (MD) log where both nodes can share a single instance of a persistent MD log. In the event of disaster, data loss and/or data corruption, a storage node can replay the persistent MDL to apply delta update tuples stored in the persistent MDL to the node's local in-memory MD log to thereby restore or recover the node's in-memory MD log to a valid and consistent state.

In at least one embodiment, the techniques of the present disclosure can use the existing MD log and infrastructure to track logged entries (e.g., write I/Os and associated data) which have been flushed from the UD log but not yet replicated from the source system to the target system. In at least one embodiment, the techniques of the present disclosure can use a MD log as described herein which includes both a persistent MD log as well as a per node in-memory or volatile MD log.

In at least one embodiment, a new MD log tuple or delta type can be utilized and stored in the persistent and in-memory MD logs for logged or recorded write I/O data or content of the UD log which has been flushed from the UD log of the source system, but which has not yet been replicated from the source system to the target system. The new delta type can provide a direct mapping from a UD logical address to a physical storage location of content stored at the UD logical address. The UD logical address can be expressed as a LUN or volume and offset or LBA within the logical address space of the LUN or volume. The physical storage location can be a physical large block (PLB) denoting physical storage on a BE non-volatile physical storage device (PD) where the content is stored. The new MD delta type can be denoted herein as a logical address (LA) to PLB type that contains the direct mapping to the PLB or physical storage location storing content of a particular UD logical address. In this manner, the information of a MD delta or tuple of the new MD delta type, LA to PLB type, can be used as a short cut to access content stored at a particular UD logical address without requiring traversal of a chain of MD pages of mapping information when replicating. Thus, the LA to PLB type of MD log tuple or delta can be used with the MD log to denote write or modified data which has been flushed but which still needs to be replicated from the source system to the target system. The LA to PLB MD log tuples or deltas can facilitate accessing the write or modified data in an efficient manner without using the chain of MD pages of mapping information. In at least one embodiment, the new MD log tuple or delta type of LA to PLB can be aggregated together with other MD updates in the same flush transaction. In at least one embodiment, the average lifetime of a metadata log entry can be greater than the average lifetime of an entry in the UD log.

In at least one embodiment, rather than introduce the new MD log tuple or delta type of LA to PLB, the embodiment may include an existing MD log tuple or delta type which can be further extended or expanded in terms of usage to store the same information as described herein by the LA to PLB type tuple.

In at least one embodiment, the techniques of the present disclosure can be used for efficient asynchronous replication of data with a high RPO and minimal performance impact. In at least one embodiment, the techniques of the present disclosure can be performed without using the expensive snap diff on the source system and with the source system omitting expensive processing to actually construct a snapshot including its associated metadata structures. In at least one embodiment, the techniques of the present disclosure can be performed without using the expensive snap diff technique and without actually creating a snapshot with all its required metadata on the source system. In at least one embodiment, semantics associated with the snapshot, such as checkpoint or barrier records of the UD log or transaction log, MD log and replication queue, can be used to specify snapshot semantics such as, for example, for transactional write consistency across one or more LUNs, without actually constructing the metadata and other structures implementing the snapshot on the source system. In at least one embodiment, an additional new MD log delta or tuple type, the checkpoint delta, can be used to denote a barrier, checkpoint or snapshot record or command which has been flushed from the UD log but not yet replicated to from the source to the target system.

The foregoing and other aspects of the techniques of the present disclosure are described in more detail in the following paragraphs.

Referring to the FIG. 1, shown is an example of an embodiment of a system 10 that can be used in connection with performing the techniques described herein. The system 10 includes a data storage system 12 connected to the host systems (also sometimes referred to as hosts) 14a-14n through the communication medium 18. In this embodiment of the system 10, the n hosts 14a-14n can access the data storage system 12, for example, in performing input/output (I/O) operations or data requests. The communication medium 18 can be any one or more of a variety of networks or other type of communication connections as known to those skilled in the art. The communication medium 18 can be a network connection, bus, and/or other type of data link, such as a hardwire or other connections known in the art. For example, the communication medium 18 can be the Internet, an intranet, network (including a Storage Area Network (SAN)) or other wireless or other hardwired connection(s) by which the host systems 14a-14n can access and communicate with the data storage system 12, and can also communicate with other components included in the system 10.

Each of the host systems 14a-14n and the data storage system 12 included in the system 10 are connected to the communication medium 18 by any one of a variety of connections in accordance with the type of communication medium 18. The processors included in the host systems 14a-14n and data storage system 12 can be any one of a variety of proprietary or commercially available single or multi-processor system, such as an Intel-based processor, or other type of commercially available processor able to support traffic in accordance with each particular embodiment and application.

It should be noted that the particular examples of the hardware and software that can be included in the data storage system 12 are described herein in more detail, and can vary with each particular embodiment. Each of the hosts 14a-14n and the data storage system 12 can all be located at the same physical site, or, alternatively, can also be located in different physical locations. The communication medium 18 used for communication between the host systems 14a-14n and the data storage system 12 of the system 10 can use a variety of different communication protocols such as block-based protocols (e.g., SCSI (Small Computer System Interface), Fibre Channel (FC), iSCSI), file system-based protocols (e.g., NFS or network file server), and the like. Some or all of the connections by which the hosts 14a-14n and the data storage system 12 are connected to the communication medium 18 can pass through other communication devices, such as switching equipment, a phone line, a repeater, a multiplexer or even a satellite.

Each of the host systems 14a-14n can perform data operations. In the embodiment of the FIG. 1, any one of the host computers 14a-14n can issue a data request to the data storage system 12 to perform a data operation. For example, an application executing on one of the host computers 14a-14n can perform a read or write operation resulting in one or more data requests to the data storage system 12.

It should be noted that although the element 12 is illustrated as a single data storage system, such as a single data storage array, the element 12 can also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment can include data storage arrays or other components from one or more vendors. In subsequent examples illustrating the techniques herein, reference can be made to a single data storage array by a vendor. However, as will be appreciated by those skilled in the art, the techniques herein are applicable for use with other data storage arrays by other vendors and with other components than as described herein for purposes of example.

The data storage system 12 can be a data storage appliance or a data storage array including a plurality of data storage devices (PDs) 16a-16n. The data storage devices 16a-16n can include one or more types of data storage devices such as, for example, one or more rotating disk drives and/or one or more solid state drives (SSDs). An SSD is a data storage device that uses solid-state memory to store persistent data. SSDs refer to solid state electronics devices as distinguished from electromechanical devices, such as hard drives, having moving parts. Flash devices or flash memory-based SSDs are one type of SSD that contain no moving mechanical parts.

The data storage array can also include different types of controllers, adapters or directors, such as an HA 21 (host adapter), RA 40 (remote adapter), and/or device interface(s) 23. Each of the adapters (sometimes also known as controllers, directors or interface components) can be implemented using hardware including a processor with a local memory with code stored thereon for execution in connection with performing different operations. The HAs can be used to manage communications and data operations between one or more host systems and the global memory (GM). In an embodiment, the HA can be a Fibre Channel Adapter (FA) or other adapter which facilitates host communication. The HA 21 can be characterized as a front end component of the data storage system which receives a request from one of the hosts 14a-n. The data storage array can include one or more RAs used, for example, to facilitate communications between data storage arrays. The data storage array can also include one or more device interfaces 23 for facilitating data transfers to/from the data storage devices 16a-16n. The data storage device interfaces 23 can include device interface modules, for example, one or more disk adapters (DAs) (e.g., disk controllers) for interfacing with the flash drives or other physical storage devices (e.g., PDS 16a-n). The DAs can also be characterized as back end components of the data storage system which interface with the physical data storage devices.

One or more internal logical communication paths can exist between the device interfaces 23, the RAs 40, the HAs 21, and the memory 26. An embodiment, for example, can use one or more internal busses and/or communication modules. For example, the global memory portion 25b can be used to facilitate data transfers and other communications between the device interfaces, the HAs and/or the RAs in a data storage array. In one embodiment, the device interfaces 23 can perform data operations using a system cache included in the global memory 25b, for example, when communicating with other device interfaces and other components of the data storage array. The other portion 25a is that portion of the memory that can be used in connection with other designations that can vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, can also be included in an embodiment.

The host systems 14a-14n provide data and access control information through channels to the storage systems 12, and the storage systems 12 also provide data to the host systems 14a-n through the channels. The host systems 14a-n do not address the drives or devices 16a-16n of the storage systems directly, but rather access to data can be provided to one or more host systems from what the host systems view as a plurality of logical devices, logical volumes (LVs) which can also referred to herein as logical units (e.g., LUNs). A logical unit (LUN) can be characterized as a disk array or data storage system reference to an amount of storage space that has been formatted and allocated for use to one or more hosts. A logical unit can have a logical unit number that is an I/O address for the logical unit. As used herein, a LUN or LUNs can refer to the different logical units of storage which can be referenced by such logical unit numbers. In some embodiments, at least some of the LUNs do not correspond to the actual or physical disk drives or more generally physical storage devices. For example, one or more LUNs can reside on a single physical disk drive, data of a single LUN can reside on multiple different physical devices, and the like. Data in a single data storage system, such as a single data storage array, can be accessed by multiple hosts allowing the hosts to share the data residing therein. The HAs can be used in connection with communications between a data storage array and a host system. The RAs can be used in facilitating communications between two data storage arrays. The DAs can include one or more type of device interface used in connection with facilitating data transfers to/from the associated disk drive(s) and LUN (s) residing thereon. For example, such device interfaces can include a device interface used in connection with facilitating data transfers to/from the associated flash devices and LUN(s) residing thereon. It should be noted that an embodiment can use the same or a different device interface for one or more different types of devices than as described herein.

In an embodiment in accordance with the techniques herein, the data storage system can be characterized as having one or more logical mapping layers in which a logical device of the data storage system is exposed to the host whereby the logical device is mapped by such mapping layers of the data storage system to one or more physical devices. Additionally, the host can also have one or more additional mapping layers so that, for example, a host side logical device or volume is mapped to one or more data storage system logical devices as presented to the host.

It should be noted that although examples of the techniques herein can be made with respect to a physical data storage system and its physical components (e.g., physical hardware for each HA, DA, HA port and the like), the techniques herein can be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a that can be used to manage and monitor the data storage system 12. In one embodiment, the management system 22a can be a computer system which includes data storage system management software or application that executes in a web browser. A data storage system manager can, for example, view information about a current data storage configuration such as LUNs, storage pools, and the like, on a user interface (UI) in a display device of the management system 22a. Alternatively, and more generally, the management software can execute on any suitable processor in any suitable system. For example, the data storage system management software can execute on a processor of the data storage system 12.

Information regarding the data storage system configuration can be stored in any suitable data container, such as a database. The data storage system configuration information stored in the database can generally describe the various physical and logical entities in the current data storage system configuration. The data storage system configuration information can describe, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, local replication configurations and details of existing local replicas (e.g., a schedule of when a snapshot is taken of one or more LUNs, identify information regarding existing snapshots for a particular LUN), remote replication configurations (e.g., for a particular LUN on the local data storage system, identify the LUN's corresponding remote counterpart LUN and the remote data storage system on which the remote LUN is located), data storage system performance information such as regarding various storage objects and other entities in the system, and the like.

It should be noted that each of the different controllers or adapters, such as each HA, DA, RA, and the like, can be implemented as a hardware component including, for example, one or more processors, one or more forms of memory, and the like. Code can be stored in one or more of the memories of the component for performing processing.

The device interface, such as a DA, performs I/O operations on a physical device or drive 16a-16n. In the following description, data residing on a LUN can be accessed by the device interface following a data request in connection with I/O operations. For example, a host can issue an I/O operation which is received by the HA 21. The I/O operation can identify a target location from which data is read from, or written to, depending on whether the I/O operation is, respectively, a read or a write operation request. The target location of the received I/O operation can be expressed in terms of a LUN and logical address or offset location (e.g., LBA or logical block address) on the LUN. Processing can be performed on the data storage system to further map the target location of the received I/O operation, expressed in terms of a LUN and logical address or offset location on the LUN, to its corresponding physical storage device (PD) and location on the PD. The DA which services the particular PD can further perform processing to either read data from, or write data to, the corresponding physical device location for the I/O operation.

It should be noted that an embodiment of a data storage system can include components having different names from that described herein but which perform functions similar to components as described herein. Additionally, components within a single data storage system, and also between data storage systems, can communicate using any suitable technique that can differ from that as described herein for exemplary purposes. For example, element 12 of the FIG. 1 can be a data storage system, such as a data storage array, that includes multiple storage processors (SPs). Each of the SPs 27 can be a CPU including one or more "cores" or processors and each having their own memory used for communication between the different front end and back end components rather than utilize a global memory accessible to all storage processors. In such embodiments, the memory 26 can represent memory of each such storage processor.

Generally, the techniques herein can be used in connection with any suitable storage system, appliance, device, and the like, in which data is stored. For example, an embodiment can implement the techniques herein using a midrange data storage system as well as a high end or enterprise data storage system.

The data path or I/O path can be characterized as the path or flow of I/O data through a system. For example, the data or I/O path can be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, can be characterized as the path or flow of data management or control commands through a system. For example, the control or management path can be the logical flow through hardware and software components or layers in connection with issuing data storage management command to and/or from a data storage system, and also receiving responses (possibly including requested data) to such control or management commands. For example, with reference to the FIG. 1, the control commands can be issued from data storage management software executing on the management system 22a to the data storage system 12. Such commands can be, for example, to establish or modify data services, provision storage, perform user account management, and the like.

The data path and control path define two sets of different logical flow paths. In at least some of the data storage system configurations, at least part of the hardware and network connections used for each of the data path and control path can differ. For example, although both control path and data path can generally use a network for communications, some of the hardware and software used can differ. For example, with reference to the FIG. 1, a data storage system can have a separate physical connection 29 from a management system 22a to the data storage system 12 being managed whereby control commands can be issued over such a physical connection 29. However in at least one embodiment, user I/O commands are never issued over such a physical connection 29 provided solely for purposes of connecting the management system to the data storage system. In any case, the data path and control path each define two separate logical flow paths.

Figure 2:
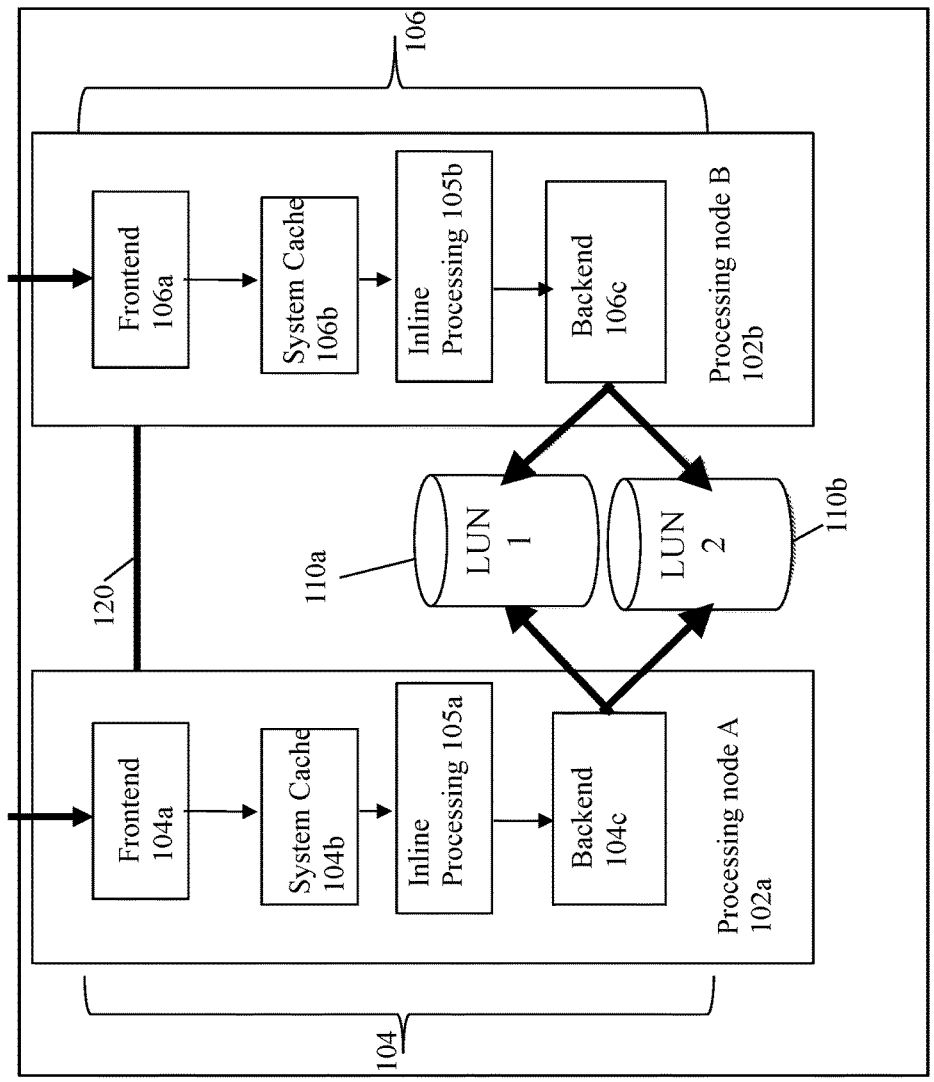
FIG. 2 is an example illustrating the I/O path or data path in connection with processing data in an embodiment in accordance with the techniques of the present disclosure.

With reference to the FIG. 2, shown is an example 100 illustrating components that can be included in the data path in at least one existing data storage system in accordance with the techniques herein. The example 100 includes two processing nodes A 102a and B 102b and the associated software stacks 104, 106 of the data path, where I/O requests can be received by either processing node 102a or 102b. In the example 100, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and BE component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing can be performed by layer 105a. Such inline processing operations of 105a can be optionally performed and can include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing can include, for example, performing one or more data reduction operations such as data deduplication or data compression. The inline processing can include performing any suitable or desirable data processing operations as part of the I/O or data path.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O can be directed to a location or logical address of a LUN and where data can be read from, or written to, the logical address. The LUNs 110a, 110b are examples of storage objects representing logical storage entities included in an existing data storage system configuration. Since, in this example, writes directed to the LUNs 110a, 110b can be received for processing by either of the nodes 102a and 102b, the example 100 illustrates what is also referred to as an active-active configuration.

In connection with a write operation received from a host and processed by the processing node A 102a, the write data can be written to the system cache 104b, marked as write pending (WP) denoting it needs to be written to the physical storage 110a, 110b and, at a later point in time, the write data can be destaged or flushed from the system cache to the physical storage 110a, 110b by the BE component 104c. The write request can be considered complete once the write data has been stored in the system cache whereby an acknowledgement regarding the completion can be returned to the host (e.g., by component the 104a). At various points in time, the WP data stored in the system cache is flushed or written out to the physical storage 110a, 110b.

In connection with the inline processing layer 105a, prior to storing the original data on the physical storage 110a, 110b, one or more data reduction operations can be performed. For example, the inline processing can include performing data compression processing, data deduplication processing, and the like, that can convert the original data (as stored in the system cache prior to inline processing) to a resulting representation or form which is then written to the physical storage 110a, 110b.

In connection with a read operation to read a block of data, a determination is made as to whether the requested read data block is stored in its original form (in system cache 104b or on physical storage 110a, 110b), or whether the requested read data block is stored in a different modified form or representation. If the requested read data block (which is stored in its original form) is in the system cache (e.g., cache hit or read cache hit), the read data block is retrieved from the system cache 104b and returned to the host. Otherwise, if the requested read data block is not in the system cache 104b (e.g., cache miss or read cache miss) but is stored on the physical storage 110a, 110b in its original form, the requested data block is read by the BE component 104c from the backend storage 110a, 110b, stored in the system cache and then returned to the host.

If the requested read data block is not stored in its original form, the original form of the read data block is recreated and stored in the system cache in its original form so that it can be returned to the host. Thus, requested read data stored on physical storage 110a, 110b can be stored in a modified form where processing is performed by 105a to restore or convert the modified form of the data to its original data form prior to returning the requested read data to the host.

Also illustrated in FIG. 2 is an internal network interconnect 120 between the nodes 102a, 102b. In at least one embodiment, the interconnect 120 can be used for internode communication between the nodes 102a, 102b.

In connection with at least one embodiment in accordance with the techniques herein, each processor or CPU can include its own private dedicated CPU cache (also sometimes referred to as processor cache) that is not shared with other processors. In at least one embodiment, the CPU cache, as in general with cache memory, can be a form of fast memory (relatively faster than main memory which can be a form of RAM). In at least one embodiment, the CPU or processor cache is on the same die or chip as the processor and typically, like cache memory in general, is far more expensive to produce than normal RAM which can used as main memory. The processor cache can be substantially faster than the system RAM such as used as main memory and contains information that the processor will be immediately and repeatedly accessing. The faster memory of the CPU cache can, for example, run at a refresh rate that's closer to the CPU's clock speed, which minimizes wasted cycles. In at least one embodiment, there can be two or more levels (e.g., L1, L2 and L3) of cache. The CPU or processor cache can include at least an L1 level cache that is the local or private CPU cache dedicated for use only by that particular processor. The two or more levels of cache in a system can also include at least one other level of cache (LLC or lower level cache) that is shared among the different CPUs. The L1 level cache serving as the dedicated CPU cache of a processor can be the closest of all cache levels (e.g., L1-L3) to the processor which stores copies of the data from frequently used main memory locations. Thus, the system cache as described herein can include the CPU cache (e.g., the L1 level cache or dedicated private CPU/processor cache) as well as other cache levels (e.g., the LLC) as described herein. Portions of the LLC can be used, for example, to initially cache write data which is then flushed to the backend physical storage such as BE PDs providing non-volatile storage. For example, in at least one embodiment, a RAM based memory can be one of the caching layers used as to cache the write data that is then flushed to the backend physical storage. When the processor performs processing, such as in connection with the inline processing 105a, 105b as noted above, data can be loaded from the main memory and/or other lower cache levels into its CPU cache.

In at least one embodiment, the data storage system can be configured to include one or more pairs of nodes, where each pair of nodes can be described and represented as the nodes 102a-b in the FIG. 2. For example, a data storage system can be configured to include at least one pair of nodes and at most a maximum number of node pairs, such as for example, a maximum of 4 node pairs. The maximum number of node pairs can vary with embodiment. In at least one embodiment, a base enclosure can include the minimum single pair of nodes and up to a specified maximum number of PDs. In some embodiments, a single base enclosure can be scaled up to have additional BE non-volatile storage using one or more expansion enclosures, where each expansion enclosure can include a number of additional PDs. Further, in some embodiments, multiple base enclosures can be grouped together in a load-balancing cluster to provide up to the maximum number of node pairs. Consistent with other discussion herein, each node can include one or more processors and memory. In at least one embodiment, each node can include two multi-core processors with each processor of the node having a core count of between 8 and 28 cores. In at least one embodiment, the PDs can all be non-volatile SSDs, such as flash-based storage devices and storage class memory (SCM) devices. It should be noted that the two nodes configured as a pair can also sometimes be referred to as peer nodes. For example, the node A 102a is the peer node of the node B 102b, and the node B 102b is the peer node of the node A 102a.

In at least one embodiment, the data storage system can be configured to provide both block and file storage services with a system software stack that includes an operating system running directly on the processors of the nodes of the system.

In at least one embodiment, the data storage system can be configured to provide block-only storage services (e.g., no file storage services). A hypervisor can be installed on each of the nodes to provide a virtualized environment of virtual machines (VMs). The system software stack can execute in the virtualized environment deployed on the hypervisor. The system software stack (sometimes referred to as the software stack or stack) can include an operating system running in the context of a VM of the virtualized environment. Additional software components can be included in the system software stack and can also execute in the context of a VM of the virtualized environment.

In at least one embodiment, each pair of nodes can be configured in an active-active configuration as described elsewhere herein, such as in connection with FIG. 2, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes is not be shared with other pairs of nodes. A host can access data stored on a BE PD through the node pair associated with or attached to the PD.

In at least one embodiment, each pair of nodes provides a dual node architecture where both nodes of the pair can be identical in terms of hardware and software for redundancy and high availability. Consistent with other discussion herein, each node of a pair can perform processing of the different components (e.g., FA, DA, and the like) in the data path or I/O path as well as the control or management path. Thus, in such an embodiment, different components, such as the FA, DA and the like of FIG. 1, can denote logical or functional components implemented by code executing on the one or more processors of each node. Each node of the pair can include its own resources such as its own local (i.e., used only by the node) resources such as local processor(s), local memory, and the like.

Consistent with other discussion herein, a log or journal can be used for recording writes and possibly other information. In one system, the log can be implemented using one or more logging devices that can be shared by both nodes of the dual node architecture. In at least one embodiment, the logging devices can be external with respect to the two nodes and the logging devices can be non-volatile PDs accessible to both nodes. Besides the one or more logging devices, the embodiment can include additional BE PDs that provide the BE non-volatile storage for the nodes where the recorded operations stored in the log (e.g., on the log devices) are eventually flushed to the BE PDs as discussed elsewhere herein.

In at least one embodiment, in addition to such a persistently stored log or journal, one or more of the nodes can also include node-local in-memory copies of information of the log. In at least one embodiment, the node-local in-memory copies of information of the log stored on each node can be stored in volatile memory, such as a RAM, that is local to the node and accessed only within the node. For example, a process or thread of code executing on a core or processor of the node can access for reading and/or writing the RAM or other volatile memory that is local to the node.

In a data storage system, minimizing the latency of I/O requests is a critical performance metric. In at least one data storage system using the dual node architecture such as described in connection with FIG. 2, for write operations, latency is determined by the amount of time taken to store the write data in the log where the write data is visible to both nodes or controllers of the system.

Consistent with other discussion herein, the log or journal can be used to optimize write operation latency. Generally, the write operation writing data is received by the data storage system from a host or other client. The data storage system then performs processing to persistently record the write operation in the log or journal. Once the write operation is persistently recorded in the log, the data storage system can send an acknowledgement to the client regarding successful completion of the write operation. At some point in time subsequent to logging the write operation the log, the write operation is flushed or destaged from the log to the BE PDs. In connection with flushing the recorded write operation from the log, the data written by the write operation is stored on non-volatile physical storage of a BE PD. The space of the log used to record the write operation that has been flushed can be reclaimed for reuse. The write operation can be recorded in the log in any suitable manner and can include, for example, recording a target logical address to which the write operation is directed and recording the data written to the target logical address by the write operation.

In the log, each logged operation can be recorded in the next logically sequential record of the log. For example, a logged write I/O and write data (e.g., write I/O payload) can be recorded in a next logically sequential record of the log. The log can be circular in nature in that once a write operation is recorded in the last record of the log, recording of the next write proceeds with recording in the first record of the log.

The typical I/O pattern for the log as a result of recording write I/Os and possibly other information in successive consecutive log records includes logically sequential and logically contiguous writes (e.g., logically with respect to the logical offset or ordering within the log). Data can also be read from the log as needed (e.g., depending on the particular use or application of the log) so typical I/O patterns can also include reads. The log can have a physical storage layout corresponding to the sequential and contiguous order in which the data is written to the log. Thus, the log data can be written to sequential and consecutive physical storage locations in a manner corresponding to the logical sequential and contiguous order of the data in the log. Additional detail regarding use and implementation of the log in at least one embodiment in accordance with the techniques herein is provided below.

Figure 3:
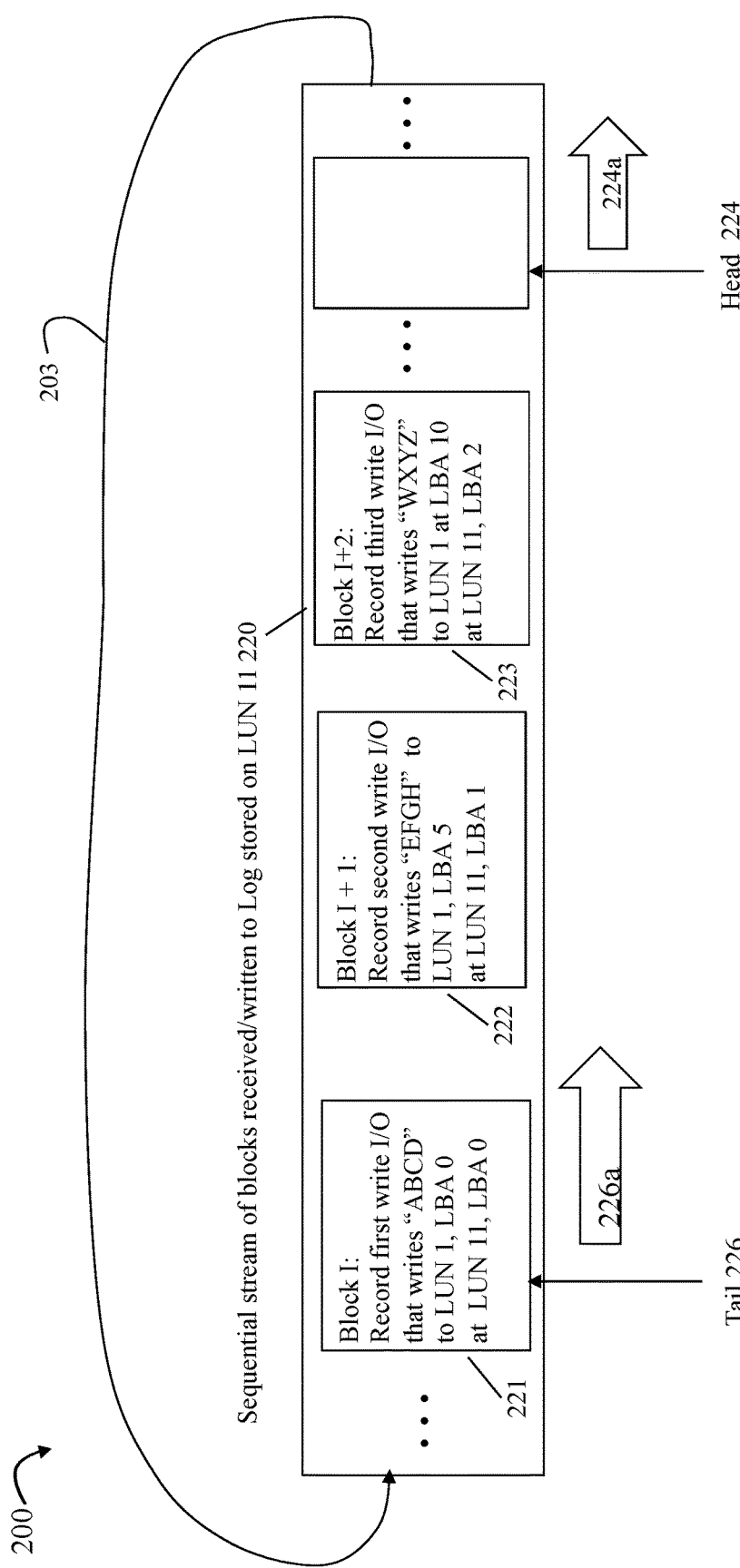
FIGS. 3, 4, 5 and 6A are examples illustrating use of a log structured system in an embodiment in accordance with the techniques of the present disclosure.

Referring to FIG. 3, shown is an example 200 illustrating a sequential stream 220 of operations or requests received that are written to a log in an embodiment in accordance with the techniques of the present disclosure. In this example, the log can be stored on the LUN 11 where logged operations or requests, such as write I/Os that write user data to a file, target LUN or other storage object, are recorded as records in the log. The element 220 includes information or records of the log for 3 write I/Os or updates which are recorded in the records or blocks I 221, I+1 222 and I+2 223 of the log (e.g., where I denotes an integer offset of a record or logical location in the log). The blocks I 221, I+1 222, and I+2 223 can be written sequentially in the foregoing order for processing in the data storage system. The block 221 can correspond to the record or block I of the log stored at LUN 11, LBA 0 that logs a first write I/O operation. The first write I/O operation can write "ABCD" to the target logical address LUN 1, LBA 0. The block 222 can correspond to the record or block I+1 of the log stored at LUN 11, LBA 1 that logs a second write I/O operation. The second write I/O operation can write "EFGH" to the target logical address LUN 1, LBA 5. The block 223 can correspond to the record or block I+2 of the log stored at LUN 11, LBA 2 that logs a third write I/O operation. The third write I/O operation can write "WXYZ" to the target logical address LUN 1, LBA 10. Thus, each of the foregoing 3 write I/O operations logged in 221, 222 and 223 write to 3 different logical target addresses or locations each denoted by a target LUN and logical offset on the target LUN. As illustrated in the FIG. 3, the information recorded in each of the foregoing records or blocks 221, 222 and 223 of the log can include the target logical address to which data is written and the write data written to the target logical address.

The head pointer 224 can denote the next free record or block of the log used to record or log the next write I/O operation. The head pointer can be advanced 224a to the next record or log in the log as each next write I/O operation is recorded. When the head pointer 224 reaches the end of the log by writing to the last sequential block or record of the log, the head pointer can advance 203 to the first sequential block or record of the log in a circular manner and continue processing.

The tail pointer 226 can denote the next record or block of a recorded write I/O operation in the log to be destaged and flushed from the log. Recorded or logged write I/Os of the log are processed and flushed whereby the recorded write I/O operation that writes to a target logical address or location (e.g., target LUN and offset) is read from the log and then executed or applied to a non-volatile BE PD location mapped to the target logical address (e.g., where the BE PD location stores the data content of the target logical address). Thus, as records are flushed from the log, the tail pointer 226 can logically advance 226a sequentially (e.g., advance to the right toward the head pointer and toward the end of the log) to a new tail position. Once a record or block of the log is flushed, the record or block is freed for reuse in recording another write I/O operation. When the tail pointer reaches the end of the log by flushing the last sequential block or record of the log, the tail pointer can advance 203 to the first sequential block or record of the log in a circular manner and continue processing. Thus, the circular logical manner in which the records or blocks of the log are processed form a logical ring buffer in which the write I/Os are recorded.

When a write I/O operation writing user data to a target logical address is persistently recorded and stored in the non-volatile log, the write I/O operation is considered complete and can be acknowledged as complete to the host or other client originating the write I/O operation to reduce the write I/O latency and response time. The write I/O operation and write data are destaged at a later point in time during a flushing process that flushes a recorded write of the log to the BE non-volatile PDs, updates and writes any corresponding metadata for the flushed write I/O operation, and frees the record or block of the log (e.g., where the record or block logged the write I/O operation just flushed). The metadata updated as part of the flushing process for the target logical address of the write I/O operation can include mapping information as described in more detail in the following paragraphs. The mapping information of the metadata for the target logical address can identify the physical address or location on provisioned physical storage on a non-volatile BE PD storing the data of the target logical address. The target logical address can be, for example, a logical address on a logical device, such as a LUN and offset or LBA on the LUN.

Figure 4:
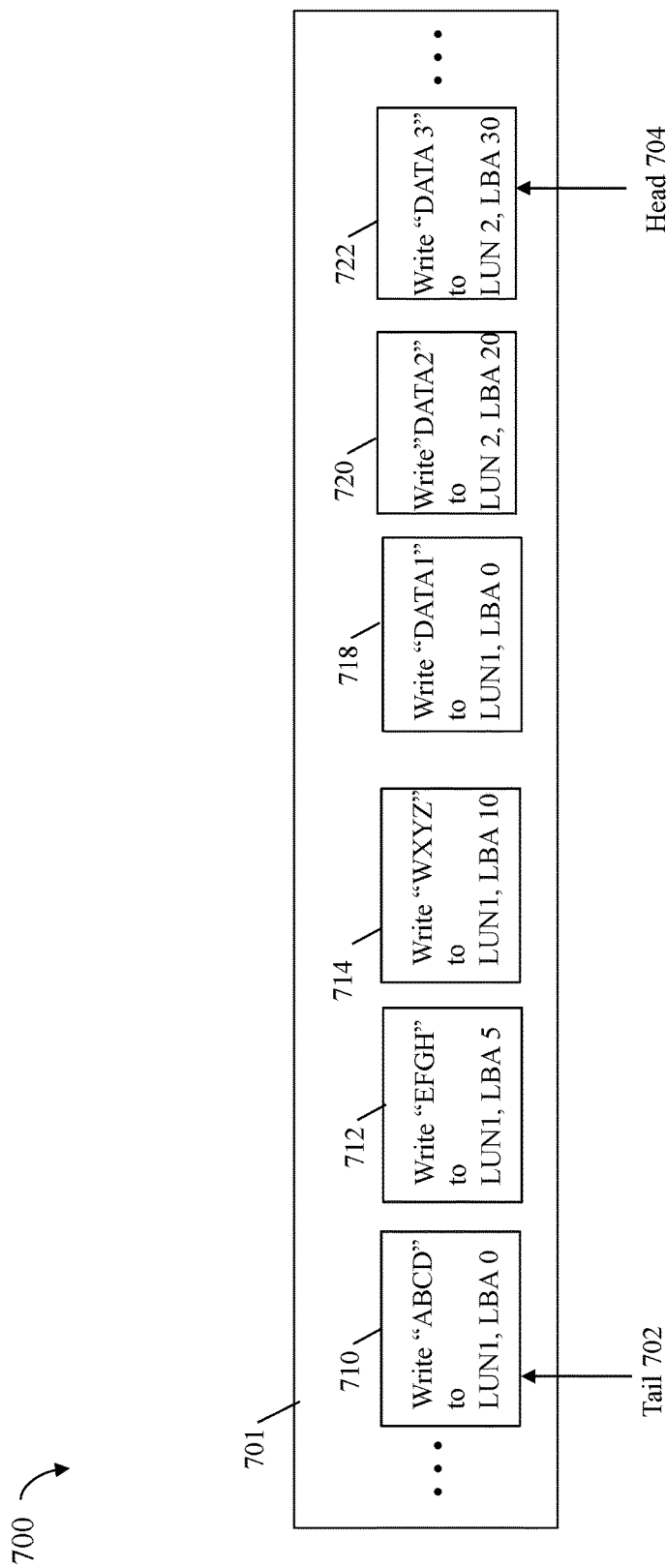

Referring to FIG. 4, shown is an example of information that can be included in a log 701 in an embodiment in accordance with the techniques of the present disclosure.

The example 700 includes the head pointer 704 and the tail pointer 702. The elements 710, 712, 714, 718, 720 and 722 denote 6 records of the log for 6 write I/O operations recorded in the log. The element 710 is a log record for a write operation that writes "ABCD" to the LUN 1, LBA 0. The element 712 is a log record for a write operation that writes "EFGH" to the LUN 1, LBA 5. The element 714 is a log record for a write operation that writes "WXYZ" to the LUN 1, LBA 10. The element 718 is a log record for a write operation that writes "DATA1" to the LUN 1, LBA 0. The element 720 is a log record for a write operation that writes "DATA2" to the LUN 2, LBA 20. The element 722 is a log record for a write operation that writes "DATA3" to the LUN 2, LBA 30. As illustrated in FIG. 4, the log records 710, 712, 714, 718, 720 and 722 can also record the write data (e.g., write I/O operation payload) written by the write operations. It should be noted that the log records 710, 712 and 714 of FIG. 4 correspond respectively to the log records 221, 222 and 223 of FIG. 3.

The log can be flushed sequentially or in any suitable manner to maintain desired data consistency. In order to maintain data consistency when flushing the log, constraints can be placed on an order in which the records of the log are flushed or logically applied to the stored data while still allowing any desired optimizations. Such constraints can consider any possible data dependencies between logged writes (e.g., two logged writes that write to the same logical address) and other logged operations in order to ensure write order consistency.

Figure 5:
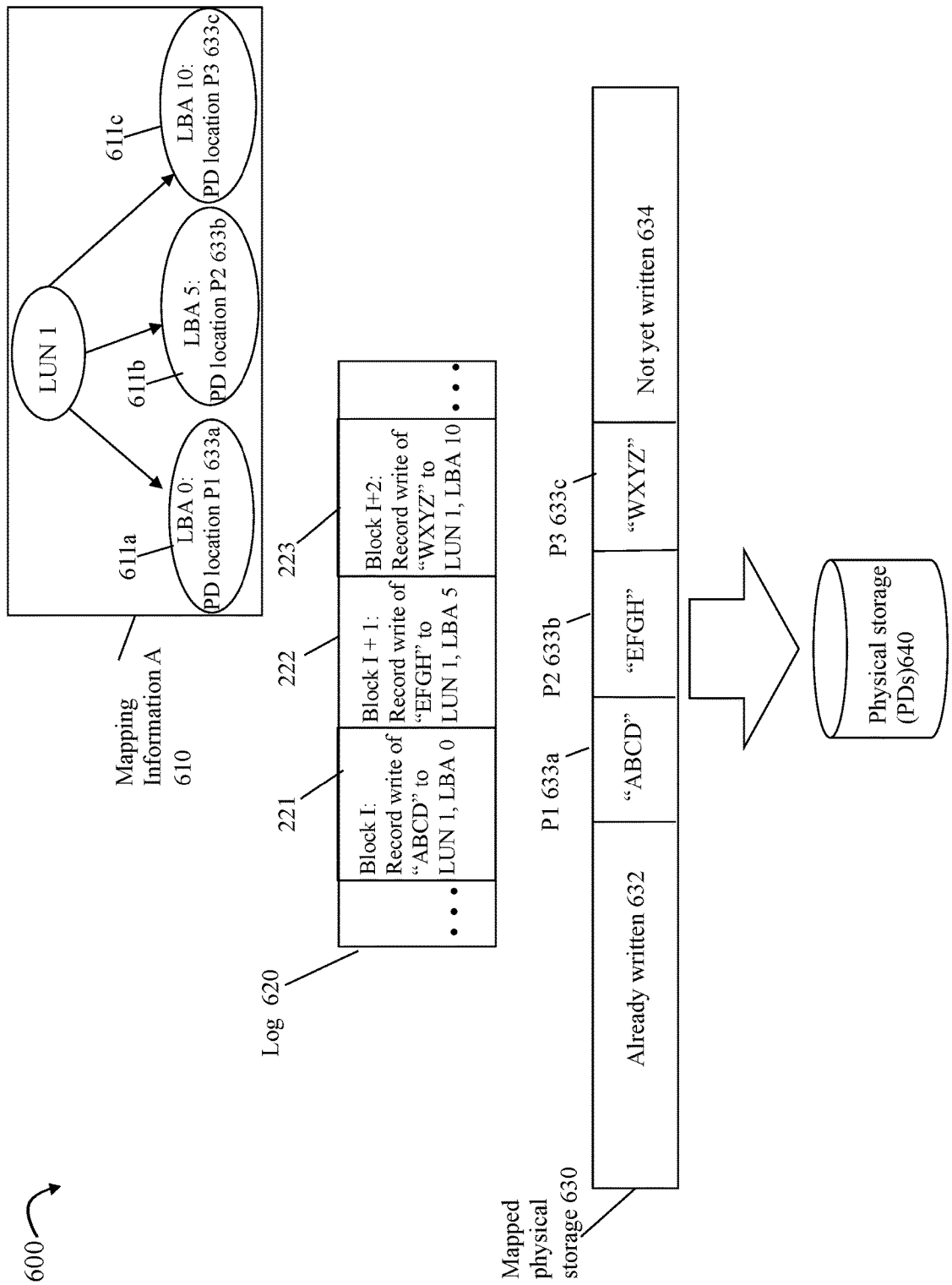

Referring to FIG. 5, shown is an example 600 illustrating the flushing of logged writes and the physical data layout of data on BE PDs in at least one embodiment in accordance with the techniques of the present disclosure. FIG. 5 includes the log 620, the mapping information A 610, and the physical storage (i.e., BE PDs) 640. The element 630 represents the physical layout of the data as stored on the physical storage 640. The element 610 can represent the logical to physical storage mapping information A 610 created for 3 write I/O operations recorded in the log records or blocks 221, 222 and 223.

The mapping information A 610 includes the elements 611a-c denoting the mapping information, respectively, for the 3 target logical address of the 3 recorded write I/O operations in the log records 221, 222, and 223. The element 611a of the mapping information denotes the mapping information for the target logical address LUN1, LBA 0 of the block 221 of the log 620. In particular, the block 221 and mapping information 611a indicate that the user data "ABCD" written to LUN 1, LBA 0 is stored at the physical location (PD location) P1 633a on the physical storage 640. The element 611b of the mapping information denotes the mapping information for the target logical address LUN1, LBA 5 of the block 222 of the log 620. In particular, the block 222 and mapping information 611b indicate that the user data "EFGH" written to LUN 1, LBA 5 is stored at the physical location (PD location) P2 633b on the physical storage 640. The element 611c of the mapping information denotes the mapping information for the target logical address LUN 1, LBA 10 of the block 223 of the log 620. In particular, the block 223 and mapping information 611 indicate that the user data "WXYZ" written to LUN 1, LBA 10 is stored at the physical location (PD location) P3 633c on the physical storage 640.

The mapped physical storage 630 illustrates the sequential contiguous manner in which data, such as written user data, can be stored and written to the physical storage 640 as the log records or blocks are flushed. In this example, the records of the log 620 can be flushed and processing sequentially (e.g., such as described in connection with FIG. 3) and the user data of the logged writes can be sequentially written to the mapped physical storage 630 as the records of the log are sequentially processed. As the user data pages of the logged writes to the target logical addresses are written out to sequential physical locations on the mapped physical storage 630, corresponding mapping information for the target logical addresses can be updated. The user data of the logged writes can be written to mapped physical storage sequentially as follows: 632, 633a, 633b, 633c and 634. The element 632 denotes the physical locations of the user data written and stored on the BE PDs for the log records processed prior to the block or record 221. The element 633a denotes the PD location P1 of the user data "ABCD" stored at LUN 1, LBA 1. The element 633b denotes the PD location P2 of the user data "EFGH" stored at LUN 1, LBA 5. The element 633c denotes the PD location P3 of the user data "WXYZ" stored at LUN 1, LBA 10. The element 634 denotes the physical locations of the user data written and stored on the BE PDs for the log records processed after the block or record 223. Generally, data from multiple log entries of the log 620 can be combined into a larger chunk that is written out to physical storage of the BE PDs.

In one aspect, the data layout (e.g., format or structure) of the log-based data of the log 620 as stored on non-volatile storage can also be physically sequential and contiguous where the non-volatile storage used for the log can be viewed logically as one large log having data that is laid out sequentially in the order it is written to the log.

The data layout of the flushed log data as stored on the BE PDs can also be physically sequential and contiguous. As log records of the log 620 are flushed, the user data written by each flushed log record can be stored at the next sequential physical location on the BE PDs. Thus, flushing the log can result in writing user data pages or blocks to sequential consecutive physical locations on the BE PDs. In some embodiments, multiple logged writes can be flushed in parallel as a larger chunk to the next sequential chunk or portion of the mapped physical storage 630. In at least one embodiment, modifications to metadata including mapping information used by the data storage system can also be recorded in the log 620 and flushed to the mapped physical storage 630, and thus the BE PDs 640, in a manner similar to that as described herein for the written user data which can include data written by host-based writes.

Consistent with other discussion herein, the mapped physical storage 630 can correspond to the BE PDs providing BE non-volatile storage used for persistently storing user data as well as metadata, such as the mapping information. With a log structured system as discussed herein, as recorded writes in the log are processed, the data written by the writes can be written to new sequential physical storage locations on the BE PDs. Thus, with a log structured system, the data and associated metadata can be written sequentially to the log 620 and also can be written sequentially to the mapped physical storage 630. Thus, one characteristic of log structured systems (LSSs) is that updates do not overwrite the existing copy, such as of user data written by a write operation. Rather, the updated or new data written at a target logical address can be stored at a next sequential location in the log and also in a next sequential physical storage location on the BE PDs. In an LSS of the data storage system in at least one embodiment, the physical storage 630 denoting the physical storage of the BE PDs can also be implemented and managed as a logical circular log in a manner similar to that as described in connection with the log of FIGS. 3, 4 and 5 containing the data prior to being flushed to the physical storage 630 of the BE PDs. As a recorded write operation that writes write data to a particular logical address, such as a LUN and LBA, is flushed from an entry of the log 620, mapping information that maps the particular logical address to the physical storage location including the write data or content stored at the particular logical address can be accordingly updated.

Figure 6A:
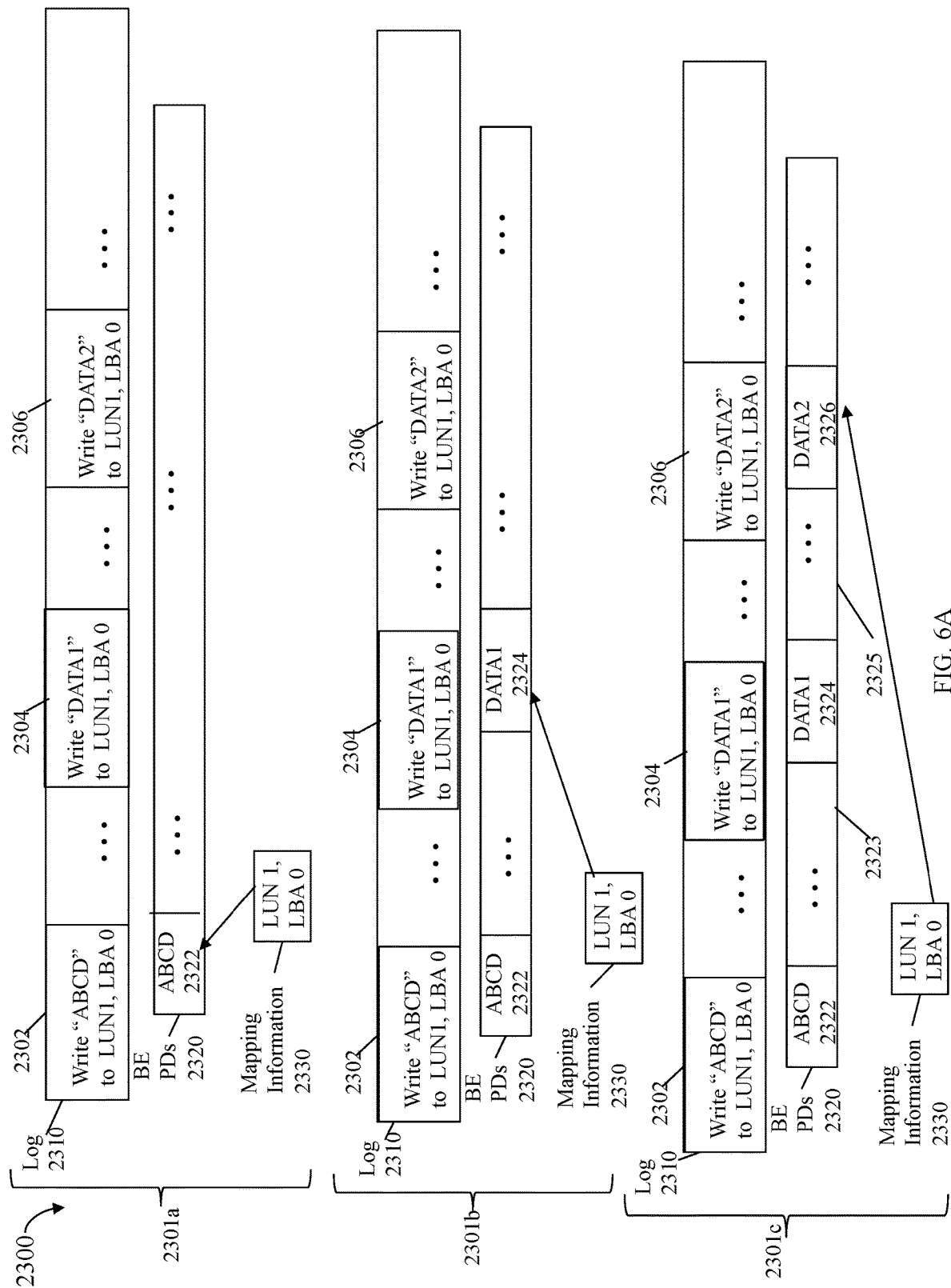

For example with reference to FIG. 6A, the element 2301a can denote the state of the log file 2310, BE PDs 2320 and mapping information 2330 at a first point in time T1 after processing the record 2302 for a first write of "ABCD" to the logical address LUN A, LBA 0. The data written "ABCD" by the recorded write of 2302 can be stored at the BE PD location 2322. Thus, flushing the log record 2302 results in storing the write data "ABCD" to the BE PD location 2322 and additionally updating the mapping information 2330 to reference the BE PD location 2322. The mapping information 2330 denotes the metadata used to map the logical address LUN 1, LBA 0 to the current physical location on the BE PDs containing the user data or content stored at the logical address LUN 1, LBA 0. After the log record 2302 is flushed from the log 2310, the record 2302 is available and can be subsequently reclaimed for reuse for logging other operations in the log 2310.

At a second point in time T2 subsequent to T1, the log record 2304 can be processed and flushed to the BE PDs 320. The element 301b denotes the state of the log file 2310, BE PDs 2320 and mapping information 2330 at the second point in time T2 after processing the record 2304 for a second write of "DATA1" to the logical address LUN A, LBA 0. The data written "DATA1" by the recorded write of 2304 can be stored at the BE PD location 3224. Thus, flushing the log record 2304 results in storing the write data "DATA1" to the BE PD location 2324 and additionally updating the mapping information 2330 to reference the BE PD location 2324 denoting the physical location containing the data stored at the LUN 1, LBA 0 at the time T2. Additionally, the PD location 2322 can be invalidated since it no longer contains valid current data for the logical address LUN 1, LBA 0, whereby the PD location 2322 can be available for reuse. After the log record 2304 is flushed from the log 2310, the record 2304 is available and can be subsequently reclaimed for reuse for logging other operations in the log 2310.

At a third point in time T3 subsequent to T2, the log record 2306 can be processed and flushed to the BE PDs 2320. The element 2301c denotes the state of the log file 2310, BE PDs 2320 and mapping information 330 at the third point in time T3 after processing the record 2306 for a third write of "DATA2" to the logical address LUN A, LBA 0. The data written "DATA2" by the recorded write of 2306 can be stored at the BE PD location 2326. Thus, flushing the log record 2306 results in storing the write data "DATA2" to the BE PD location 2326 and additionally updating the mapping information 2330 to reference the BE PD location 2326 denoting the physical location containing the data stored at the LUN 1, LBA 0 at the time T3. Additionally, the PD location 2324 can be invalidated since it no longer contains valid current data for the logical address LUN 1, LBA 0, whereby the PD location 2324 can be available for reuse. After the log record 2306 is flushed from the log 2310, the record 2306 is available and can be subsequently reclaimed for reuse for logging other operations in the log 2310.

It should be noted that the flushing of the log can be performed in response to an occurrence of any one or more defined conditions. For example, the log can be flushed in response to determining that the amount of reclaimed log space available for use and allocation is less than a specified threshold amount or size.

Consistent with discussion above, the mapping information (sometimes referred to as a mapping structure, metadata structure or simply metadata (MD)) can be used, for example, to map a logical address, such as a LUN and an LBA or offset, to its corresponding storage location, such as a physical storage location on BE non-volatile PDs of the system. Consistent with discussion elsewhere herein, write requests or operations stored in the log can be flushed to the BE PDs (non-volatile) providing storage locations for the written data. For example, a logged write operation that writes first data to a logical address can be flushed whereby the logged first data is written out to a physical storage location on a BE PD. The mapping information can be used to map the logical address to the physical storage location on the BE PDs containing the content or data stored at the logical address. In at least one embodiment, the mapping information includes a MD structure that is hierarchical structure of multiple layers of MD pages or blocks.

In at least one embodiment, the mapping information or structure for a LUN, such as LUN 1 described above in connection with FIGS. 3, 4, 5 and 6A, can be in the form of a tree having a plurality of levels of MD pages. More generally, the mapping structure can be in the form of any ordered list or hierarchical structure. In at least one embodiment, the mapping structure for a LUN A can include LUN MD in the form of a tree having 3 levels including a single top or root node (TOP node), a single mid-level (MID node) and a bottom level of leaf nodes (LEAF nodes), where each of the MD page leaf nodes can point to, or reference (directly or indirectly) one or more pages of stored data, such as user data stored on the LUN A. Each node in the tree corresponds to a MD page including MD for the LUN A. More generally, the tree or other hierarchical structure of various MD pages of the mapping structure for the LUN A can include any suitable number of levels, such as more than 3 levels where there are multiple mid-levels. In at least one embodiment the tree of MD pages for the LUN can be a B+ tree, also sometimes referred to as an "N-ary" tree, where "N" indicates that each node in the tree structure can have up to a maximum of N child nodes. For example, in at least one embodiment, the tree of MD pages for the LUN can specify N=512 whereby each node in the tree structure can have up to a maximum of N child nodes.

Figure 6B:
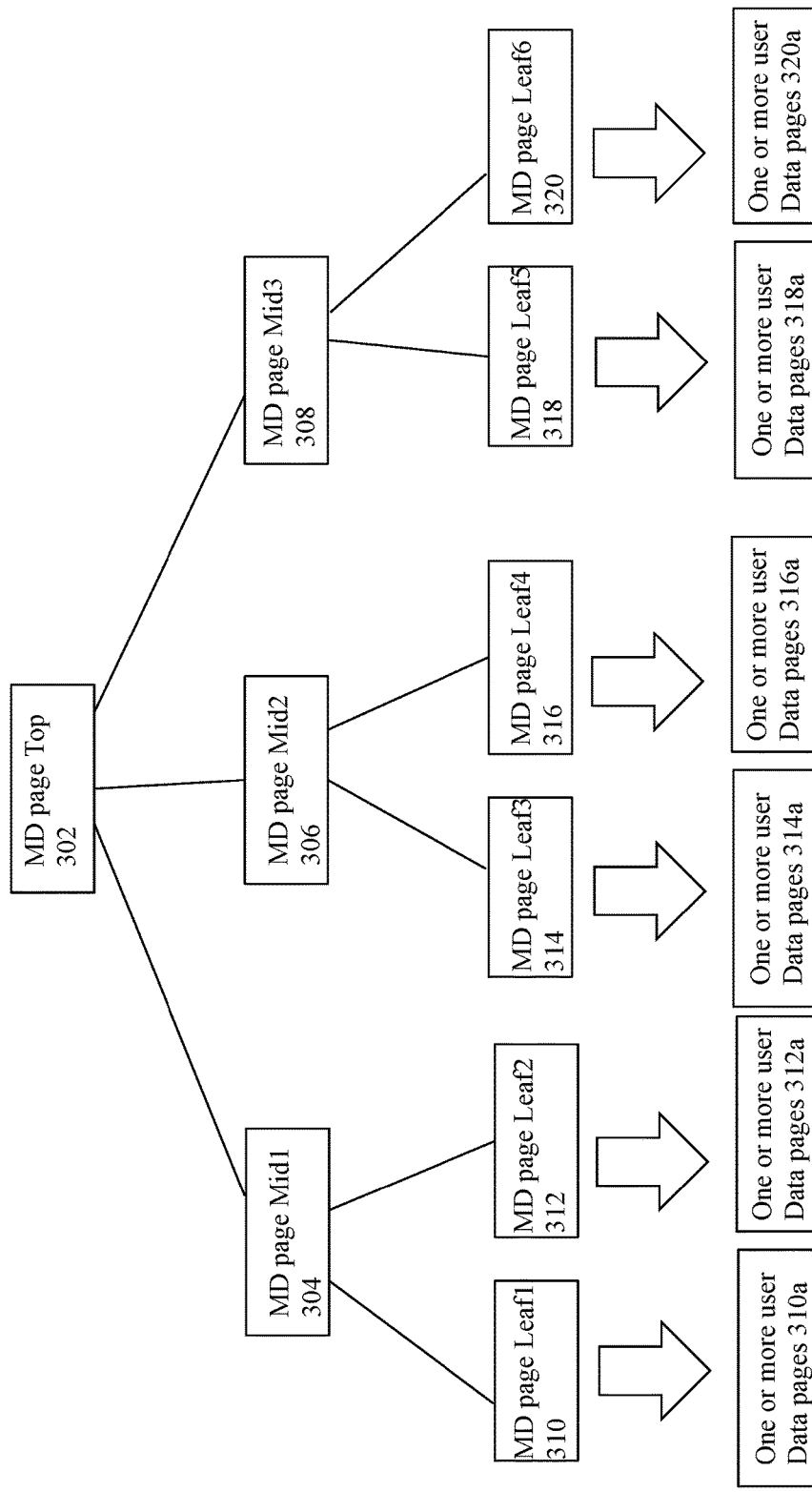
FIGS. 6B, 6C and 6D are examples illustrating a hierarchical metadata structure of metadata pages in at least one embodiment in accordance with the techniques of the present disclosure.
Figure 6C:
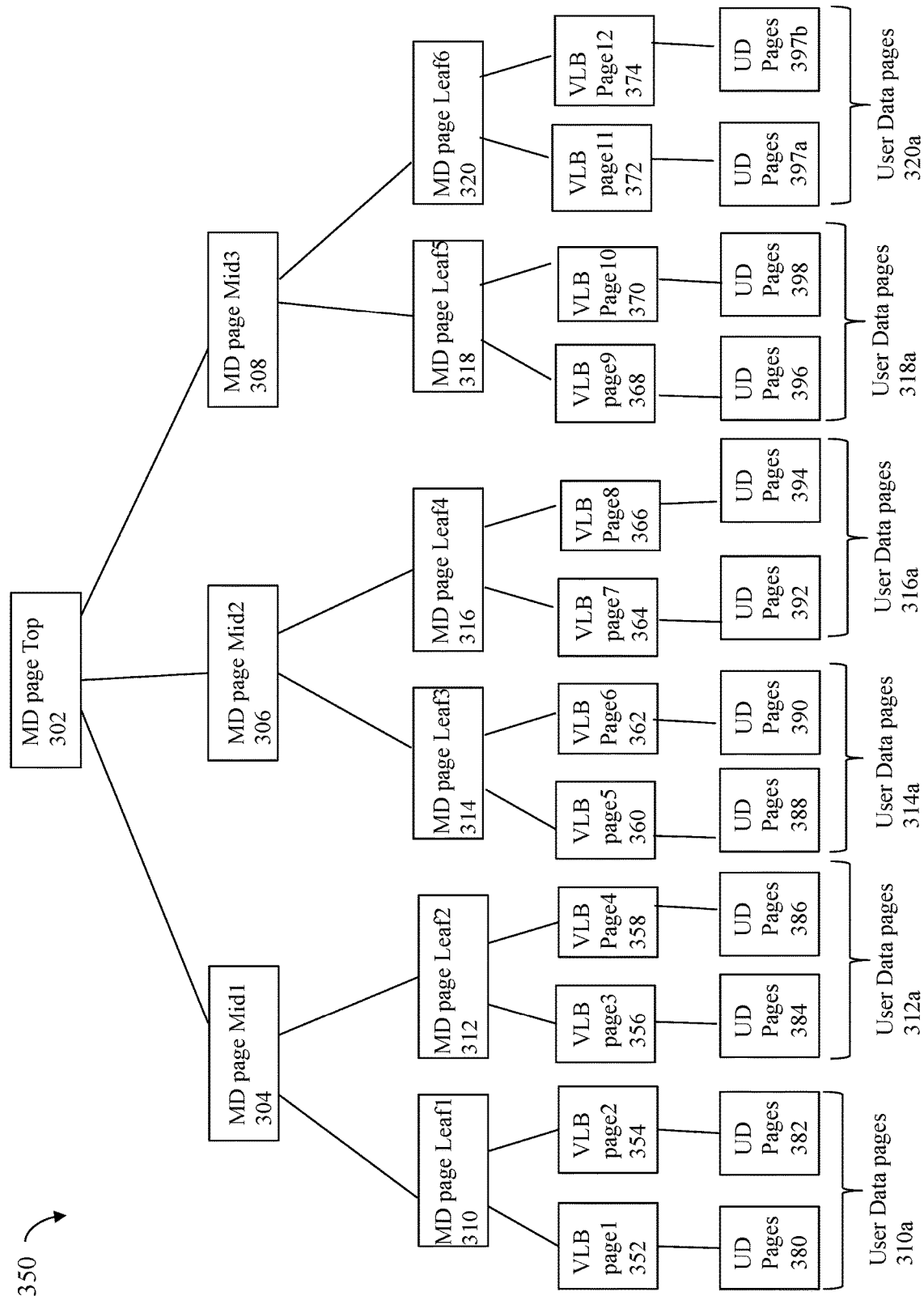

For simplicity of illustration, the tree structure of MD pages, corresponding to the mapping structure in at least one embodiment, is represented in subsequent FIGS. 6B and 6C as including only 3 levels where each node in the tree can have at most 3 child nodes. Generally, the techniques herein can be used with any layered or hierarchical structure of MD pages.

Referring to FIG. 6B, shown is an example 300 of a tree of MD pages that can be used in an embodiment in accordance with the techniques herein. The example 300 includes a tree of MD pages denoting the mapping structure as discussed above with 3 levels—a top or root level, level 1, including a single MD TOP page; a single mid or middle level, level 2, of MD MID pages; and a bottom level, level 3, of leaf nodes of MD LEAF pages. In the example 300, the top or root level, level 1, includes MD page 302; the mid or middle level, level 2, includes MD pages 304, 306 and 308; and the bottom level, level 3, includes MD pages 310, 312, 314, 316, 318 and 320, which can also be referred to as leaf nodes. As also illustrated in the example 300, each of the leaf MD pages in level 3 of the tree points to, or references (e.g., directly or otherwise indirectly using one more additional levels of indirection of pointers not illustrated) one or more user data pages or blocks including data stored at various LBAs of a LUN such as the LUN A. For example, MD pages 310, 312, 314, 316, 318 and 320 point or reference, respectively, one or more UD pages 310a, 312a, 314a, 316a, 318a and 320a.

The links or connections between a parent node (at level M) and its one or more child nodes (at level M+1) in the tree 300 generally represent mappings between the parent node and the one or more child nodes. In at least one embodiment, the parent node can include a reference used to access (directly or indirectly) each of its one or more child nodes. For example, the root node MD page top 302 can include addresses or pointers used to access each of its child nodes 304, 306 and 308. The mid-level node MD page mid1 304 can include addresses or pointers used to access each of its child leaf nodes 310, 312. The mid-level node MD page mid 306 can include addresses or pointers used to access each of its child leaf nodes 314, 316. The mid-level node MD page mid 308 can include addresses or pointers used to access each of its child leaf nodes 318, 320.

In at least one embodiment, each of the addresses or pointers included in a MD page that references a location in another MD page or references a location in a UD page can be a physical storage location on the back-end PDs. Thus, the traversal between connected nodes of the structure 300 can correspond to traversing physical address or storage locations included in pages or nodes that are parent nodes.

In connection with accessing a particular UD page in at least one embodiment, all MD pages in a path from the root or top level of the tree to the UD page can be traversed in a consecutive serialized order in which such pages appear in the path traversal down the path from the top or root level to the UD page accessed using a particular one of the MD page leaf nodes. For example, assume UD page or block X is included in the set of UD pages 312a. In order to access UD page X of 312a, the following denotes the consecutive serialized order in which the MD pages forming a sequence are accessed: MD page top 302, MD page mid1 304, and MD page leaf2 312. Generally, in at least one embodiment, each of the MD pages can include pointers or addresses to locations of one or more child pages or nodes. Thus, the foregoing traversal of MD pages denotes the sequence of MD pages that are processed in consecutive serialized order in order to access the particular UD page, such as UD page X. In order to access the UD page X as stored on PDs where UD page X includes first data needed to service a read I/O operation in connection with a cache miss of the first data, each of the MD pages in the foregoing sequence (e.g., MD page top 302, MD page mid1 304, and MD page leaf2 312) needs to be accessed in consecutive serialized order. In at least one embodiment, the sequence of MD pages, and more generally, the path from the MD page top to the UD page X, forms a linked list of nodes of pages. In at least one embodiment, each parent node or MD page of the structure 300 can generally include multiple pointers or references to locations of its child nodes or pages. For example, MD page top 302 includes pointers to locations of its child nodes, MD pages 304, 306 and 308. MD page mid2 306 includes pointers to locations of its child nodes, MD pages 314 and 316.

The data pages 310a, 312a, 314a, 316a, 318a and 320a include UD stored on particular logical addresses of a LUN's address space, such as the LUN A's logical address space. In at least one embodiment each MD leaf can hold MD for a specified number of LBAs of a LUN. For example, in one embodiment each MD leaf can hold MD for 512 LBAs. For example, with reference to FIG. 6B, the data pages 310a, 312a, 314a, 316a, 318a and 320 each include user data stored on particular logical addresses of the LUN A's logical address space. It may be, for example, that element 310a includes user data stored at a first set of LBAs 0-511; and that element 312a includes user data stored at a second set of LBAs 512-1023. Generally, the particular LBAs of the LUN mapped to each MD page can vary with embodiment. For example, in at least one embodiment, consecutive sequential subranges of the LUN's logical address space can be mapped to the MD page leaves. Additionally, when the tree is traversed in a depth first manner, the MD page leaves can correspond to consecutive sequential subranges. For example, the element 310a denotes data pages for LBAs 0-511; the element 312a denotes data pages for the LBAs 512-1023; the element 314a denotes data pages for LBAs 1024-1535; the element 316a denotes data pages for LBAs 1536-2047, and so on.

As generally known in the art, a depth-first traversal is an algorithm for traversing or tree or graph data structures. The algorithm starts at the root node (selecting some arbitrary node as the root node in the case of a graph) and explores as far as possible along each path extending from the root to a leaf node before backtracking up the path to find a yet another unexplored path. In at least one embodiment, traversal of the tree 300 of MD pages in a depth-first manner explores all paths, in sequential order, from the left-most path to the right most path as arranged in the tree.

In at least one embodiment, when the structure 300 is traversed in a depth first manner (i.e., from the left-most path to the right most path as arranged in the tree), the MD page leaf nodes that occur in the depth first traversal correspond to consecutive sequential LBA subranges of a LUN. In at least one embodiment, when the overall tree including MD page top node 302 and all its descendant nodes are traversed in this depth first manner, the MD page leaf nodes that occur in the depth first traversal correspond to consecutive sequential LBA subranges of a LUN.

In at least one embodiment as described herein, each of the MD pages and data blocks in the example 300 can be of a predetermined size and each of the MD pages can hold a known number of entries containing pointer or address values. In such a case and in combination with the correspondence of sequential consecutive LBA ranges of each MD leaf page, an embodiment can perform a calculation to determine the MD page at a particular level that is accessed in the tree MD mapping structure 300 to determine the data block for a particular LUN and LBA. Similarly, it is a straightforward mathematical calculation to determine the index, offset of entry in a particular page or node to be accessed in connection with obtaining data blocks stored at the particular LUN and LBAs of the LUN. Each MD page in 300 can be known to include MD relevant for accessing data on a particular LUN and one or more LBAs of that LUN. For example, consistent with discussion above, the element 310*a* denotes the data blocks for LBAs 0-511 of a LUN. In order to access the data block for an LBA of the LUN in the LBA subrange 0-511, MD pages 302, 304 and 310 can be traversed in sequential order. In particular, the first entry or offset of the MD page top 302 can contain the address of the MD page mid 1 304; the first entry or offset of the MD page mid 1 304 can contain the address of the MD page leaf 1 310; and the first entry or offset of the MD page leaf 1 310 can contain the address of one of the data blocks of 310*a*.

In a similar manner, a mapping can be made regarding what MD pages of the structure 300 and entries thereof are used in connection with obtaining data blocks containing data for any particular LUN and LBA. In at least one embodiment, the particular MD pages used to access a data block including data for a particular LUN and LBA can be known based on such mappings and correspondence of LBA subranges to particular MD leaf pages.

Referring to FIG. 6C, shown is a more detailed version of a hierarchical structure used as the mapping structure 108 that can be used in an embodiment in accordance with the techniques of the present disclosure. The structure 350 is similar to the structure 300 as described and illustrated in FIG. 6B with the added difference that more detail is provided regarding the intervening layer of VLB (virtual layer block) MD pages between the MD page leaves and the UD pages. Thus, in such an embodiment, the structure 350 includes 4 levels of MD pages as opposed to the possible 3 levels as allowed in the more generalized structure 300 represented in FIG. 6B. In this case, each sequence of MD pages traversed in a path from the MD page top or root to access a particular UD page includes 4 MD pages—MD page top 302, one of the MD page Mid nodes (e.g., one of 304, 306 or 308), one of the MD page leaf nodes (e.g., one of 310, 312, 314, 316, 318 and 320), and one of the VLB pages (e.g., one of 352, 354, 356, 358, 360, 362, 364, 366, 368, 370, 372 and 374).

In at least one embodiment, the use of VLBs as a layer in the hierarchy between the MD leaf nodes and the UD pages can be used to facilitate different data storage services, such as relocating UD between different physical storage location, data deduplication, and the like. An entry of the VLB associated with a particular physical storage location can be remapped without requiring remapping of a MD leaf to the UD page.

The UD pages 380 and 382 denote two portions of UD pages corresponding to UD pages 310*a* of FIG. 6B including data for LBAs 0-511. The UD pages 384 and 386 denote two portions of UD pages corresponding to UD pages 312*a* of FIG. 6B including data for LBAs 512-1023. The UD pages 388 and 390 denote two portions of UD pages corresponding to UD pages 314*a* of FIG. 6B including data for LBAs 1024-1535. The UD pages 392 and 394 denote two portions of UD pages corresponding to UD pages 316*a* of FIG. 6B including data for LBAs 1536-2047. The UD pages 396 and 398 denote two portions of UD pages corresponding to UD pages 318*a* of FIG. 6B including data for LBAs 2048-2559. The UD pages 397*a* and 397*b* denote two portions of UD pages corresponding to UD pages 320*a* of FIG. 6B including data for LBAs 2560-3072.

In furtherance of the example above regarding UD page X and now with reference to FIG. 6C, assume more specifically that UD page X is located in the set of UD pages denoted by 384. In this case, the MD page sequence including the MD pages traversed in order to access UD page X 384 includes MD page 302, MD page 304, MD page 312, and VLB page3 356.

Figure 6D:
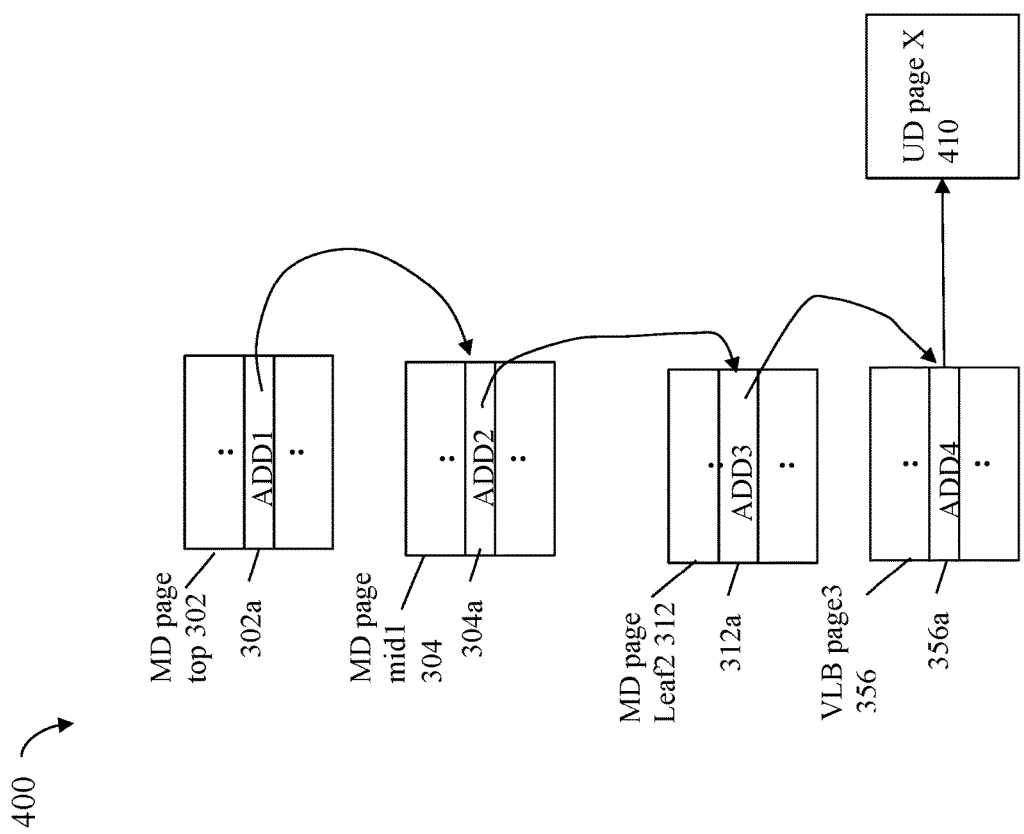

Referring to FIG. 6D, shown is a more detailed representation 400 of the MD pages of the sequence traversed to access the UD page X 384 included in the set of UD pages 312*a*. As noted above, the MD page sequence includes MD page 302, MD page 304, MD page 312, and VLB page3 356. In the example 400, MD page top 302 includes an entry or address 302*a* that points to or references the location 304*a* in the MD page mid1 304. In at least one embodiment, the starting entry 302*a* in the first MD page 302 of the sequence can be determined based on the logical address including the desired UD stored in a page or block of storage (e.g., physical non-volatile storage location on the BE PDs of the system). For example, assume processing is performed to read the UD for LUN A, LBA 514 located in UD page X. In at least one embodiment, the logical address LUN A, LBA 514 can be used to determine the particular structure instance and thus the particular MD page top 302 to access. The LBA 514 of the logical address of the UD can also be used to determine an index or offset into the MD page 302 to determine the relevant entry, location or address 302*a* having a pointer, address or reference to an entry in the next MD page in the sequence to access the desired page including the UD for LUN A, LBA 514. An embodiment can generally use any suitable technique to map a corresponding logical address, such as an LBA of a particular LUN, to an entry in the top level MD page 302.

The MD page top 302 can be accessed and read from a PD to obtain the address or pointer ADD1 from location 302*a*. If the MD page 302 is already in cache, the cached copy can be used to obtain the address or pointer ADD1 from the location 302a. The address or pointer ADD1 of location 302a can then be used to identify the entry 304a of the particular mid level MD page, such as MD page mid1 304, that is accessed next in the sequence.

Continuing with the example 400, the MD page mid1 304 can be accessed where the location 304a is read to obtain the address or pointer ADD2 from location 304a. The address or pointer ADD2 can then be used to identify the entry 312a of a particular leaf level MD page, such as MD page leaf2 312, that is next accessed in the sequence. If the MD page mid1 304 is not in cache, the on-disk copy of the MD page 304 on a PD can be accessed to read the address or pointer ADD2 from the location 304a. The address or pointer ADD2 identifies location 312a of the MD page leaf 2 312. If the MD page 312 is not already in cache, the on-disk copy of the MD page 312 on a PD can be read to obtain the content of location 312a. The location 312a of the MD page leaf2 312 can be accessed and read to obtain the address or pointer ADD3 from location 312a. The address or pointer ADD3 can then be used to identify a particular entry of a VLB page, such as the entry 356a of the VLB page3 356, that is next accessed in the sequence. Thus, ADD3 can denote the location or address of the entry 356a in the VLB page 3 356.

If the VLB page 356 is not already in cache, the on-disk copy of the VLB page 356 on a PD can be read to obtain the content of location 356a. The location 356a of the VLB page 3 356 can be accessed and read to obtain the address or pointer ADD4 from the location 356a. The address or pointer ADD4 can then be used to identify the particular UD page X 410 where the UD page X can next be read. If the UD page X is not in cache, the on-disk copy of the UD page X can be read in from a PD.

The example 400 of FIG. 6D includes the path or traversal of MD pages in the structure 350 from the MD page root or top 302 to the UD page X of 384 including the desired UD for the logical address LUN A, LBA 514. The path or traversal of MD pages 302, 304, 312, 356 and 384 denotes the sequence of MD pages read and accessed in order to obtain the UD page X of 384.

For a read I/O operation received at a node of a dual node system or appliance such as in an active-active configuration, servicing the read operation can include reading one or more data blocks or storage locations as well as reading information from one or more MD pages such as, for example, of the MD or mapping structure as described in connection with FIGS. 6B-D.

For a write I/O operation received at a node of a dual node system or appliance such as in an active-active configuration, servicing the write operation can include reading information from one or more MD pages. Servicing the write operation can include updating one or more data blocks or storage locations as well as updating one or more MD pages such as, for example, of the MD or mapping structure as described in connection with FIGS. 6B-D. In at least one embodiment, the MD or mapping information used in connection with stored user data can be stored on non-volatile storage, such as on the BE PDs of the appliance or data storage system. At least some of the MD or mapping information for all such user data can be stored in a volatile memory cache of each of the nodes of the appliance or system. Depending on the write operation, one or more logical addresses can be updated with new data or content by a write operation. Additionally, one or more MD pages used to map the one or more logical addresses to one or more physical storage locations storing the new data can also be updated, for example, to reference the one or more physical storage location including the new data or content.

With a log-structured system in at least one embodiment, as recorded writes of the log are processed and flushed or destaged to the BE PDs, the content written by the recorded writes of the log can be stored at physical storage locations on the BE PDs. Additionally, the MD or mapping information corresponding to the logged writes being flushed can also be accordingly updated to reference the physical storage locations on the BE PDs containing the content. In a dual node appliance or system with an active-active configuration as described herein, both nodes of the system can concurrently receive and service write I/Os, as well as other received requests and commands using shared resources such as, for example, the MD or mapping structure. In at least one embodiment, content recorded persistently in the log can also be stored in volatile memory cache of each node. When write data is flushed by a node, it can be flushed from the log and the volatile memory cache of the node. In at least one embodiment, write data can remain in the volatile memory cache of the node while the write data is in the log and has not yet been flushed from the log to BE non-volatile storage.

In at least one embodiment, updates or modifications to the MD pages of the MD or mapping structure described in connection with the FIGS. 6B-D can also similarly be recorded in entries or records of a persistently stored metadata log and then flushed or destaged from the metadata log to persistent BE storage of the BE PDs. In at least one embodiment, the MD pages of the MD or mapping structure such as described in connection with the FIGS. 6B-D can be persistently stored in a MD page store on the BE PDs of the system. In some contexts herein, the copy of a MD page as stored in the MD page store on the BE PDs can also be referred to herein as the on-disk copy of the MD page.

In some existing implementations, when an update is made to a MD page, the entire resulting MD page with the update applied can be stored in the metadata log file. In such implementations, an excessive amount of storage can used in connection with the metadata log file in that each MD page update can include storing an entire updated MD page in the metadata log file. Additionally, excessive amounts of node-local volatile memory of the nodes can be used in connection with node-local cached copies of portions of the metadata log file.

In at least one implementation, many read and write operations performed with respect to a MD page may only need, respectively, to read or update one field or value of the MD page. For example, a MD update to a MD page can require only updating a relatively small number of bytes, such as 4 bytes or 8 bytes, of a much larger MD page, such as a 4K byte MD page. However, as noted above, existing workflows for some implementations to perform reads and writes to the MD page can include loading the entire MD page into the cache or volatile memory of a node, if the MD page is not already in the cache or volatile memory of the node.

In this manner, existing implementations and workflows such as noted above can consume an excessive of amount of system resources, such as memory and CPU or processor execution time, resulting in performance degradation.

To improve upon the foregoing, a metadata log architecture can be used which includes a metadata log where updates to MD pages are recorded using only the changes, updates or "deltas" made to the MD pages.

For example, many updates to a MD page can be an update or write of a relatively small number of bytes, such as 4 bytes or 8 bytes, of a much larger MD page, such as a 4K byte MD page.

In at least one embodiment in accordance with the techniques of the present disclosure, the metadata updates, changed content, changes or "deltas" made to MD pages (rather than complete updated MD pages) can be recorded in a metadata log as stored on a log tier of non-volatile memory. Additionally, in at least one embodiment in accordance with the techniques of the present disclosure, the metadata updates, changes or deltas made to at least some of the MD pages can also be stored in local volatile memories of the nodes of the system. The node local in-memory copy of the metadata changes, updates or deltas made to MD pages as stored on each of the nodes can also sometimes be referred to herein as the in-memory log, in-memory delta log or in-memory metadata log used by each node in connection with performing processing in accordance with the techniques of the present disclosure.

In at least one embodiment, each metadata update, change or delta made to a MD page may be expressed in the form of a tuple represented as (LI, EI, T, V) where:

LI denotes the logical index of the MD page. The LI can be a unique index of the MD page that is updated. The LI can be used to uniquely identify the MD page in the MD or mapping structure such as described elsewhere herein (e.g., FIGS. 6B-D).

EI denotes the entry index denoting a particular entry, offset or location in the MD page denoted by LI.

T denotes the type of metadata update. For example, in at least one embodiment there can be multiple predefined types or allowable values for T. For example, the predefined types or values for T may include one or more of: IDP denoting an update to an address or indirect pointer used to reference a data block (e.g., the indirect pointer may be point to, or be the address of, a VLB entry that further includes an address of, or pointer to, the data block containing user data); INCREF denoting an update to increment by 1 a reference count of a VLB entry associated with a data block containing content that may be stored at one or more logical addresses; DECREF denoting an update to decrement by 1 a reference count of a VLB entry associated with a data block containing content that may be stored at one or more logical addresses. Generally, an embodiment can include any suitable number of predefined types that may vary with the supported metadata updates or changes.

V denotes the updated value to be stored.

It should be noted that the particular value of T denoting a particular type can also denote the size of the data payload V or updated value V of the tuple. For example, a type for T denoting an address can indicate that the size of V is the size or number of bytes or bits of an address or pointer. As another example, a type of T denoting an integer count or counter can indicate that the size of V is the size of an integer, such as 32 bits. In some instances, the value of the type T can imply performing an operation such as increment a counter by 1, or decrement a counter by 1, as noted above. In such cases and in some embodiments, the value for V of the tuple can be implied and omitted when T indicates to perform an increment or decrement operation of a field since such an increase or decrease can be with respect to a current or existing value of the counter.

In at least one embodiment, the metadata changes, updates or deltas made to MD pages as recorded in the in-memory metadata logs of the nodes can be in the form of tuples. In at least one embodiment, the metadata changes, updates or deltas made to MD pages as recorded in the metadata log stored on NVRAM can also be in the form of tuples.

Figure 6E:
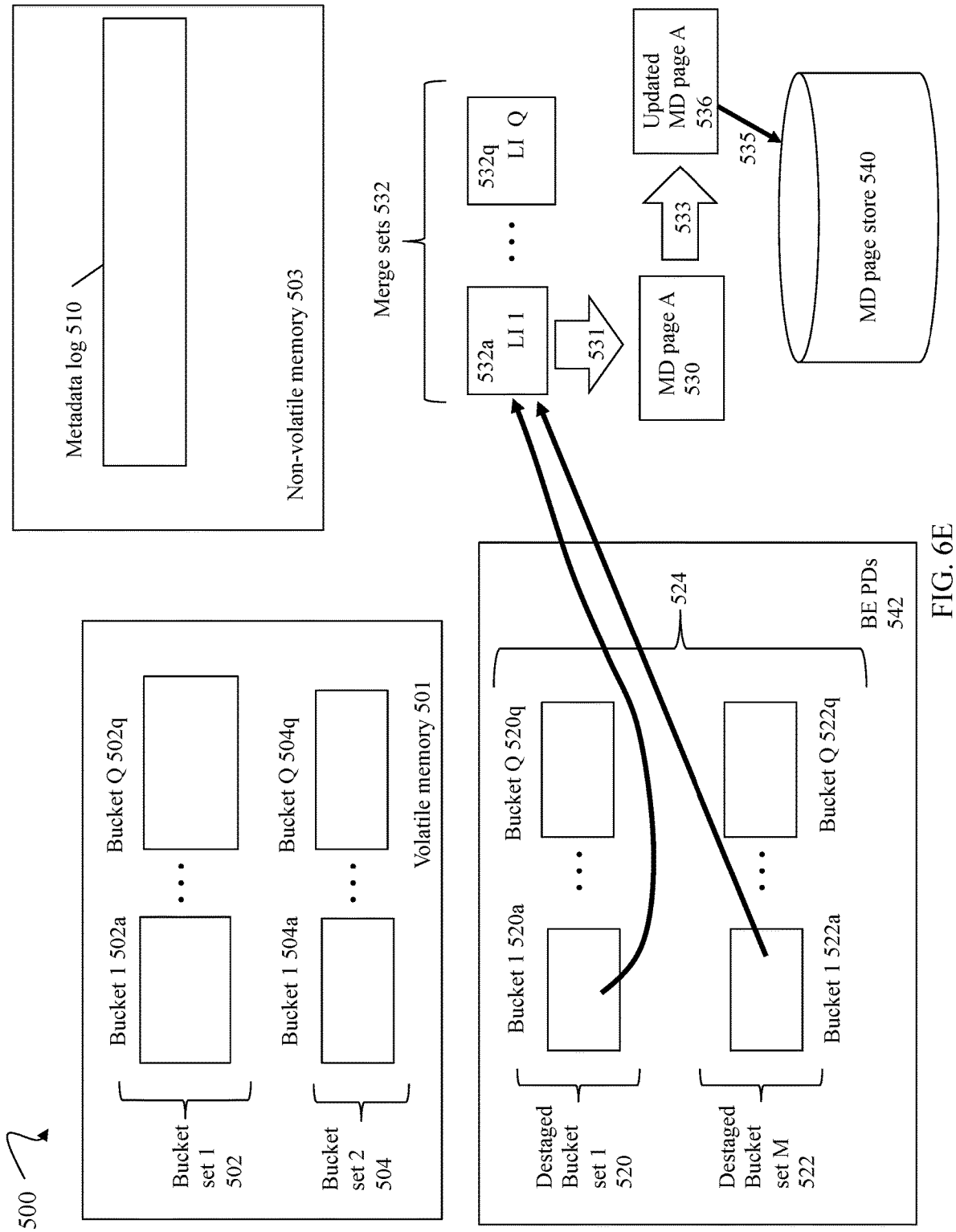
FIG. 6E is an example of structures and associated data flow in connection with a metadata log infrastructure in at least one embodiment in accordance with the techniques of the present disclosure.

Referring to FIG. 6E, shown is an example 500 illustrating structures and associated data flow in at least one embodiment of a data storage system.

The example 500 includes volatile memory 501, non-volatile memory 503 and non-volatile storage on the BE PDs 542. The volatile memory 501 can denote a volatile memory as included in each node of the appliance or system which includes node local in-memory structures and cached data that can be used in connection with the techniques herein. In particular, the volatile memory 501 includes bucket sets 502, 504 of logged metadata changes, updates or deltas. The non-volatile memory (e.g., NVRAM) 503 includes the metadata log 510 of metadata updates, changes or deltas. Consistent with other discussion herein, the non-volatile memory 503 can be accessible to both nodes of the system.

Collectively, the structures or bucket sets 502, 504 can denote the in-memory metadata log or in-memory delta log including the recorded metadata updates or deltas to MD pages for a particular node. Thus, each node in a dual node appliance can include an instance of the volatile memory 501 and associated structures or bucket sets 502, 504.

In at least one embodiment in accordance with the techniques herein, metadata changes, updates or "deltas" made to MD pages can be recorded and stored in a volatile memory structure in the volatile memory 501 of each node of the system. In this manner, an individual write or update to a MD page can be recorded as a single metadata update or entry in the volatile memory structure. For example, a write that updates only a 4 byte or 8 byte field of a 4K byte MD page can be recorded in the volatile memory structure as a single metadata update. Each metadata update can be represented as a tuple as discussed elsewhere herein in more detail. In at least one embodiment, each tuple can be relatively small in comparison to the size of each MD page.

The volatile memory 501 of each node can include volatile memory structures 502, 504. In at least one embodiment, the structures 502, 504 can denote two bucket sets 502, 504 where at any point in time, one of the two buckets sets 502, 504 can be designated as the active set and the remaining bucket set can be designated as the destaging or inactive set. Each metadata update to a MD page can be added to a corresponding one of the buckets of the active bucket set that is uniquely associated with the MD page. For example at a first point in time, the bucket set 1 502 can be active and the bucket set 2 504 can be inactive, where received metadata updates are stored in the bucket set 502. As described in more detail in the following paragraphs, the roles of active and inactive or destaging can be alternated or switched between the two bucket sets 502, 504 in a continuous manner as the currently active set is deemed full or ready for destaging to the BE PDs 542.

The bucket set 1 502 includes the buckets 502a-502q, and the bucket set 2 504 includes the buckets 504a-504q, where there are "q" metadata pages. In each of the bucket sets 502, 504, each bucket can correspond uniquely to a different MD page. The metadata updates of a particular bucket are the recorded metadata updates to the MD page associated with the particular bucket of each bucket set. For example, MD page A can be uniquely associated with, and mapped to, the first buckets 502a, 504a, respectively, in each of the bucket sets 502, 504. In this manner, the bucket 1 502a includes the metadata updates made to the MD page A when the bucket set 502 is the active set; and the bucket 1 504*a* includes the metadata updates made to the MD page A when the bucket set 504 is the active set.

Each of the bucket sets 502, 504 in at least one embodiment can be further organized as a hash table of buckets where each MD page is mapped to a particular bucket using a hash function. The hash function can map the logical index (LI) uniquely identifying a MD page to a corresponding bucket of metadata updates for the MD page. In at least one embodiment, each of the bucket sets 502, 504 can denote a hash table of buckets implemented as an array, where the hash value HV1 of the LI of a MD page denotes the index of the array and the bucket associated with the MD page. Within each bucket associated with a MD page, the metadata updates can be sorted in a time order, from oldest to newest, based on when the metadata updates are received in the system. In at least one embodiment, each bucket (e.g., 502*a*) of metadata updates for a MD page can be organized in a binary tree. The metadata updates can be represented as nodes or entries in the binary tree. The metadata updates or nodes of the binary tree can be sorted, at least in part, based on the time order of when the metadata updates are received by the system. The increasing time order can indicate the order in which the metadata updates or changes are applied to the MD page associated with the bucket or binary tree.

More generally, an embodiment in accordance with the techniques herein can use any suitable volatile memory structure(s) and organization to store the metadata updates, changes or deltas to the MD pages.

In at least one embodiment, when a new metadata update U1 is made to a MD page, the metadata update U1 can be represented as a tuple. The metadata update U1 can be inserted into the active bucket set as follows. The hash function H is used to calculate a hash value HV of the LI of the MD page (e.g., H(LI)=HV). The HV can denote the bucket uniquely associated with the MD page being updated. For example, assume the bucket set 502 is the active set and assume that the MD page A is being updated with the new metadata update U1. The MD page A can have an LI that generates a hash value=1 mapping to the first bucket, bucket 1 502*a*, of the bucket set 502. The bucket 502*a* can be a binary tree including metadata updates to the MD page A. The metadata update U1 can be inserted into the sorted binary tree of 502*a* based, at least in part, on when the metadata change U1 was received.

Consistent with other discussion herein, the volatile memory 501 can include 2 sets of buckets 502, 504. At a first point in time T1, a first set of buckets, such as 502, can be designated as the active set and the second set of buckets 504 can be designated as the inactive set of buckets. Consistent with other discussion herein, each bucket in a set includes the metadata updates or changes for a particular one of the MD pages associated with the bucket. Thus, metadata changes received for a particular MD page are located in the bucket associated with the MD page. The role assignments of active and inactive can be continuously switched between the two bucket sets 502, 504 of a node at subsequent points in time as the currently designated active set becomes full. In at least one embodiment, the role assignment switching between the two sets of buckets can be performed when at least one bucket in the active set becomes full, or more generally reaches a predefined maximum size limit. In some implementations, each data container can have a predefined data limit before the data container is considered "full". For example, metadata updates to a MD page associated with each bucket can be written to the BE PDs of the system as a separate page (e.g., 4 KB). In this example, the page size can determine the predefined data limit of a bucket. In other words, once a bucket includes a page-worth of metadata changes, processing can determine that the data container is "full".

To further illustrate, at a second point in time T2 subsequent to T1, the first set of buckets 502 currently designated as the active set becomes full and, in response, the second set of buckets 504 can be assigned as the active set and the first set 502 can be assigned as the inactive set. At the second point in time, metadata updates can be destaged from the inactive first set of buckets 502 in volatile memory to the BE PDs 542 such as, for example, in the first phase of destaging as mentioned elsewhere herein. New metadata updates received subsequent to T2 while the bucket set 502 is inactive or destaged are stored in the set of buckets 504 designated as the currently active set of buckets. At a third point in time T3 subsequent to T2, the second set of buckets 504 currently designated as the active set becomes full, and in response, the first set of buckets 502 can be assigned as the active set and the second set 504 assigned as the inactive set. Metadata updates can now be destaged from the second set 504 designated as the inactive set while subsequent metadata updates are now stored in the first set 502 designated as the active set. The foregoing switching of roles of active and inactive between the two sets of buckets 502, 504 can be repeatedly performed in an ongoing manner where new metadata updates are stored in the currently designated active set and where metadata updates of the other currently designated inactive set are destaged from the volatile memory 501 to the BE PDs 542.

In at least one embodiment in accordance with the techniques herein, one or more sets of the metadata updates for the MD pages can be destaged in a first phase of destaging from the volatile memory 501 to the BE PDs 542 providing non-volatile backend storage. As mentioned above, metadata updates can be destaged in the first phase of destaging from the particular one of the bucket sets 502, 504 designated as the inactive set. Over time, multiple bucket sets 524 can be destaged from the volatile memory 501 (e.g., of each of the nodes) to the BE PDs 542 in the first phase of destaging. The destaged bucket sets 524 in this example include M destaged bucket sets indicating that M sets of Q buckets have been destaged from the volatile memory 501 (e.g., as included in each of the nodes) to the BE PDs 542, where the M destaged bucket sets 524 are awaiting further processing in the subsequent second phase of destaging.

The destaged bucket sets 524 of metadata updates for the MD pages can be stored and organized on the BE PDs in any suitable structures and organization. For example, each destaged bucket set of metadata updates for MD pages can be organized into buckets of bucket pages, where each bucket can correspond or map uniquely to a single MD page. For example, the bucket 1 520*a* of the destaged bucket set 1 520 can include metadata updates for the MD page A as noted above. The bucket (e.g., 520*a*) of one or more bucket pages associated with a single MD page (e.g., MD page A) can include one or more metadata changes made to the MD page, where the metadata changes can be represented as tuples in the volatile memory structure (e.g., bucket sets 502, 504) of the volatile memory 501. The metadata changes in each bucket, such as 520*a*, of 524 can be sorted based on insertion time and therefore denote the sorted increasing time order in which the metadata changes are applied to the MD page. In at least one embodiment, the bucket pages of each bucket of 524 can be organized as a list rather than, for example, a binary tree structure as described above in connection with the organization of metadata updates in the volatile memory 501. In at least one embodiment as denoted by the element 524, there can be multiple sets of metadata updates for MD pages stored on the BE PDs 542, where each of the multiple destaged bucket sets of 524 can denote a set of metadata updates destaged from the buckets sets 502, 504 of volatile memory at a different point in time.

In a second phase of destaging, metadata changes, updates or "deltas" from the multiple destaged bucket sets 524 made to the same single MD page can be aggregated and combined into a working set (sometimes referred to as a data container working set) of metadata updates for the MD page. The second phase of destaging can aggregate and combine the metadata updates for each MD page across the multiple destaged sets (520, 522) of metadata updates as stored on the BE PDs in the first phase of destaging. Thus a working set or merge set of metadata updates for a single MD page can denote aggregated metadata updates to the MD page, where the metadata updates can be located in the multiple destaged sets of updates 524 stored on the BE PDs 542. An existing or current version of the MD page can be read from the BE PDs. The working set of metadata changes for the MD page can be applied to, or combined with, the current MD page to thereby result in an updated version of the MD page. The updated MD page can then be persistently stored on the BE PDs replacing the prior current or existing version of the MD page.

To further illustrate, consider the MD page A 530 having an associated LI=1 that maps to the first bucket (e.g., 520a, 522a) in each of the M destaged bucket sets of 524. The second phase of destaging can aggregate and combine the metadata updates for the MD page A 530 from the first buckets (e.g., 520a, 522a) across the multiple M destaged sets 524 of metadata updates as stored on the BE PDs 542 in the first phase of destaging. The element 532a can denote the merge set of aggregated updates from the first buckets 520a, 522a of the destaged sets 524 for the MD page A 530. Thus the merge set or working set 532a of metadata updates for the MD page 530 can denote aggregated metadata updates to the MD page, where the metadata updates can be located in the multiple destaged sets 524 of updates stored on the BE PDs. An existing or current version 530 of the MD page can be read from the BE PDs. The merge set or working set 532a of metadata changes for the MD page A can be applied to (531) the current MD page A 530 to thereby generate (533) an updated version of the MD page A 536. The updated MD page 536 can then be persistently stored (535) on the MD page store 540 of the BE PDs replacing the prior current or existing version of the MD page 530.

Generally, the element 532 denotes the merge sets of aggregated metadata updates for all the MD pages. In this example, there are Q MD pages, where each of the Q MD pages can be uniquely associated with a corresponding one of the merge sets 532a-q based on the LI of each of the Q MD pages.

In at least one embodiment in accordance with the techniques herein, the metadata changes, updates or deltas can be recorded in the metadata log 510 The metadata log 510 can be stored in the non-volatile memory 503, such as non-volatile Random Access Memory (NVRAM). In some implementations, the metadata log 510 can store metadata updates in time order (e.g., sorted oldest to newest). In some implementations, the metadata log 510 can be used to recover and reconstruct in-memory structures, such as structures of the volatile memories of the nodes of the data storage system. The metadata log 510 can be used to perform such recovery or reconstruction of the in-memory structures, for example, in response to a failure of the volatile memory of a node, or in response to a restart or reboot of a node or data storage system.

In some implementations and in response to destaging or writing the one or more metadata changes from the volatile memory 501 to the BE PDs 542 in the first phase of destaging, processing can be performed to release or free the corresponding part of the metadata log storing the destaged metadata changes. In at least one embodiment, the persisted metadata log 510 can be implemented as a ring buffer. Ring buffers are generally known in the art. A ring buffer can be represented as a logical ring of records or entries. The ring buffer can be maintained using pointers, such as a head pointer and a tail pointer, where new entries of the ring can always be allocated from the head and space reclamation can be done from the tail. When an entry at the tail is flushed or destaged, the entry can be freed and thus reclaimed for reuse. The tail can be advanced as entries are flushed. In a similar manner, as entries are allocated, the head pointer is advanced. In at least one embodiment, entries from the metadata log 510 can be reclaimed as corresponding entries denoting the same metadata changes or deltas are destaged in the first phase of destaging from the in-memory metadata logs of the nodes (e.g., volatile memories 501 of the nodes) to the BE PDs 542. In such an embodiment, the destaging of metadata updates or changes as recorded in the in-memory metadata logs of the nodes can be synchronized with reclaiming corresponding entries from the persisted metadata log 510.

In at least one embodiment, when a single bucket set from volatile memory is destaged, corresponding entries from the persisted metadata log 510 stored in NVM 503 can also be reclaimed. In at least one embodiment, the destaging of an in-memory metadata log structure (e.g., such as a single bucket set 502) and reclaiming corresponding entries from the persisted metadata log 510 stored in NVM can be done atomically. In at least one embodiment, the metadata log 510 stored on the NVM can be a ring buffer as noted above where new metadata log 510 entries are added to the head and removed from the tail. In such an embodiment, the corresponding entries of the metadata log 510 can be reclaimed by moving the tail of the ring buffer to free the corresponding entries of the ring buffer. In such an embodiment, synchronization between the in-memory metadata logs of the nodes and the persisted metadata log 510 can be maintained so that flushing or destaging an in-memory metadata log in the first phase and reclaiming corresponding entries in the persisted metadata log 510 are done atomically. In particular in at least one embodiment, reinitializing or resetting the in-memory metadata log which has been destaged (e.g., in the first phase) can be performed atomically with movement of the tail of the metadata log 510 to reclaim corresponding entries for the destaged entries of the in-memory metadata log. It should be noted that in embodiments where a single entry of the persisted metadata log can be referenced across multiple bucket sets, the entry of the persisted metadata log cannot be reclaimed until all such references across the multiple bucket sets have been destaged or flushed in the first phase from volatile memory to the BE PDs 542.

A data storage system can perform different data services such as data deduplication discussed above to remove redundant or duplicate copies of data or content by storing a single copy of the user data and having multiple references or pointers to the same stored single copy. For example, the content or user data can be stored in a single data block that can be referenced by multiple logical addresses where the content of the data block is stored at all the multiple logical addresses.

In at least one system, updates to the MD page can be stored in the metadata log, where the logged MD update is persistently stored in the non-volatile memory metadata log 510 (stored in non-volatile storage 503 which can be NVM-RAM) and where the logged MD update is also stored in an in-memory log structure, such as an active one of the bucket sets 502, 504 stored in each node's local volatile memory. In the in-memory log structure in at least one embodiment, each individual update to a particular MD page can be recorded as a separate entry in a bucket of updates associated with the particular MD page. Subsequently, the updates to the MD page as recorded in the in-memory metadata log can be destaged and applied to a persistently stored copy of the MD page. Logging the MD updates such as to the reference count of the MD page can result in improved performance.

In at least one embodiment consistent with other discussion herein, the non-volatile metadata log 510 can be implemented as a ring buffer.

Figure 6F:
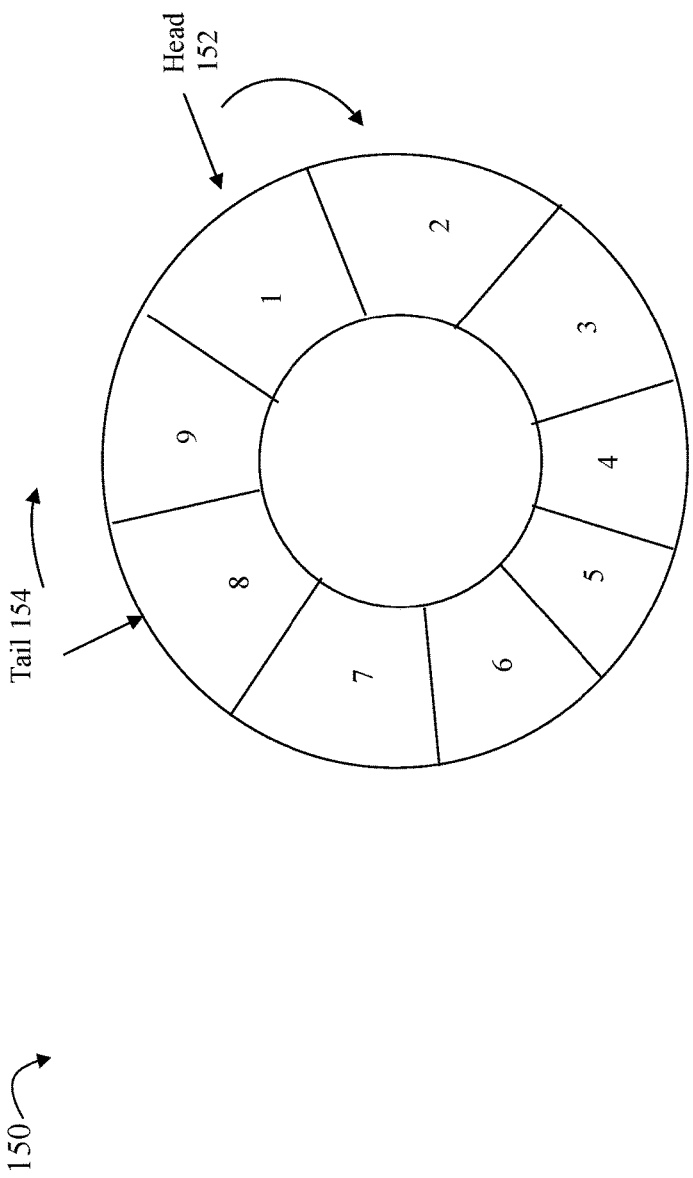
FIG. 6F is an example of a ring buffer in at least one embodiment in accordance with the techniques of the present disclosure.

Referring to FIG. 6F, shown is an example 150 illustrating a ring buffer used in implemented the non-volatile metadata log 510 in at least one embodiment in accordance with the techniques of the present disclosure.

The ring buffer 150 can be managed using the head pointer 152 and the tail pointer 154. Both pointers are advanced in the clockwise flow in this example. Entries are allocated from the head of the list as denoted by the head pointer 152. For example, the entry 1 can be allocated by the head pointer 152. Subsequently, the head pointer 152 is advanced to the entry 2 since entry 2 is the next entry to be allocated when needed. The tail pointer 154 can denote the entry in the ring buffer that is to be flushed next or is currently being flushed. For example, the tail pointer 154 is currently pointing to entry 8. Once entry 8 is flushed, the tail pointer 154 is advanced to entry 9 that is flushed. The ring buffer allocates new entries in a FIFO (first in first out) manner from the head pointer based on the sequential positioning in the buffer as denoted by the entry numbers 1 through 9. In at least one embodiment for ring buffer management, both the "full" and "empty" cases of the ring buffer can look the same where the head pointer 152 and the tail pointer are equal or point to the same entry in the ring buffer. In the full case, all entries in the ring buffer are allocated and in the empty case, all entries in the ring buffer are free or available for use. Any suitable technique can be used to distinguish between the full and empty ring buffer cases when the head pointer and the tail pointer point to the same entry. For example, a count can be maintained for the ring buffer denoting the number of allocated entries. The count can be initialized to 0, incremented each time an entry is allocated by the head pointer advancing, and decremented each time an entry is flushed and reclaimed by advancing the tail pointer.

In at least one embodiment, the ring buffer can be implemented using an array where, for example, the entries 1 through 9 as in FIG. 6F correspond to array indices. The circular nature of the ring buffer can be implemented using the linear array by considering the sequential array indices as if connected end to end or as a contiguous sequential array of elements. Once the head or tail pointer reaches entry 9, the head or tail pointer continues with the next entry in the sequence which is entry 1. In this manner the entries or indices of the linear array form a logical loop or ring as illustrated in the FIG. 6F.

A data storage system can provide different data replication technologies, facilities or services. Such replication technologies can be characterized as local or remote. A replication technology can provide for creating a complete, physical bit for bit copy of data (that is local and/or remote). A replication technology can provide for creating a logical or virtual point in time copy of a data source such as using a snapshot technology or facility known in the art. Such logical copies of a data source are not a complete physical copy of the data source. Rather, different techniques such as a snapshot technique can be used to create a logical or virtual copy of the data source. For example, a snapshot facility can be used to create a snapshot characterized as a logical point in time copy of data. In connection with a logical device, or more generally any storage object or entity, software of a data storage system can provide one or more data replication services or facilities whereby a snapshot is one such facility that can be used to create point in time snapshot of a logical device such as a LUN for non-disruptive backup. A snapshot can appear like a normal logical device and can be used for backup, testing, and the like. The snapshot facility can be characterized as a local replication facility or service that takes snapshots of storage objects in a single data storage system. A local replication facility can be contrasted with a remote replication facility that provides for remote replication of storage objects from a source site or data storage system to a remote site or data storage system. Remote replication facilities provide remote copies of the storage objects for use in connection with data unavailability or disaster of the source site.

Snapshots can rely, for example, on copy on first write (COFW) and other techniques to track source logical device changes from the time when a snapshot was created. Any writes to the source logical device may result in processing by snapshot software, for example, to copy the original data prior to changes into another area of storage before overwriting the source logical device location with the newly written data (e.g., original data is copied/written to a new location). With respect to COFW techniques, the COFW occurs only once for each data block modified on the source device. Since only changed data blocks of the source device are retained rather than make a complete copy of the source device, the storage capacity required to implement snapshots may be considerably less than that of the source device. Though a snapshot of a source logical device may be presented to a user as a separate logical device along with the current source logical device, a snapshot of the source logical device is a virtual point in time copy and requires access to the unchanged data in the source logical device. Therefore failures affecting the source logical device also affect the snapshot of the source logical device. Snapshots of a source logical device can be contrasted, for example, with the physically complete bit-for-bit replicas of the source logical device.

In connection with the foregoing, COFW is only one example of a technology or a technique that can be used in connection with snapshots. More generally, any suitable technique can be used in connection with snapshot creation and techniques described herein. As another example, redirect on Write (ROW) is another technique that can be used in connection with a snapshot implementation. With ROW, after a snapshot is taken, new writes to the primary or source logical device are redirected (written) to a new location.

A data storage system can also provide a remote replication facility that automatically replicates a storage object or entity of a first or source data storage system to a second or remote data storage system. Such remote replication can be performed in an ongoing continuous manner with respect to changes made over time to the storage object of the source system. Consistent with other discussion herein, the storage object of a replication service or facility, both local and remote, can be, for example, a logical device or LUN, a file, file system, and the like. A remote replication facility can automatically mirror or replicate all writes performed to the source storage object on the first system to a duplicate target storage object on the remote second data storage system. In connection with source and target storage objects that are logical devices, the source and target logical devices can be configured to have the same identity (from the perspective and use of the host or other storage client), as well as the same size or capacity as well as have other matching characteristics in order to have the target logical device be identified to the host as the same logical device as the source logical device. In this manner, the target logical device on the second or target data storage system can be used in the event of data unavailability or a disaster at the first data storage system. Generally, each logical device of the source system can be similarly configured for replication on the target system.

In at least one embodiment, the remote replication facility can provide one or more supported replication modes such as asynchronous remote replication and synchronous remote replication. With remote replication, the source system can receive a write to a source storage object configured to have a corresponding target storage object on the remote or target system. The write data can be stored on the source system, such as recorded in the log and cache, and then later destaged or written out, such as from the cache, to a physical location on the backend PDs of the source system provisioned for the source storage object. With asynchronous remote replication, an acknowledgement regarding completion of the write I/O operation can be returned to the host or other client that originated the write I/O operation once the write data of the write I/O operation has been stored in the cache and/or log of the source system.

With synchronous remote replication, an acknowledgement is not returned to the host or other client that originated the write I/O operation until the target system has acknowledged receipt of the replicated write I/O operation on the target system. With remote replication, the write data is transferred from the source system to the remote target system for replication on the target storage object. Responsive to receiving the write data transferred from the source system to the remote target system, the write data can be stored in a log and cache of the target system. At a later point in time, the write data can destaged or written out from the cache of the target system to a physical location on the BE PDs of the target system provisioned for the target storage object. The target system can send an acknowledgement regarding successful completion of the write I/O operation on the target system once the data written by the write operation has been stored in the log and/or cache of the target system. With synchronous replication, the host or other client originating the write I/O operation can be sent an acknowledgement regarding completion of the write I/O operation responsive to the source system receiving the foregoing acknowledgement regarding successful receipt of the replicated write I/O operation from the target system. Asynchronous replication mode can be preferred for longer distances between the source and target systems to minimize time outs occurring on an external host waiting to receive the acknowledgement from the source system regarding completion of the write I/O operation. Consistent with discussion above regarding, with asynchronous remote replication, an acknowledgement regarding completion of the write I/O operation can be returned to the host or other client that originated the write I/O operation once the write data of the write I/O operation has been stored in the cache and/or log of the source system rather than sending the acknowledgement to the host as in synchronous replication only after receiving an acknowledgement from the target system regarding receipt of the write I/O operation.

In at least one data storage system, remote data replication (also referred to as remote replication) is one technique that can be used in connection with providing for disaster recovery (DR) of an application's data set. The application, such as executing on a host, can write to a production or primary data set of one or more LUNs on a primary data storage system. Remote replication can be used to remotely replicate the primary data set of LUNs to a second remote data storage system. In the event that the primary data set on the primary data storage system is destroyed or more generally unavailable for use by the application, the replicated copy of the data set on the second remote data storage system can be utilized by the host. For example, the host can directly access the copy of the data set on the second remote system. As an alternative, the primary data set of the primary data storage system can be restored using the replicated copy of the data set, whereby the host can subsequently access the restored data set on the primary data storage system. A remote data replication service or facility can provide for automatically replicating data of the primary data set on a first data storage system to a second remote data storage system in an ongoing manner in accordance with a particular replication mode, such as a the asynchronous and synchronous modes described above.

In at least one existing data storage system, the remote replication can be performed by a remote replication facility executing on the source system where the remote replication facility can use a technique referred to as a snapshot difference or snap diff technique. The snap diff technique provides for taking two successive snapshots of the logical device or other storage object on the source system that is replicated on the target system, and then determining the data difference with respect to the two successive snapshots. The data difference denotes the data blocks that have been written or modified in the time interval from a first point in time to a second later point in time, where a first snapshot is taken at the first point in time and a second successive snapshot is taken at the second point in time. The time interval may correspond, for example, to a recovery point objective (RPO) defined as the maximum amount of allowable data loss, as measured by time, that can be lost after a recovery from a disaster, failure, or comparable event before data loss will exceed what is acceptable to an organization. The snap diff technique can provide for taking a snapshot at each RPO interval. For example, for an RPO of 5 hours, a snapshot of the logical device can be taken on the source system every 5 hours and compared to the immediately prior snapshot to determine the data differences including data blocks that have been modified since the immediately prior snapshot. The data differences including the modified or newly written data blocks of the logical device are then transferred from the source system to the target system and applied to the remote copy of the logical device on the target or remote system.

The snap diff technique, and more generally creating and use snapshots, can be characterized as expensive generally having significant processing overhead. For example, in one embodiment of remote replication using the snap diff technique, creating a snapshot can include enforcing barriers used to denote points in time between writes where the writes between two such barriers can denote the writes included in a particular snapshot instance. In such an embodiment in which writes from a log are flushed to backend (BE) non-volatile storage, the recorded writes in the log between two barriers can denote the recorded writes of the log for a single snapshot. In some systems, flushing of recorded writes of the log can occur in parallel by multiple flushing threads. Additional dependencies and overhead can be incurred when enforcing such barriers and when synchronizing and flushing the log records by the multiple flushing threads. In at least one system, snapshot creation can also require allocating new metadata pages used with the snapshot. Additionally, once a particular snapshot used with replication is no longer needed, additional processing overhead can be incurred in connection with other operations such as deleting the snapshot.

High processing costs can be incurred in connection with accessing data on the source system that is to be replicated to the target system, for example, in the event of a cache miss with respect to the data to be replicated. Replication processing on the source system can replicate write data stored in the cache. If the write data is not stored in the cache at the time needed for the replication processing, a cache miss occurs and the write data (denoting a modified data portion or block) is then accessed from the BE non-volatile storage. For example, in at least one system, the write data can remain in the cache until it is flushed from the log to the BE non-volatile storage. On the source system, snapshots can be created in connection with the snap diff technique with respect to a storage object, such as a logical device, while also flushing the write data stored in the cache for the same logical device. In some instances, the write data can be flushed from the cache and log before the write data has been replicated to the remote target system. In this case, when the time arrives to replicate the write data from the source system to the remote system, replication processing on the source system experiences a cache miss with respect to the write data and must then read the write data from the BE non-volatile storage. Reading the write data from the BE non-volatile storage can be an expensive processing operation as compared to reading the write data from the cache. For example in at least one existing system, accessing the write data on the BE non-volatile storage can require reading multiple layers of mapping information to identify the particular storage location of the write data on the BE non-volatile storage. Additionally, cache misses can result when attempting to read the foregoing mapping information since the mapping information is also required to be in cache in order to be read and used to identify the storage location of the write data on the BE non-volatile storage.

Some existing solutions can include a general approach of maintaining and using an additional dedicated persistent replication log to persistently store entries of the log of user data or operations (e.g., as in FIGS. 3, 4, 5 and 6A (e.g., also sometimes referred to as a user data (UD) log). The dedicated replication log can be in addition to the UD log. The dedicated replication log can be used solely to persistently store entries of the user data log which have not yet been replicated from the source system to the target system. Implementation of solutions including such a dedicated persistent replication log can have associated complexity and overhead with maintaining and using such a separate log.

To overcome the foregoing drawbacks, described in the following paragraphs are techniques used to provide efficient data replication without using a separate additional persistent replication log on the source system.

With reference back to FIG. 6E, in the following paragraphs the non-volatile metadata log 510 or the persisted metadata log or journal may also be referred to as an RDL or raw persisted or non-volatile MD data log; and a single bucket set, such as each of 502 and 504, of the volatile in-memory metadata log, may also be referred to an HBSB (hash-based sorted buckets). Thus, consistent with discussion above such as with reference back to FIG. 6E, each node can have an active HBSB, such as bucket set 502, and an inactive or destaging HBSB, such as bucket set 504. A pair of HBSBs including an active bucket set and an inactive or destaging bucket set, may also be referred to as an in-memory or volatile memory MD log denoting a single instance of an in-memory MD log. Thus, as shown in FIG. 6E, a storage node can write copies of delta updates as tuples to both the in-memory MD log and also the RDL. The RDL can persistently store the respective tuples, deltas or MD updates in a time order sequence such as from older to newest. In contrast, MD updates, deltas or tuples stored in the in-memory MD log local to a storage node can be organized in a different manner to facilitate efficient and quick retrieval organized in hash buckets as discussed elsewhere herein. Within each hash bucket including MD updates for a single corresponding MD page, the MD updates, deltas or tuples can be organized in any suitable manner such as in a time order sequence based on when the MD updates are received at the storage node.

In at least one existing data storage system such as with a dual node configuration, each storage node can maintain a single local instance of an in-memory MD log where both nodes can share a single instance of the RDL. In the event of disaster, data loss and/or data corruption, a storage node can replay the RDL to apply delta update tuples stored in the RDL to the node's local in-memory MD log to thereby restore or recover the node's in-memory MD log to a valid and consistent state.

In at least one embodiment, the techniques of the present disclosure can use the existing MD log and infrastructure such as described in connection with FIG. 6E to track logged entries (e.g., write I/Os and associated data) which have been flushed from the UD log but not yet replicated from the source system to the target system. In at least one embodiment, the techniques of the present disclosure can use a MD log as described herein which includes both a persistent MD log such as the RDL 510, as well as a per node in-memory or volatile MD log such as one including the HBSBs 502, 504.

In at least one embodiment, a new MD log tuple or delta type can be utilized and stored in the RDL and in-memory MD log for logged or recorded write I/O data or content of the UD log which has been flushed from the UD log of the source system, but which has not yet been replicated from the source system to the target system. The new delta type can provide a direct mapping from a UD logical address to a physical storage location of content stored at the UD logical address. The UD logical address can be expressed as a LUN or volume and offset or LBA within the logical address space of the LUN or volume. The physical storage location can be a physical large block (PLB) denoting physical storage on a BE PD where the content is stored. The new MD delta type can be denoted herein as a logical address (LA) to PLB type that contains the direct mapping to the PLB or physical storage location storing content of a particular UD logical address. In this manner, the information of a MD delta or tuple of the new MD delta type, LA to PLB type, can be used as a short cut to access content stored at a particular UD logical address without requiring traversal of the chain of MD pages of mapping information (e.g., as discussed in connection with FIGS. 5, 6A-6D which map the logical address to the physical location storing the content of the logical address) when replicating. Thus, the LA to PLB type of MD log tuple or delta can be used with the MD log to denote write or modified data which has been flushed but which still needs to be replicated from the source system to the target system. The LA to PLB MD log tuples or deltas can facilitate accessing the write or modified data in an efficient manner without using the chain of MD pages of mapping information. In at least one embodiment, the new MD log tuple or delta type of LA to PLB can be aggregated together with other MD updates in the same flush transaction. In at least one embodiment, the average lifetime of a metadata log entry can be greater than the average lifetime of an entry in the UD log.

In at least one embodiment, rather than introduce the new MD log tuple or delta type of LA to PLB, the embodiment may include an existing MD log tuple or delta type which can be further extended or expanded in terms of usage to store the same information as described herein by the LA to PLB type tuple.

In at least one embodiment, the techniques of the present disclosure can be used for efficient asynchronous replication of data with a high RPO and minimal performance impact. In at least one embodiment, the techniques of the present disclosure can be performed without using the expensive snap diff on the source system and with the source system omitting expensive processing to actually construct a snapshot including its associated metadata structures. In at least one embodiment, the techniques of the present disclosure can be performed without using the expensive snap diff technique and without actually creating a snapshot with all its required metadata on the source system. In at least one embodiment, semantics associated with the snapshot, such as checkpoint or barrier records of the UD log or transaction log, MD log and replication queue, can be used to specify snapshot semantics such as, for example, for transactional write consistency across one or more LUNs, without actually constructing the metadata and other structures implementing the snapshot on the source system. In at least one embodiment, an additional new MD log delta or tuple type, the checkpoint delta, can be used to denote a barrier, checkpoint or snapshot record or command which has been flushed from the UD log but not yet replicated to from the source to the target system.

The foregoing and other aspects of the techniques of the present disclosure are described in more detail in the following paragraphs.

Figure 7:
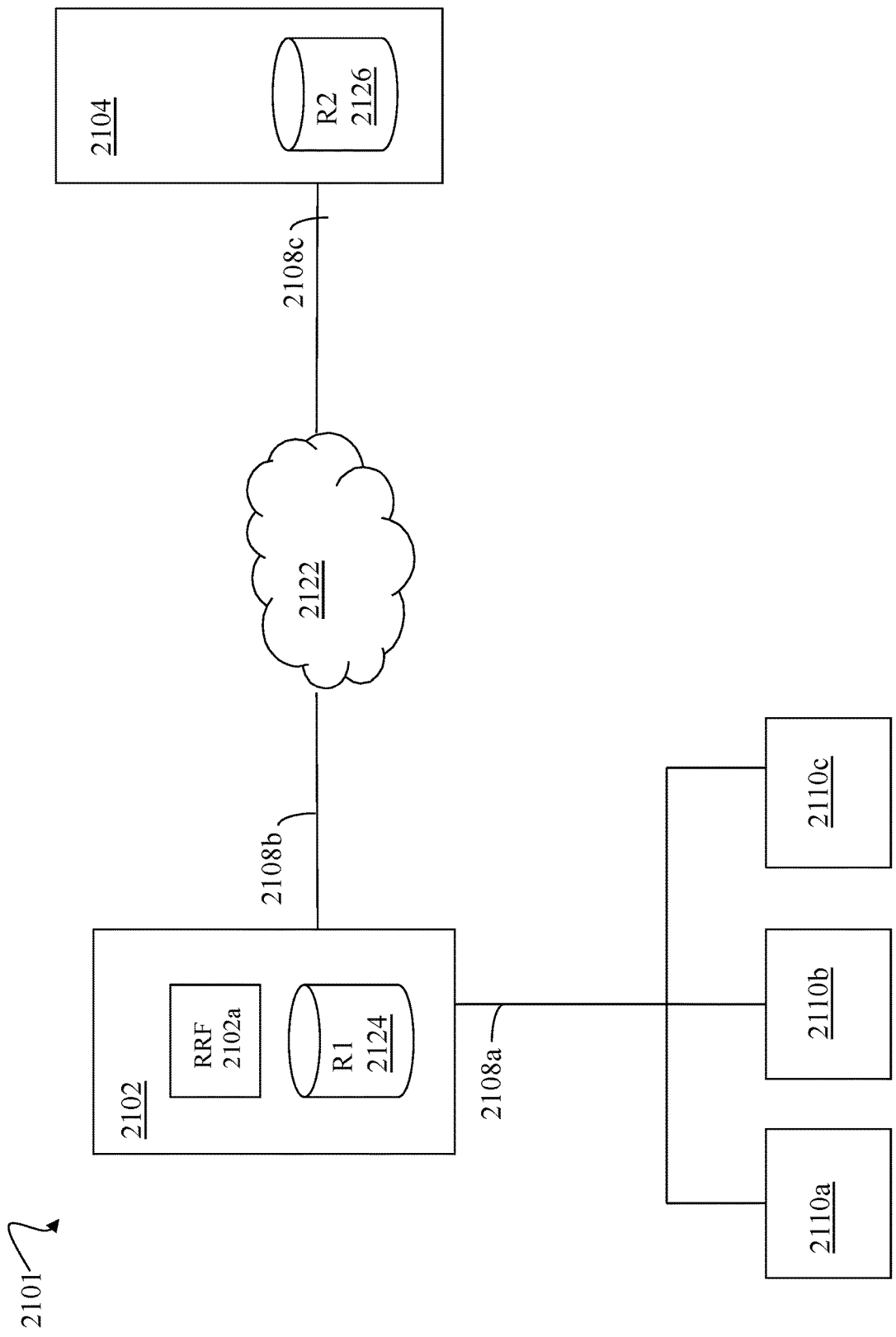
FIG. 7 is an example illustrating a configuration of systems in connection with performing remote replication in at least one embodiment in accordance with the techniques of the present disclosure.

Referring to FIG. 7, shown is an example 2101 illustrating remote data replication in at least one embodiment in accordance with the techniques of the present disclosure. It should be noted that the embodiment illustrated in FIG. 7 presents a simplified view of some of the components illustrated in FIGS. 1 and 2, for example, including only some detail of the data storage systems 12 for the sake of illustration.

Included in the example 2101 are the data storage systems 2102 and 2104 and the hosts 2110a, 2110b and 1210c. The data storage systems 2102, 2104 can be remotely connected and communicate over the network 2122, such as the Internet or other private network, and facilitate communications with the components connected thereto. The hosts 2110a, 2110b and 2110c can perform operations to the data storage system 2102 over the connection 2108a. The hosts 2110a, 2110b and 2110c may be connected to the data storage system 2102 through the connection 2108a which can be, for example, a network or other type of communication connection.

The data storage systems 2102 and 2104 can include one or more devices. In this example, the data storage system 2102 includes the storage device R1 2124, and the data storage system 104 includes the storage device R2 2126. Both of the data storage systems 2102, 2104 can include one or more other logical and/or physical devices. The data storage system 2102 can be characterized as local with respect to the hosts 2110a, 2110b and 2110c. The data storage system 104 can be characterized as remote with respect to the hosts 2110a, 2110b and 2110c.

The host 1210a can issue a command, such as to write data to the device R1 of the data storage system 2102. In some instances, it can be desirable to copy data from the storage device R1 to another second storage device, such as R2, provided in a different location so that if a disaster occurs that renders R1 inoperable, the host (or another host) can resume operation using the data of R2. With remote replication, a user can denote a first storage device, such as R1, as a primary storage device and a second storage device, such as R2, as a secondary storage device. In this example, the host 2110a interacts directly with the device R1 of the data storage system 2102, and any data changes made are automatically provided to the R2 device of the data storage system 2104 by a remote replication facility (RRF) 2102a. In operation, the host 110a can read and write data using the R1 volume in 2102, and the RRF can handle the automatic copying and updating of data from R1 to R2 in the data storage system 2104. Communications between the storage systems 2102 and 2104 can be made over connections 2108b, 2108c to the network 2122.

The R1 and R2 devices can be configured as LUNs. For example, R1 and R2 can be configured to have the same LUN identity from the perspective of hosts 2110a-c. For example, R1 can be the primary copy of a LUN, such as LUN A, for which a backup copy is made using remote replication to the R2 device, also configured as the same LUN A. In the event of a disaster where R1 is destroyed or unavailable and the hosts have to continue issuing I/Os using the R2 device, the hosts can continue issuing I/Os to the same LUN A using R2.

The RRF 2102a can be configured to operate in one or more different supported replication modes such as, for example, the synchronous mode and the asynchronous mode, as discussed above. Consistent with other discussion herein, when operating in the synchronous mode, the host does not consider a write I/O operation to be complete until the write I/O has been completed on both the first and second data storage systems. Thus, in the synchronous mode, the first or source storage system 2102 will not provide an indication to the host that the write operation is committed or complete until the first storage system 2102 receives an acknowledgement from the second remote or target data storage system 2104 regarding receipt of the replicated write by the second data storage system. In contrast, in connection with the asynchronous mode, the host receives an acknowledgement from the first data storage system 2102 as soon as the information is stored, such as in the cache and log, on the first data storage system 2102 without waiting for the acknowledgement of the replicated write from the second data storage system 2104.

With synchronous mode remote data replication, a host 2110a can issue a write to the R1 device 2124. The primary, source or R1 data storage system 2102 may record the write data in its log as discussed, for example, in connection with FIGS. 3-6A, and also in the cache of the source system 2102. The RRF operating in the synchronous mode can propagate the write data across an established connection or link (more generally referred to as the remote replication link or link) such as over 2108b, 2122, and 2108c, to the target, secondary or R2 data storage system 2104 where the write data can be stored in the log and cache of the system 2104. Once the write data is stored in the log and cache of the system 2104, the R2 data storage system 2104 can return an acknowledgement to the R1 data storage system 2102 that it has received the write data. Responsive to receiving this acknowledgement from the R2 data storage system 2104, the R1 data storage system 2102 can return an acknowledgement to the host 2110a that the write has been received and completed. With synchronous replication, the R1 device 2124 and the R2 device 2126 are fully mirrored but can result in a high I/O latency and response time (e.g., since the I/O latency and response time includes the time needed to replicate the write data from the source to the target system and also return an acknowledgement from the target to the source system regarding receipt of the write data). Generally, synchronous replication can be performed with a replication link or connection between the systems 2102 and 2104 that is reliable and has a high transmission speed.

With asynchronous replication mode, the R1 system 2102 can return the acknowledgement to the host 2110a regarding completion of the write immediately after the R1 system 2102 has stored the write data in its log and cache. In this manner with asynchronous replication, the R1 system 2102 does not wait for the return acknowledgement from the R2 system 2104 before returning the acknowledgement of write completion to the host 2110a. With asynchronous replication, there is always some time lag and thus a data difference or delta between the R1 device 2124 and the R2 device 2126. With asynchronous replication, the R2 device 2126 of the R2 system 2104 always lags behind the R2 device 2124 of the R1 system 2102 by some portion of the most recent data updates defined by the granularity of the replication. Asynchronous replication, in comparison to synchronous replication provides lower I/O latency and lower I/O response time and is much less sensitive to the replication link quality and transmission speed.

Generally, the R1 device 2124 and R2 device 2126 can be logical devices, such as LUNs, configured to have the same LUN identity to the host or other storage client. The R1 and R2 devices can be, for example, fully provisioned LUNs, such as thick LUNs, or may be LUNs that are thin or virtually provisioned logical devices.

In at least one embodiment, the techniques of the present disclosure can be used in connection with the RRF 2102a performing asynchronous replication as described above, for example, in connection with FIG. 7 with remote replication operating in the asynchronous replication mode. Additionally, in at least one embodiment, the systems 2102 and 2104 can be log based systems which record writes in the log of the respective systems, for example, as described in connection with FIGS. 3-6A. In such systems, write data can be record in the log and also stored in the cache. Subsequently, the write data can be flushed from the log to the BE PDs. In such systems in at least one embodiment, data written to the BE PDs can be copied from cache whereby, when flushing the write data from the log, the cached copy of the write data can be flushed from the cache to the BE PDs. Generally, consistent with other discussion herein, data can be written to and read from a BE PD utilizing a cache or caching layer. BE read operations read data from the BE PDs and store the read data in the cache, and BE write operations write data from the cache to the BE PDs.

In at least one embodiment using the techniques of the present disclosure, asynchronous replication of the R1 device 2124 of the R1 system 2102 to the R2 device 2126 of the R2 system 2104 can be performed in an ongoing continuous manner while, in parallel, one or more storage system clients, such as one or more of the external hosts 2110a-c, continue to issue read and write operations to the R1 device 2124 of the R1 system 2102.

Remote replication is illustrated in FIG. 7 with respect to a single object, such as single source LUN denotes as the R1 device 2124 having a corresponding remote counterpart LUN denotes as the R2 device 2126. In some instances, write consistency and dependency can be preserved with respect to consistency group (CG) identifying a group of storage resources or objects, such as two or more LUNs, which operate in unison to preserve the integrity and dependent write consistency of data distributed across all LUNs of the CG. Thus, write consistency can be maintained across and with respect to all LUNs (or more generally all resources or objects) of CG whereby, for example, all members of the CG denote a copy of data with respect to a same point in time. In at least one embodiment, a CG can be a set of LUNs which are replicated together for which write order fidelity is preserved. A CG can be used, for example, in connection with a write transaction that performs multiple writes to two or more LUNs of the same CG. It can be required for certain applications, such as a database application, which issues the multiple writes of the write transaction to two or more LUNs for all such multiple writes of the single write transaction to be applied atomically across the two or more LUNs of the CG. In this manner from the client application view point, the content of the LUNs of the CG need to reflect application of all writes of the entire write transaction, or otherwise have content in which none of the writes of the write transaction are applied to the LUNs of the CG. In connection with a snapshot taken at a point in time, a single snapshot can include all writes of the single write transaction in order to reflect and maintain the write consistency of the write transaction across the two or more LUNs of the CG. In at least one embodiment, the multiple writes of the single transaction to multiple LUNs of the CG can be included in the same single snapshot. In at least one embodiment recording writes in a log as described, for example, in connection with FIGS. 3-6A, the multiple writes can be between two checkpoints. In this manner in at least one embodiment, a checkpoint can denote a boundary in the log in connection with writes included in a single snapshot. More generally, writes in the log between two successive checkpoints can denote writes applied across one or more LUNs to maintain any desired write consistency with respect to the one or more LUNs. Writes in the log between two successive checkpoints can denote semantics for writes included in the same snapshot. Writes not within the same two successive checkpoints or writes that cross checkpoints or boundaries denote writes in different snapshots.

In at least one embodiment, writes recorded, such as in the log, between two checkpoints or barriers can denote the writes made to LUNs in a CG providing a transactionally consistent view across all LUNs of the CG. Thus in such an embodiment, all writes between the two successive checkpoints can be applied atomically to the LUNs of the CG to provide a transactionally consistent view with respect to multiple writes of each single transaction.

In at least one embodiment in accordance with the techniques of the present disclosure, use of the snap diff technique by the source R1 system 2102 can be avoided or omitted. Generally, the snapshot is one technique or tool that can be used to provide any needed synchronization and consistency to provide a transactionally consistent view across a CG. As discussed in more detail, the techniques of the present disclosure can provide for a transactionally consistent view across all LUNs of the CG using semantics of checkpoint records represent checkpoint commands without having the source R1 system 2102 use the snap diff technique and without the R1 system 2102 instantiating or creating a snapshot.

In at least one embodiment, the source or R1 system 2102 can utilize the techniques of the present disclosure for asynchronous remote replication. In at least one embodiment, the destination or remote R2 system 2104 can continue to utilize an existing legacy technique. For example, in at least one embodiment, the R2 system 2104 can continue to create and use successive snapshots based on replicated write data received from the R1 system 2102. For example, writes made to the R1 device 2124 can be replicated from the R1 system 2102 to the R2 system 2104. The writes can generally be included in a logical stream denoting a time order in which the writes (made to the R1 device) are to be applied to the R2 device 2124. The logical stream can also include checkpoint command records each denoting a checkpoint in the stream such that replicated writes/replicated write data can be included between pairs of successive checkpoint records in the stream. The R2 system 2104 can create multiple single snapshots each including all replicated writes between a pair of two successive checkpoints in the stream where such replicated writes were made to the R1 device 2124 and are now to be applied to the R2 device 2126. More generally, the logical stream can include writes directed to multiple LUNs of a CG, where the logical stream can include more than two checkpoints thereby denoting writes incorporated by the R2 system 2104 into two or more snapshots. Generally, the writes between two successive checkpoint records such as in the logical stream sent to the R2 system can denote barriers which can be used, for example, to create snapshots on the R2 system, and more generally, to provide semantics for transactional write consistency (e.g., where the checkpoints can denote the bounds or barriers of a write transaction for which all writes between two successive checkpoints can be applied).

In at least one embodiment in which there are no CGs, or more generally, where there is not such write dependencies among multiple LUNs or other objects (e.g., no write transaction consistency across multiple LUNs or objects), the replicated writes received at the R2 system 2104 from the source R1 system 2102 can be directly applied to the remote R2 LUNs or other objects on the system 2104 without the need for utilizing snapshots or other techniques to synchronize and apply the replicated writes in a transactionally consistent manner. In such an embodiment, the stream of replicated writes received at the R2 system 2104 may not include any checkpoint or barrier records.

In at least one embodiment in accordance with the techniques of the present disclosure, write data of write operations recorded in the UD log can be guaranteed to be in the cache until such recorded write operations are flushed from the UD log. After the record of a write operation is flushed from the UD log, the write data of the write operation can be evicted or removed from the cache, for example, such as based on the particular cache management and eviction policy of the cache. The write data may, for example, remain in the cache for some amount of time subsequent to the associated write operation record being flushed from the log.

The UD log, such as described in connection with FIGS. 3-6A to record write operations, can also be referred to herein as a transaction log.

In at least one embodiment on the source R1 system 2102, the techniques of the present disclosure can maintain and utilize MD log deltas or entries to track desired content and operations, such as write data, write operations and/or barrier or checkpoint commands, having corresponding records of the transaction log that have been flushed from the transaction log but where such content and operations have not yet been replicated to the R2 system 2104. In at least one embodiment, the LA to PLB tuples of the MD log can include direct pointers or addresses to write data as stored in storage locations on the BE PDs. In this manner, the LA to PLB type tuples of the MD log of the source R1 system can be used to directly and efficiently access the write data for recorded write I/Os which have been flushed from the log and where such write data can be removed or evicted from cache prior to being replicated. The direct pointers or addresses of LA to PLB tuples of the MD log can be used to directly and efficiently retrieve such write data from the BE PDs and store the write data in the cache as needed during replication processing without performing more expensive operations to access the write data from the BE PDs using the mapping information or chain of MD pages. In at least one embodiment, the replication processing can retrieve the write data to be replicated from the cache. Thus, replication processing on the source R1 system 2102 in such an embodiment needs the write data to be stored in the cache of the source R1 system 2012 in order for the source R1 system 2102 to proceed with replicating the write data to the remote destination R2 system 2104.

In at least one embodiment, the techniques of the present disclosure do not perform the snap diff technique on the source R1 system 2102. In at least one embodiment, the MDlog of the source R1 system 2102 can track writes and the associated write replication order along with barrier or checkpoint operations denoting the logical order in which the writes are to be applied to remote counterpart R2 LUNs or objects on the R2 system 2104.

In at least one embodiment, the techniques of the present disclosure as used in connection with the MD log on the source R1 system 2102 allow for flexibility with respect to techniques used by the remote destination R2 system 2104 to apply the received replicated writes to the R2 LUNs or other objects. Put another way, the R2 system 2104 can be unaware of whether the R1 system 2102 uses the techniques of the present disclosure or the snap diff technique. In at least one embodiment, the R2 system 2104 can form and build snapshots from the received replicated writes from the R1 system 2102. In at least one embodiment, the R2 system 2104 can maintain and/or apply the writes of individual snapshots to corresponding R2 LUNs or objects of the R2 system 2104. In at least one embodiment, the R2 system 2104 can use the replicated checkpoint command records to apply writes across one or more LUNs in a transactionally consistent manner.

What will now be described are data structures and related processing that can be performed on the source R1 system in at least one embodiment in accordance with the techniques of the present disclosure.

Figure 8:
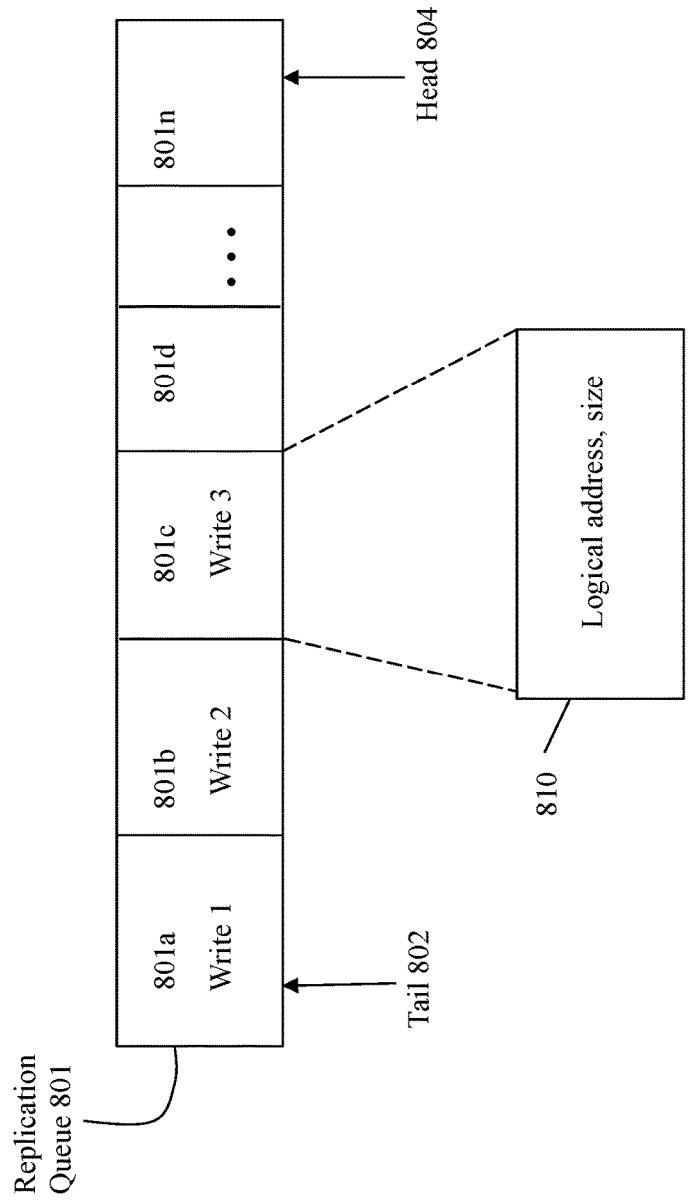
FIGS. 8, 9, 10 and 11 are examples illustrating various structures in at least one embodiment in accordance with the techniques of the present disclosure.

Referring to FIG. 8, shown is an example 800 of a replication queue 801 that can be used in at least one embodiment in accordance with the techniques of the present disclosure.

In at least one embodiment, the replication queue 801 can be implemented as a single queue including write I/Os received at the data storage system, where such write I/Os are directed to LUNs or volumes for which asynchronous replication using the techniques of the present disclosure has been enabled and is being performed. As a variation, rather than the single queue 801, a separate replication queue including write I/Os can be maintained on a per LUN or volume basis.

In the example 800, a new entry can be added to the replication queue 801 for each write I/O received at the source R1 system 2102, where the write is directed to one of the LUNs for which asynchronous replication using the techniques of the present disclosure has been enabled and is being performed. The replication queue 801 can be a FIFO (first in first out) queue with a tail pointer 802 to the oldest entry of the queue 801 and a head pointer 804 to the youngest or most recently added entry of the queue 801. In the example 800, new entries can be added to the head 804 of the queue 801 as new writes to LUNs configured for asynchronous remote replication are received by the source R1 system 2102. As records are removed from the tail 802 of the replication queue 801, for example, as recorded write data of such entries at the tail 802 are replicated from the source R1 system 2102 to the remote destination R2 system 2104, such entries can be removed from the tail 802 of the replication queue 801 and reused.

In at least one embodiment, each entry of the replication queue 801 corresponding to a received write of a LUN configured for asynchronous remote replication can identify the logical address of the write and the size of the write data. Thus the logical address can denote the target logical address where write data is written. The size can denote the write data payload size or amount of the write data written by the write operation. Any suitable size or storage unit can be utilized and recorded in entries of the replication queue 801 for received write I/Os directed to LUNs configured for asynchronous remote replication. The element 810 illustrates the foregoing logical address and size that can be included in the entry 801c of the replication queue 801. More generally, each entry 801a-n of the replication queue 801 corresponding to a received write I/O received at the source R1 system 2102 can include the information as illustrated in more detail by the element 810.

In at least one embodiment having a single replication queue 801 including writes directed to all LUNs configured for asynchronous replication on the source R1 system, the logical address of entry 810 for each such recorded write in the queue 801 can denote both the volume or LUN and the LBA or offset on the volume or LUN. In at least one embodiment, the received write corresponding to the entry 801c can identify the target logical address using a LUN and LBA recorded as the logical address of 810. Additionally, the received write corresponding to the entry 801c can identify the size of the write data payload, where the size can be recorded as the size of 810.

In at least one embodiment, both the source R1 system 2102 and the remote destination R2 system 2104 can be log based systems which generally record received write I/Os in a transaction log and process such write I/Os of the transaction log as described above, for example, in connection with FIGS. 3-6A. Thus for each write I/O recorded in the replication queue 801 a corresponding entry can also be recorded in the transaction log of the source system 2102, and the write data for each such write I/O can be stored in cache of the source R1 system 2102.

In at least one embodiment, the replication queue 801 can be stored in volatile memory of the source R1 system 2102.

In at least one embodiment, writes received at the source R1 system which are directed to LUNs configured for asynchronous remote replication can have a corresponding entry to the replication queue 801 in ingest or received time order with the oldest unreplicated write operation/write data being stored at the tail 804 of the replication queue 801, and where the most recently received unreplicated write operation/write data can be stored at the head 804 of the replication queue 801. In this manner, the logical ordering in which writes appear in the queue 801 from the tail 802 to the head 804 can denote the increasing time order in which the writes are received by the source R1 system. Additionally, the foregoing order from tail 802 to head 804 denotes a FIFO queue order in which the writes can be replicated from the source R1 system 2102 to the remote R2 destination system. In at least one embodiment, the foregoing FIFO order from tail 802 to head 804 denotes a stream of records including writes directed to R1 LUNs, such as R1 2124 of the source R1 system 2102, where the logical FIFO ordering of such writes can be applied to the remote counterpart R2 LUNs, such as R2 2126 of the remote destination R2 system 2104.

In at least one embodiment, the RRF or replication service 2102a of the source R1 system 2102 can be configured to perform asynchronous remote replication for one or more LUNs, such as the source LUN denoted as R1 2124. In at least one embodiment, the RRF can issue a command to create a snapshot of the R1 LUN 2124 where the snapshot is a replication related snapshot. The RRF can issue such a command or request to create a snapshot at predetermined time intervals, for example, such as based on the RPO of a defined replication schedule. In accordance with the techniques of the present disclosure, an actual snapshot may not be created on the source R1 system 2102 in connection with the request to create a replication related snapshot. In such an embodiment, the RRF can utilize its same interface and issue the create snapshot command as it would in connection with an existing snap diff technique. However, in accordance with the techniques of the present disclosure for such requests for a replication related snapshot, the replication related snapshot may not be actually created. In accordance with the techniques of the present disclosure, responsive to the RRF issuing a request to create a replication related snapshot for the source LUN, R1 2124 configured for asynchronous remote replication, a barrier or checkpoint command record can be added to the replication queue 801. Additionally, a barrier or checkpoint command record can also be added to the transaction log. In such an embodiment, the requests for the replication related snapshots can include inserting related barrier or checkpoint command records in the replication queue 801 and transaction log as discussed below. However in at least one embodiment, for the replication related snapshots, processing on the source system 2102 can omit creating snapshot structures, and the like. The barrier or checkpoint records or commands can be inserted into structures discussed in more detail below, such as, for example, the replication queue and transaction log, to allow the remote R2 system 2104 to construct snapshots corresponding to the received stream including replicated writes between successive barrier or checkpoint records. For example as discussed elsewhere herein use of the barrier or checkpoint records can be used in connection with providing volume consistency groups. Generally, writes between two successive checkpoint records can be included in the same snapshot. In this manner, the remote R2 system 2104 can use the received stream of replicated writes and checkpoint records to construct one or more snapshots which are write consistent across multiple LUNs. In at least one embodiment, the source R1 system 2102 can provide the stream including writes and checkpoint records to the destination R2 system 2104 without having the R1 system 2102 actually build or construct the snapshots and without having the R1 system 2102 perform the snap diff technique for the purpose of asynchronous replication.

Figure 9:
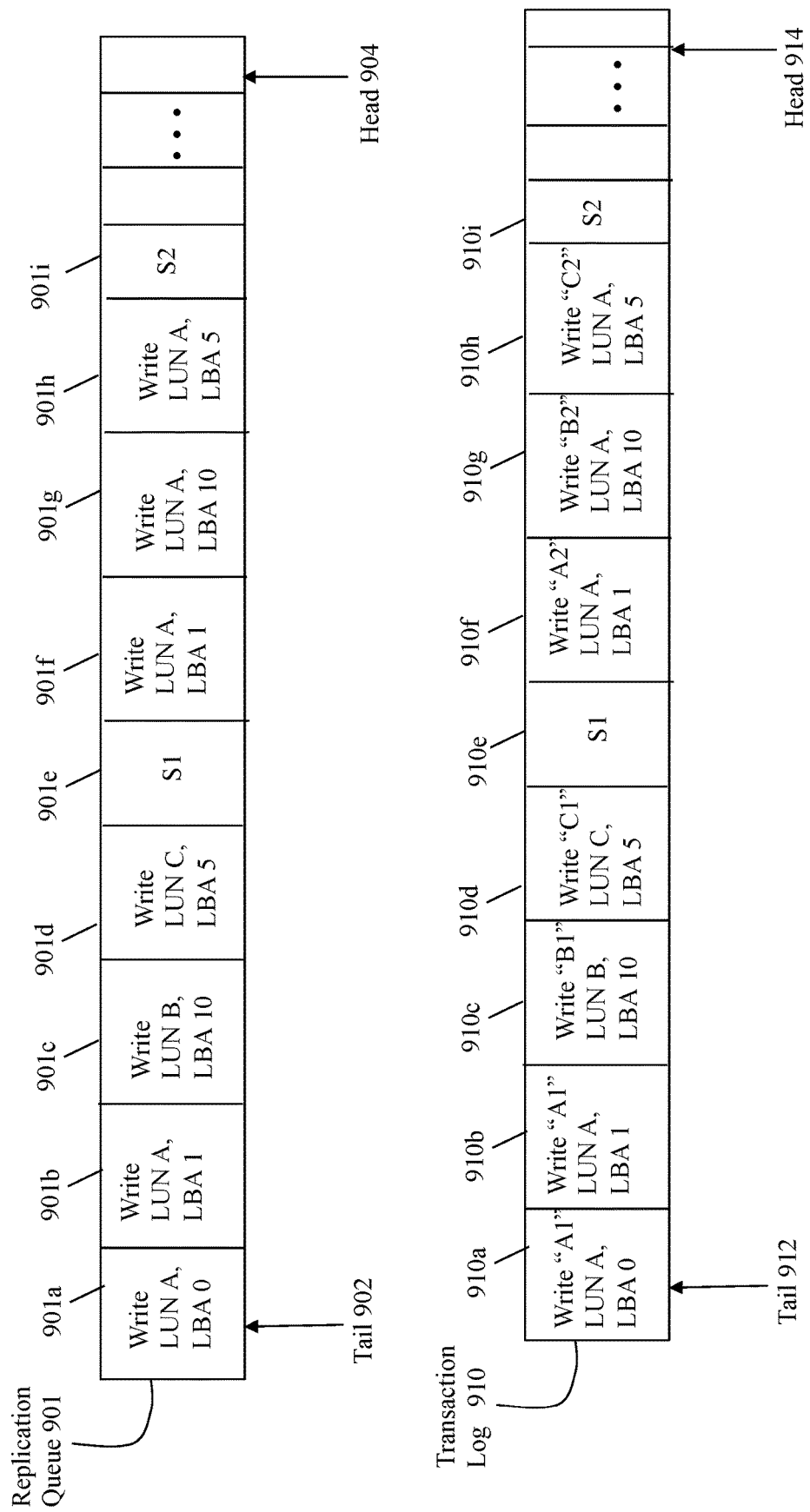

Referring to FIG. 9, shown is an example 900 illustrating a replication queue 901 and a transaction log 910 in at least one embodiment in accordance with the techniques of the present disclosure. The structures 901 and 910 can be maintained and included on the source R1 system 2102.

In the example 900, assume that the source R1 system 2102 includes 3 R1 source LUNs A, B and C configured for asynchronous remote replication, respectively, to R2 counterpart LUNs A', B', and C' of the remote destination R2 system 2104. Also assume in this example that the LUNs A, B and C are in a configured CG (consistency group) CG1, on the system 2102, and the LUNs A', B' and C' are included in a configured CG, CG1', on the system 2104.

In the example 900, the replication queue 901 can denote a sequence or stream of records recorded for received writes directed to LUNs A-C on the source R1 system 2102 and also for 2 snapshot creation requests for replication related snapshots. Generally, a record of the replication queue 901 and transaction log 910 recorded for a replication related snapshot can be denoted as Sn. The record 901e denotes a first request by the RRF to create a replication related snapshot, and the record 901i denotes a second request by the RRF to create a replication related snapshot. The records 901a-d and 901f-h denote records of writes directed to LUNs A-C. The records S1 901e and S2 901i denote checkpoint or barrier records in the replication queue 901.

The recorded writes 901f, 901g and 901h between S1 901e and S2 901i can be applied as a single group to the LUNs A-C to maintain write consistency across the CG1 on the R1 source system 2102 and also applied as a single group to the LUNs A', B' and C' to maintain write consistency across the CG1' on the R2 system 2104.

The records 901f-h between the two checkpoint records or commands 901e and 901i represent 3 write operations which the R2 system 2014 can include in a first snapshot S1. The records 910f-h between the two checkpoint records or commands 910e and 910i represent the same 3 write operations (as the entries 901f-h) which the R2 system 2204 can include in the first snapshot S1. Any subsequently recorded writes following the replication queue entry 901i and following the transaction log entry 910i can be included in another second snapshot S2.

In the example 900, the transaction log 910 can correspond to the log as generally described, for example in connection with FIGS. 3-6A. In the example 900, the transaction log 910 can denote a sequence or stream of records recorded for received writes directed to LUNs A-C on the source R1 system 2102 and also for 2 snapshot creation requests for replication related snapshots. The record 910e is similar to 901e and denotes the first request by the RRF to create a replication related snapshot. The record 910i is similar to the record 901i and denotes the second request by the RRF to create a replication related snapshot. The records 910a-d and 910f-g correspond, respectively, to the recorded writes of the records 901a-d and 901f-h of the replication queue 901 of writes directed to LUNs A-C. The records S1 910e and S2 910i denote checkpoint or barrier records in the transaction log 910. The recorded writes 910f-h between S1 910e and S2 910i can be applied as a single group to the LUNs A-C to maintain write consistency across the CG1 on the R1 source system 2102 and also applied as a single group to the LUNs A', B' and C' to maintain write consistency across the CG1' on the R2 system 2104.

The RRF can process and replicate write data and checkpoint or barriers associated with entries of the replication queue 901 in order from tail 902 to head 904. In the example 900, the RRF can process and replicate entries of the replication queue 901 in the following sequential consecutive order of entries 901a-901i. This is discussed in more detail below.

In at least one embodiment, replication configuration information can be maintained on a per object or per LUN basis for each LUN A, B and C of the source R1 system 2102 indicating whether each such LUN is configured for replication, and in connection with the techniques of the present disclosure, configured to asynchronous remote replication.

In at least one embodiment, writes of the transaction log 910 can be flushed or destaged to the BE PDs as discussed above, for example, in connection with FIGS. 3-6A with additional processing discussed below. When flushing a particular entry of the transaction log 910 has completed storing the write data on the BE PDs and updated the associated mapping information, additional processing can be performed in at least one embodiment in accordance with the techniques of the present disclosure. Assume, for example, that flushing or destaging has been completed for the transaction log entry 910a and also for the transaction entry 910b that writes the write data "A1" to the target logical address LUN A, LBA 1. Assume for illustration purposes that the replication queue entry 901a corresponding to the transaction log entry 910a has been replicated but that the replication queue entry 901b has not yet been replicated. Assume further that processing is also performed to now reclaim or remove the transaction log entry 910b. In at least one embodiment, prior to removing or reclaiming the transaction log entry 910b, the additional processing can be performed. The additional processing can include determining whether the target logical address of the entry 910b identifies a LUN that is tagged as configured for asynchronous remote replication. If so, the additional processing can further determine whether the flushed transaction log entry's associated write operation and write data "A1" stored at the target logical address LUN A, LBA1 has already been replicated. The additional processing can make such a determination in any suitable manner. For example, in at least one embodiment, the additional processing can further include checking the replication queue 901 to identify any entries of the replication queue 901 a) which have not yet been replicated from the source R1 system to the remote destination R2 system, and b) which represent the write I/O directed to the same target logical address as the flushed transaction log entry 910b. For such entries of the replication queue 901 meeting the foregoing conditions a) and b) (e.g., both condition a and condition b evaluate to true), the additional processing can further include creating corresponding entries in the MD log illustrated in more detail in connection with FIG. 10. In at least one embodiment, processing can mark or tag entries of the transaction log 910 which need to be replicated based on state information stored in a corresponding descriptor PDESC associated with the logged or recorded operation, such as a write I/O operation or a snapshot operation resulting in logging a barrier or checkpoint record, of the transaction log 910. For example, the PDESC can include a flag or other setting which has a first value, such as 0, when the associated logged operation recorded in the transaction log is to be replicated, and a second value, such as 1, when the associated operation recorded in the transaction log is not to be replicated.

Consistent with other discussion herein, the MD log can include entries for write operations and associated write data, where the write data for such write operations has not yet been replicated from the source R1 system to the destination R2 system, and where records of the transaction log corresponding to such write operations have been flushed or destaged such that the associated write data has been written to the BE PDs. In this case, the write data for such write operations may not be guaranteed to be stored in the cache. As noted above in at least one embodiment, write data for a write operation having an associated entry in the transaction log 910 can be guaranteed to remain in the R1 system cache so long as the associated transaction log entry has not been flushed from the transaction log 910. If the write data of the flushed associated entry of the transaction log has not yet been replicated to the R2 system 2104, the write data may not be in the cache when the RRF needs the write data for replicating to the R2 system 2104. As a result, the RRF can experience a cache miss when attempting to obtain the write data for replication from the cache. In accordance with the techniques of the present disclosure, responsive to such a cache miss with respect to write data to be replicated, LA to PLB type tuples or entries of the MD log can be used to directly read the write data needed for replication by the RRF from the BE PDs rather than, for example, using the mapping information.

In at least one embodiment, LA to PLB type tuples or entries of the MD log can include a tuple represented as (LI, EI, T, V) as generally described elsewhere herein, where T has a value denoting the LA to PLB type, LI has a value denoting the logical address (e.g., UD logical address such as a volume or LUN and LBA or offset), and V has a value denoting the PLB address or the physical storage location of the content stored at the logical address (identified by the LI field of the tuple).

To further illustrate with reference to FIG. 9, assume that the transaction log entries 910a and 910b have been flushed. In at least one embodiment, the additional processing performed in connection with the transaction log entry 910b can include determining whether the target logical address of the entry 910b identifies a LUN that is tagged as configured for asynchronous remote replication. In this case, the entry 910b identifies the LUN A which is marked or tagged as configured for asynchronous remote replication. In this instance, the additional processing of the entry 910b can further include checking the replication queue 901 to identify entries of the replication queue 901 a) which have not yet been replicated from the source R1 system to the remote destination R2 system, and b) which represent write I/Os directed to the same target logical address, LUN A LBA1 as the transaction log entry 910b. In this example, assume that only the record 901a of the replication queue 901 has been replicated from the R1 system 2102 to the R2 system 2104 and assume that the transaction log entries 910a-b have been flushed from the log so that the write data or content "A1" stored at the target logical address LUN A, LBA1 has been written to a storage location at "Address 1" on the BE PDs.

In this case, the replication queue 901 can be traversed to identify entries 901b and 901f both having a target logical address matching the target logical address LUN A, LBA1 of the flushed transaction log entry 910b. In connection with the additional processing for the flushed transaction log entry 910b in at least one embodiment, a corresponding entry can be made in the MD log for the replication queue entry 901b but not the replication queue entry 901f since the entry 901f corresponds to a different write I/O operation than the transaction log entry 910b. The additional processing can determine, for example, that the replication queue entry 901b of occurs prior to the checkpoint S1 901e similar to the transaction log entry 910b which also occurs prior to the checkpoint S1 910e. Thus, the transaction log entry 910b can be determined to represent the same write I/O operation as the replication queue entry 901b for which an entry can be added to the MD log. Processing can determine that the replication queue entry 901f is after the checkpoint S1 901e and therefore is determined not to correspond to the write I/O of the transaction log entry 910b. More generally, an embodiment can use any suitable technique to determine a corresponding replication queue entry for a particular transaction log entry, where both the replication queue entry and the transaction log entry can represent the same recorded write I/O operation.

In at least one embodiment, each record of the transaction log 910 can be assigned a unique LSN (logical sequence number). The LSN assigned to each record can denote a next LSN in a sequence of LSN values. In at least one embodiment, an LSN counter can be an integer counter or index that is incremented, such as by 1, each time a new write or other operation is logged in a next record of the transaction log. The value of the LSN counter can always increases and can denote an absolute location or record number in the transaction log file. When logging an operation in a record of the transaction log, the current value of the LSN counter can be assigned to the record. Subsequently the LSN counter is incremented.

Thus, each record of the transaction log can be assigned a different LSN and can be assigned the current value of the LSN counter. The LSN may be used to denote a sequential time ordering and position of the records in the transaction log. Thus each record and logged write of the transaction log can have a unique LSN where the logged writes are applied in a write consistent order based on the increasing LSNs associated with the log records. For example, to maintain write order consistency of data, logged writes are logically applied in a sequential order based on the increasing LSNs where the log record with LSN=N is applied prior to the record with LSN=N+1. Any optimization performed, such as to flush selected transaction log records in parallel, must maintain the same data consistency and resulting data as if the log records had been flushed and destaged in sequential order based on increasing LSNs of the transaction log records. Consistent with other discussion herein, when flushing the transaction log in at least one embodiment, storage of the flushed records can be reclaimed or freed by moving the tail pointer to the flushed record with the highest LSN of all flushed records. In at least one embodiment, a first entry of the replication queue 901 corresponding to a second entry of the transaction log where both the first and second entries are records describing the same write operation can have matching associated LSNs or another matching identifier.

Figure 10:
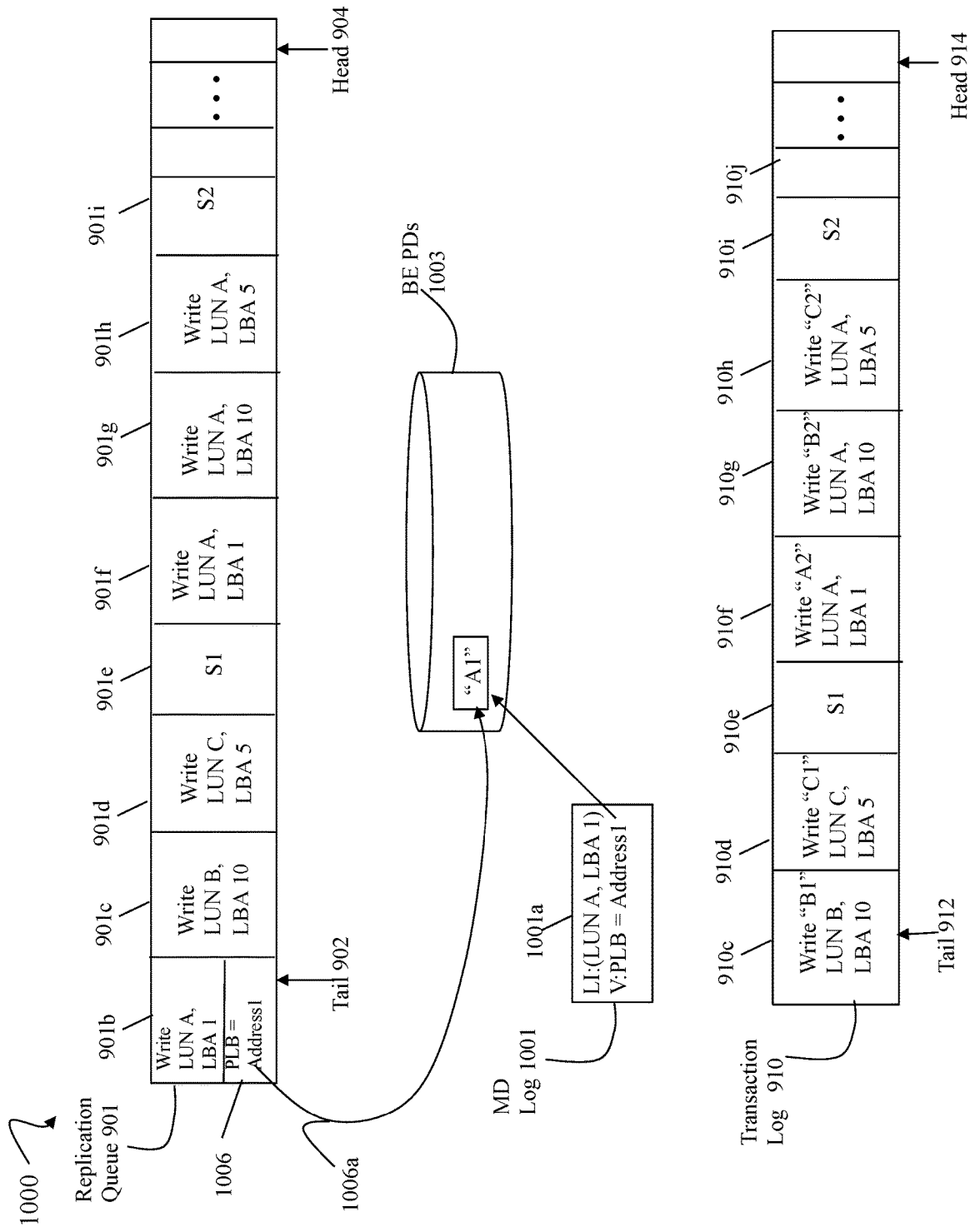

Referring to FIG. 10, shown is an example 1000 illustrating the structures from FIG. 9 along with the BE PDs 1003 after the transaction log entry 910b has been flushed. In the example 1000 as noted above, entries of the replication queue 901 prior to but not including the entry 901b have been replicated from the R1 system 2102 to the R2 system 2104.

The transaction log 910 of the example 1000 has been updated with respect to FIG. 9 to denote that the transaction log entries 910a-b have been flushed and reclaimed. Additionally, shown in FIG. 10 is the MD log 1001 including the entry 1001a. The MD log entry 1001a is added to the MD log 1001 in response to the additional processing described above for the flushed transaction log entry 910b which corresponds to a flushed write operation that writes to the content "A" to the target logical address LUNA, LBA1. In this case, the additional processing determines that the write data written by the write operation record in the flushed transaction log entry 910b has not yet been flushed. In particular in at least one embodiment, the additional processing can determine that the flushed transaction log entry 910b writes to the target logical address LUNA, LBA1 having a matching or corresponding replication queue entry 901b that has not yet been replicated. Accordingly, the MD log entry 1001a is created which has a type T=LA to PLB and further includes information of a logical address-physical storage location pair (e.g., LA to PLB mapping) for the target logical address LUN A, LBA 1 having the content "A1" stored at the physical storage block, location or address "Address1". The notation "PLB=Address1" of the entry 1001a can denote the physical storage location or address of the content "A1" on the BE PDs 1003, where the content "A1" is stored at the target logical address LUN A, LBA 1. More generally, the additional processing creates an entry in the MDL log 1001 for a flushed transaction log entry of a write operation that writes content or data to a target logical address and where the write operation and write data of the flushed transaction log entry have not yet been replicated. The created MD log entry for a flushed but not yet replicated write operation/write data can have an associated type T=LA to PLB, can include an LI field value denoting the target logical address of the write operation and can include a V field value denoting the associated physical storage location or PLB of the content or write data stored at the target logical address by the write operation.

In at least one embodiment, in addition to creating the MD log entry 1001a for the flushed transaction log entry 910b whose write data is flushed to the BE PDs but not yet replicated, the additional processing can also include adding a reference pointer to, or address of the write data in the associated entry 901b of the replication queue 901. For example, the PLB=Address1 (1006) denoting the physical storage location or address of the write data stored at the target logical address LUN A, LBA1 can also optionally be added to the replication queue entry 901b. As illustrated, the portion 1006 of the replication queue entry 901b is "Address1" which is the physical location or PLB of the content "A1". The arrow 1006a denotes that the PLB=Address1 (1006) points to or references the physical location of the content "A1" stored at the target logical address LUN A, LBA1. Thus generally, storing the physical storage location or address, Address 1, as denoted by the element 1006 in the replication queue entry 901b can be optional since the physical location or address of the write data "A1" of the logical address LUN A, LBA1 is persistently stored as part of the MD log entry 1001a.

For simplicity of illustration, the LA to PLB type tuples or entries, such as 1001a, of the MD log 1001 created in accordance with the techniques herein do not explicitly illustrate the tuple type of LA to PLB.

In at least one embodiment, adding the entry 1001a to the MD log can 1001 can include adding the entry 1001a to both the RDL or persistently stored MD log 510 as well as adding the entry 1001a to the in-memory or volatile memory log such as the active HBSB or bucket set of each node.

In at least one embodiment, the transaction log 910 can be persistently stored on non-volatile storage and the replication queue 901 can be stored on volatile storage.

Continuing with the above example of FIG. 10, assume that flushing continues to flush or destage transaction log entries 910c-d Additional processing can determine that the transaction log entry 910c records a write directed to LUN B which is configured for asynchronous remote replication. Additional processing for the flushed transaction log entry 910c can also determine that the write data written by the transaction log entry 910c has been flushed but not yet replicated since the replication queue 901 includes the corresponding replication queue entry 901c. In this case with reference to FIG. 11, the entry 1102a can be added to the MD log 1001 for the flushed but not yet replicated write operation and write data of the flushed transaction record 910c. Additional processing can determine that the transaction log entry 910d records a write directed to LUN C which is configured for asynchronous remote replication. Additional processing for the flushed transaction log entry 910d can also determine that the write data written by the transaction log entry 910d has been flushed but not yet replicated since the replication queue 901 includes the corresponding replication queue entry 901d. In this case with reference to FIG. 11, the entry 1104a can be added to the MD log 1001 for the flushed but not yet replicated write operation and write data of the flushed transaction record 910d. As noted above for the entry 1001a, the entries 1102a and 1104a can be added to both the RDL or persistent MD log and also the in-memory of volatile MD log such as the active HBSB of each node.

Flushing of the transaction log 1001 can continue with the entry 910e for the checkpoint record or command S1. Before reclaiming the entry 910e, additional processing can determine that the entry 910e denotes a checkpoint record which has not yet been replicated since the S1 checkpoint of the replication queue entry 901e corresponds to the S1 checkpoint of the transaction log entry 910e. In this case with reference to FIG. 11, the entry 1106a is added to the MD log 1001 for the not replicated transaction record 910e. The entry 1106a can denote a MD log delta or tuple having an associated type of checkpoint. In at least one embodiment, adding the entry 1106a to the MD log 1001 can include adding the entry 1106a to the RDL or persistently stored MD log 510 but not adding the entry 1106a to the in-memory or volatile MD log such as the active HBSB. It should be noted that entry 1106a may not be added to the HBSB or in-memory MD log of each node since there is no need to retrieve or lookup information of the entry 1106a such as based on logical addresses as described elsewhere herein for MD log deltas or tuples of the LA to PLB type.

Flushing of the transaction log 1001 can continue with the entries 910f, g and h. Additional processing can determine that the transaction log entry 910f records a write directed to LUN A which is configured for asynchronous remote replication. Additional processing for the flushed transaction log entries 910f-h can determine that the write data written by the transaction log entries 910f-h have been flushed but not yet replicated since the replication queue 901 includes the corresponding replication queue entries 901f-h. In this case with reference to FIG. 11, the entries 1108a, 1110a and 1112a can be added to the MD log 1001 for the flushed but not yet replicated write operation and write data, respectively, of the flushed transaction records 910f-h. Consistent with discussion herein as with the entries 1001a, 1102a and 1104a, the entries 1108a, 1110a and 1112a can be added to both the RDL or persistently stored MD log 510 and also added to the in-memory or volatile MD log such as the active HBSB of each node.

Flushing of the transaction log 1001 can continue with the entry 910i for the checkpoint record or command S2. Before reclaiming the entry 910i, additional processing can determine that the entry 910i denotes a checkpoint record which has not yet been replicated since the S2 checkpoint of the replication queue entry 901i corresponds to the S2 checkpoint of the transaction log entry 910i. In this case with reference to FIG. 11, the entry 1114a is added to the MD log 1001 for the not replicated transaction record 910i for checkpoint S2. As discussed above for the entry 1106a, the entry 1114a can denote a MD log delta or tuple having an associated type of checkpoint. In at least one embodiment, adding the entry 1114a to the MD log 1001 can include adding the entry 1114a to the RDL or persistently stored MD log 510 but not adding the entry 1114a to the in-memory or volatile MD log such as the active HBSB. It should be noted that entry 1114a may not be added to the HBSB or in-memory MD log of each node since there is no need to retrieve or lookup information of the entry 1114a such as based on logical addresses as described elsewhere herein for MD log deltas or tuples of the LA to PLB type.

Figure 11:
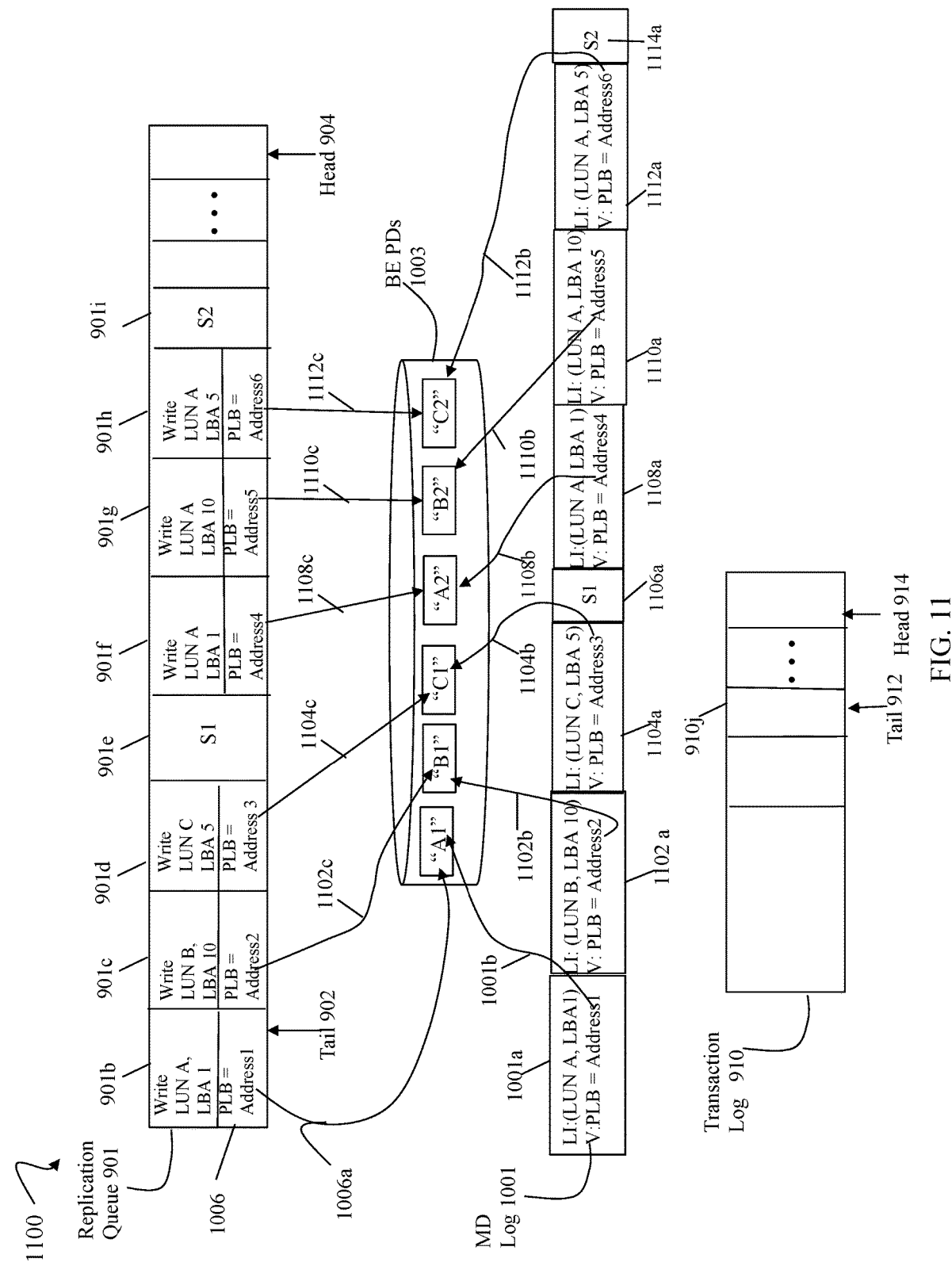

Referring to FIG. 11, shown is an example 1100 showing the state of the structures 901, 910, 1001 and the BE PDs after transaction log records up to but not including 910j have been flushed and processed in accordance with the techniques of the present disclosure.

It should be noted that in at least one implementation not in accordance with the techniques of the present disclosure, the source system 2102 may have created a snapshot for each of the one or more LUNs written to by a write recorded in the transaction log 1001 between the two checkpoint successive checkpoint records S1 910e and S2 910i. In the example of FIG. 10, such a system not in accordance with the techniques herein would have, for example, created various metadata structures for the snapshot of LUN A and included the writes of transaction records 910f-h in the snapshot of LUN A. In a similar manner, if other writes to other LUNs were also recorded in transaction log records between the checkpoint records 910e and 910i, snapshots would have been created for each such other LUN in a similar manner. In contrast, rather than actually create the snapshot for LUN A in an embodiment in accordance with the techniques of the present disclosure, processing in accordance with the present techniques can include creating corresponding replication queue records 901e-i and corresponding MD log entries 1006a, 1008a, 1110a, 1112a and 1114a, respectively, for such transaction log records 910e-i. Such records or entries in the structures 901 and 1001 can denote snapshot semantics without the source R1 system having to actually instantiate or create snapshots.

In the example 1100, the replication queue entry 901c can include the physical location or address (PLB) of Address2 that points (1102c) to the storage location of the contents "B1" stored at LUN B, LBA 10. The replication queue entry 901d can include the physical location or address (PLB) of Address3 that points (1104c) to the storage location of the contents "C1" stored at LUN C, LBA 5. The replication queue entry 901f can include the physical location or address (PLB) of Address4 that points (1108c) to the storage location of the contents "A2" stored at LUN A, LBA 1. The replication queue entry 901g can include the physical location or address (PLB) of Address5 that points (1110c) to the storage location of the contents "B2" stored at LUN A, LBA 10. The replication queue entry 901h can include the physical location or address (PLB) of Address6 that points (1112c) to the storage location of the contents "C2" stored at LUN A, LBA 5.

In the example 1100, the MD log entry 1102a can include the Address2 which points (1102b) to the physical storage location or PLB including the content "B1" stored at the logical address LUN B, LBA 10. The MD log entry 1104a can include the Address3 which points (1104b) to the physical storage location or PLB including the content "C1" stored at the logical address LUN C, LBA 5. The MD log entry 1108a can include the Address4 which points (1108b) to the physical storage location or PLB including the content "A2" stored at the logical address LUN A, LBA 1. The MD log entry 1110a can include the Address5 which points (1110b) to the physical storage location or PLB including the content "B2" stored at the logical address LUN A, LBA 10. The MD log entry 1112a can include the Address6 which points (1112b) to the physical storage location or PLB including the content "C2" stored at the logical address LUN A, LBA 5.

In at least one embodiment, as write data and checkpoint records of the replication queue 901 are replicated from the R1 system 2102 to the R2 system 2104, such records can be removed from the replication queue 901 and also have their corresponding records removed from the MD log 1001

In accordance with the techniques of the present disclosure, write data and checkpoints of flushed transaction records which have not yet been replicated from the source R1 system 2102 to the destination R2 system can be persisted in the MD log 1001. In at least one embodiment at any point in time, all write data and checkpoints of LUNs configured for asynchronous remote replication may have either been replicated to the destination R2 system, exist in the persistently stored transaction log (e.g., in a transaction log record not yet flushed), or exist in the MD log (e.g., in a persistently stored MD log record of the RDL since the write data or checkpoint was included in a transaction record that has been flushed but not yet replicated to the R2 system).

With reference to the example of FIGS. 9, 10 and 11, the LUNs A, B and C can be configured for asynchronous remote replication where any writes to such LUNs or checkpoints indicating to create snapshots for any of the LUNs A, B and/or C have either been replicated to the R2 system (e.g., such as the write of the transaction log record 910a), exist persistently as an entry in the transaction log, or otherwise exist persistently as an entry in the MD log (e.g., such as the writes/write data and checkpoints of MD log entries 1001a, 1102a, 1104a, 1106a, 1108a, 1110a, 1112a and 1114a).

In at least one embodiment, the source R1 system 2102 can perform replication of the write data and checkpoint records or commands by processing replication queue 901 from tail to head, or more generally in ingest or FIFO order. Thus, using the replication queue 901 provides for copying the original or source stream, which can include write I/Os and checkpoints, to destination R2 system with some delay. In at least one embodiment, the write data to be replicated from the R1 system 2102 to the R2 system 2104 can be obtained from the cache of the R1 system in a majority of cases (e.g., assuming a high RPO and low lag). For a write operation having a replication queue entry, the replication queue entry indicates that the write data D written by the write operation to a target address T needs to replicated. For example, the entry 901b indicates that the logical address LUN A, LBA 1 has write data or content "A1" stored at the physical location or address "Address1". The RRF can first attempt to read the write data or content stored at LUN A, LBA 1 from the source R1 system's cache. If this results in a cache hit, the content "A1" can be read from corresponding cache entry and replicated from the R1 system 2102 to the R2 system 2104. If the foregoing read results in a cache miss, the RRF can alternatively use the reference or address, "Address1" of the replication queue entry 901*b* to directly access and read the write data or content "A1". With the replication queue 901, checkpoints (i.e., barriers) are transferred or replicated from the R1 system to the R2 system in the same stream as write data/write operations. In connection with the replication, information transferred for a single replication queue entry denoting a write operation can include the write data and the logical address (e.g., R1 device) to which write data is applied on the R1 system. The R2 system can receive the write data and the logical address and can apply the write data to the corresponding remote counterpart R2 device (e.g., counterpart for the R1 device of the R1 system).

In at least one embodiment where the replication queue entries, such as the entry 901*b*, do not include a reference, address or pointer, such as 1006, directly to the write data to be replicated, the corresponding entry of the MD log 1001 can be used to obtain the reference, address or pointer used to directly access the write data to be replicated such as in connection with processing a read cache miss noted above. For example, assume that the replication queue entry 901*b* did not include the reference, address or pointer 1006 which can be used to directly access (1006*a*) the content A1 stored at the logical address LUN A, LBA 1. Assume further that the data or content for the logical address LUN A LBA1, as denoted by the replication queue entry 901*b*, is not stored in the cache resulting in a read cache miss when servicing a read I/O to read content of the logical address LUN A, LBA 1. In this case for read cache miss processing, the MD log 1001 can be traversed or queried to locate the corresponding MD log entry 1001*a* which corresponds to the replication queue entry 901*b*. In particular, the MD log 1001 can be traversed or queried using the logical address of LUN A, LBA1 (as stored in the replication queue entry 901*b*) to locate the matching MD log entry 1001*a* having the same logical address stored as the LI value of the entry or tuple. If such a matching entry in the MD log 1001 exists, the matching entry also include a reference, pointer or address used to directly access the content stored at the logical address. For example, assume the replication queue entry 901*b* includes the logical address LUN A, LBA 1 and that the entry 901*b* does not include the field 1006. In this case, the logical address LUN A, LBA 1 can be used as a key to lookup or query the MD log 1001 for a matching MD log entry of the tuple type LA to PLB with a corresponding LI value matching LUN A, LBA 1. In this example, the MD log entry 1001*a* is of the tuple type LA to PLB and also includes the matching LI value of LUN A, LBA 1, where the entry 1001*a* includes (as the V field value of the entry 1001*a*) the reference, pointer or address="Address1" used to directly access (1001*b*) the content A1 stored at the logical address LUN A, LBA1. In at least one embodiment and implementation of the MD log, the in-memory MD log or active HBSB can be queried. If the same logical address LUN A, LBA1 is overwritten such that the MD log includes multiple entries matching the logical address LUN A, LBA 1, the MD log including the in-memory MD log can maintain the update order so that the latest or most recent MD log entry can be used to obtain the most recent or up to date content.

On the destination R2 system in at least one embodiment, the replicated checkpoints of the replication queue 901 can be used to create snapshots on the R2 system and/or provide CG semantics to LUNs configured in a CG or multiple LUNs which may be modified by a transaction of writes between two successive checkpoints. Alternatively in some embodiments, checkpoints may be ignored on destination R2 system if snapshot semantics represented by the checkpoint records are not used or required by destination R2 system.

In at least one embodiment as an optimization, write data/write operations of replication queue records occurring between two checkpoints may be transferred in parallel for better link utilization. It should be noted that writes applied on the R2 system in parallel may not cross checkpoint boundaries as denoted in the replication queue's time order in order to maintain desired write consistency. In at least one embodiment, records (e.g., write data/write operations and checkpoints) of the replication queue 901 can be transferred in FIFO order or ingest order. As a variation in at least one embodiment, transferring records of the replication queue 901 can be transfers in another order that is not strictly FIFO or ingest order (e.g., from tail 902 to head 904 order) so long as the desired write consistency denoted by the checkpoints is preserved. In at least one embodiment, the source R1 system can perform write folding. Write folding can combine multiple writes or overwrites into a single write, where such multiple writes can write to the same logical address and occur between the same two successive checkpoints. Writes to the same logical address which do not occur between the same two successive checkpoints cannot be combined. In at least one embodiment, the checkpoints can be inserted into the time ordered sequence of recorded records of writes in the replication queue to preserve data ordering and write consistency based on the placement and semantics of the checkpoint records. In at least one embodiment, the occurrence of a new checkpoint can denote the boundary of writes to be included in a snapshot. For example with reference to the example 1100 of FIG. 11, the writes represented by entries 901*b-d* can be included in one snapshot snap1, the writes represented by the entries 901*f-h* can be included in another snapshot snap2, and any write represented by entries following the checkpoint record S2 901*i* (and prior to the occurrence of another checkpoint record in the replication queue 901) can be included in a third snapshot snap3. In this manner, the checkpoint records can be used to denote the snapshot semantics in the stream of records (including writes and checkpoints) replicated from the R1 system 2102 to the R2 system 2104 without the R1 system. For replication related snapshots used to preserve write consistency across one or more LUNs at different points in time, writes to be included in the same write transaction can be included between the two successive checkpoints in the MD log.

The replication queue can be maintained in volatile memory and can include the logical addresses of write data, or more generally modified content to be replicated. Optionally, the replication queue entries can also include the references, addresses, or pointers to the PLBs or physical storage locations on the BE PDs which contain the write data.

In at least one embodiment, the replication queue can be demoted, under certain conditions, from volatile memory to a lower performance storage tier of non-volatile SSDs. The foregoing can be done, for example, to provide sustainability in the case of long replication link failures. In such an embodiment, the lower performance non-volatile SSDs can also be used alone or in addition to volatile memory. For example, during periods of long replication link failure or other failure where entries of the replication queue are not replicated, the amount of volatile memory allocated for use with the replication queue can overflow or be exceeded. Subsequently, the lower performance non-volatile SSDs can be used to store additional replication queue entries if the volatile memory allocated for such use is exceeded. In at least one embodiment, a similar approach can be used in connection with the persistent RDL used as the persistent MDL stored in NVRAM when the NVRAM used for the persistent RDL becomes full.

What will now be described is processing performed in at least one embodiment in accordance with the techniques of the present disclosure when performing a MDL destaged of replication related MD log entries. In at least one embodiment, the replication related MD log entries can be identified based on the particular MD tuple or entry T types of "LA to PLB" and "checkpoint". Generally MD log entries of such replication related T types do not represent any actual MD update to a MD page so there is no processing performed to apply any MD update to a persisted MD page stored on the BE PDs. In at least one embodiment having a high RPO, replication can be performed with a relatively short delay in comparison to a longer MD log destaging cycle which can be, for example, several minutes. In many instances, the MD log being destaged may not include any replication-related entries or tuples corresponding to unreplicated entries of the replication queue. However, in instances where there are such replication-related entries or tuples of the MD log which are being destaged, have not yet been replicated, and have corresponding unreplicated entries of the replication queue, such replication related entries destaged from the MD log can be preserved or persisted. In at least one embodiment, the destaged MD log entries denoting replication related checkpoints which have not yet been replicated need to be preserved along with their corresponding ordering within the RDL to be able to restore the replication queue from the RDL in the event of a system failure or other high availability event. Additionally, processing can preserve the destaged MD log entries denoting replication related LA to PLB tuples or deltas which have not yet been replicated in order to avoid excessive overhead processing associated with using the mapping information of the chain of MD pages. In at least one embodiment, this latter processing (e.g., to preserve the destaged MD log entries denoting replication related LA to PLB tuples or deltas) can be considered optional and an optimization.

What will now be described are approaches that can be used in at least one embodiment to accomplish the foregoing preservation or persistence of replication related MD log entries which are flushed from the MD log but which have not yet been replicated from the source to the target system.

In at least one embodiment, replication related LA to PLB type tuples which have not been replicated at time of destaging from the MD log can be added back into the MD log or remain in the MD log. In particular, such LA to PLB tuples can be added to the in-memory MD log by adding such tuples to the currently active HBSB.

In at least one embodiment, for replication related checkpoint type tuples which have not been replicated at time of destaging from the MD log, processing cannot be performed to reclaim the corresponding portion of the RDL including such unreplicated checkpoint MD log tuples (since such portion of the RDL is needed to be able to restore the replication queue in the event of a system failure or other event). As a first approach, processing can postpone reclaiming the corresponding portion of the RDL associated with the unreplicated checkpoint MD log tuples until all replication related entries associated with the RDL portion have been replicated. Alternatively, a second approach can be used, for example, in scenarios where such RDL postponement is not possible or desired. With the second approach, the current replication queue can be copied and thus persisted, to the head of the RDL as a single special RDL record (e.g., a ReplicationQueueRecord) and then space of the RDL prior to the single special RDL record can be reclaimed. As part of processing to restore the replication queue in response to a system failure or other event as discussed elsewhere herein, the RDL or persistent MDL can be used. During such restoration processing, the special RDL record or ReplicationQueueRecord, can be encountered and used to restore the replication queue.

In the case of a source R1 system event such as a crash, failure or other event causing the R1 system 2102 to go offline and then subsequently return to an online status such as through reboot, the replication queue stored in volatile memory can be restored using the persistently stored transaction log and the persistently stored MD log (e.g., RDL). In at least one embodiment assuming the RDL is written sequentially based on ingest order, correct checkpoint order restoration of the replication queue can be guaranteed.

Figure 12A:
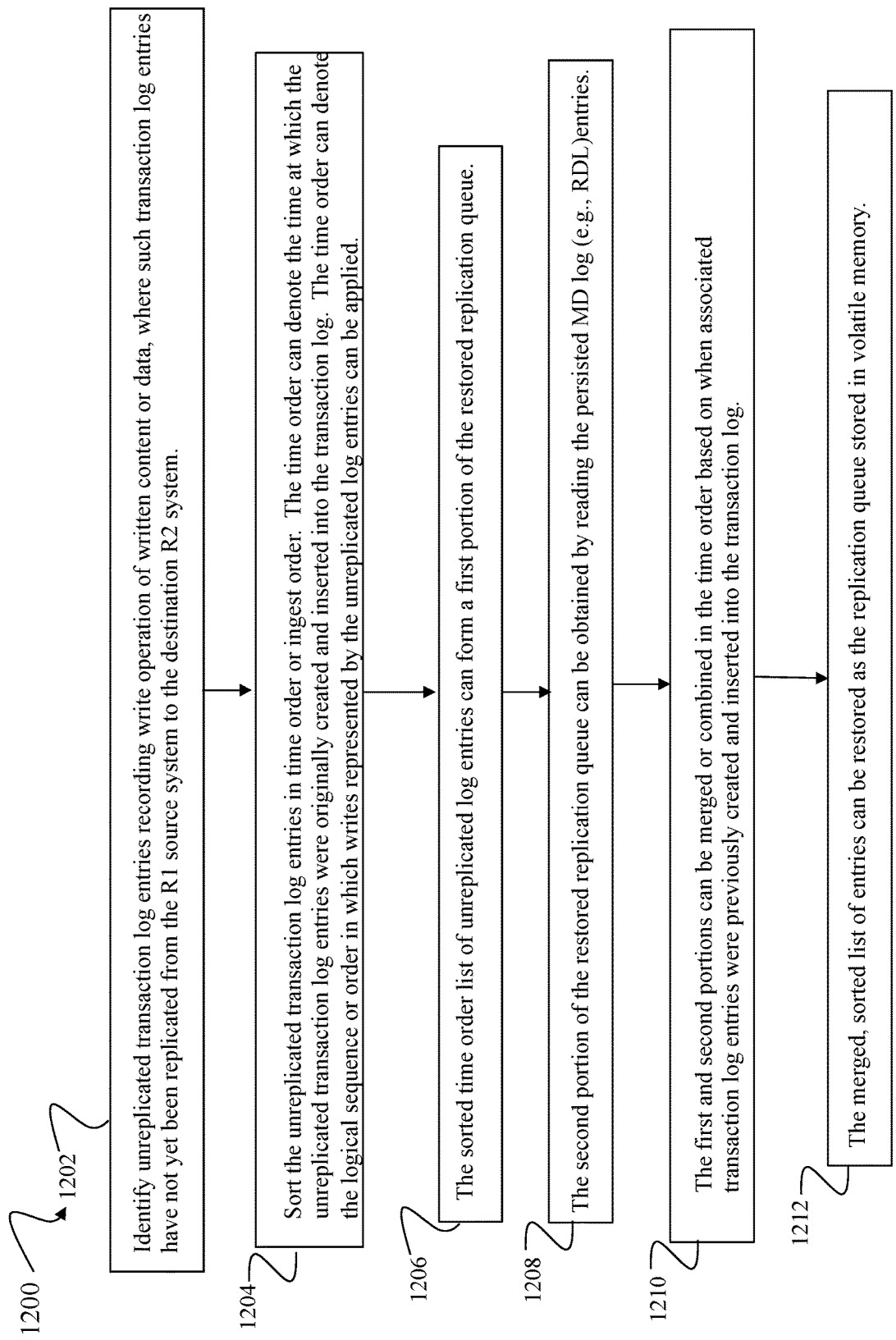
FIGS. 12A, 12B, 13, 14A, 14B, 15A and 15B are flowcharts of processing steps that can be performed in at least one embodiment in accordance with the techniques of the present disclosure.

In at least one embodiment, after failure or other event causing the R2 system to go offline and then subsequently reboot and return online, replication queue 901 can be restored as described in the following paragraphs with reference to the flowchart 1200 of FIG. 12A.

As a first step 1202, processing can be performed to identify the persistently stored unreplicated transaction log entries recording write operation of written content or data, where such transaction log entries have not yet been replicated from the R1 source system to the destination R2 system. In at least one embodiment, information can be tracked for each transaction log entry as to whether the content or write data written by the recorded write operation of the transaction log entry has been replicated or not. For example, a flag or indicator can be maintained for each transaction log entry denoting the foregoing current state of each transaction log entry. From the step 1202, control proceeds to the step 1204.

At the step 1204, processing can be performed to sort the unreplicated transaction log entries (as identified in the step 1202) in time order or ingest order. The time order can denote the relative time order at which the write operations recorded in the unreplicated transaction log entries were received by the R1 source system for processing. The time order can denote the time at which the unreplicated write transaction log entries were originally created or inserted into the transaction log. The time order can denote the logical sequence or order in which writes represented by the unreplicated log entries can be applied to maintain write consistency. In at least one embodiment, the step 1204 can perform the time order sorting based on a unique sequence identifier associated with each of the write operations recorded in the unreplicated transaction log entries. For example, LSNs are discussed above where a unique LSN can be assigned to each transaction log entry and thus each write I/O represented by the transaction log entry. From the step 1204, control proceeds to the step 1206.

At the step 1206, where the sorted time order list of unreplicated log entries from the step 1204 can be form a first portion of the restored replication queue. From the step 1206, control proceeds to the step 1208.

At the step 1208, processing can be performed to form a second portion of the restored replication queue by reading the persisted MD log (e.g., RDL) entries. In at least one embodiment, the step 1208 can identify the relevant entries of the persisted MD log included in the second portion based on the particular type T of the tuples. Consistent with discussion herein, the relevant MD log entries can have one of the following MD log delta or tuple types: LA to PLB type, or checkpoint type. The step 1208 can include using the foregoing entries of the persisted MD log as the second portion of the restored replication queue. From the step 1208, control proceeds to the step 1210.

At the step 1210, processing can be performed to combine or merge and sort, in time order, the first and second portions constructed, respectively, in the steps 1206 and 1208. The combining or merging of the step 1210 can including sorting the first and second portions of entries based on the time of when the corresponding write operations represented by such entries of the first and second portions are received by the R1 system for processing. In at least one embodiment, a time stamp, unique sequence identifier such as the LSNs discussed elsewhere herein, and the like, can be used to denote the particular time and relative time order of write operations represented by the entries of the first and second portions. Generally, an embodiment can utilize any suitable technique to denote the particular time and relative time order of write operations represented by the entries of the first and second portions for combining or merging and also sorting the first or second portions in time order based on the time when the corresponding write operations represented by such entries of the first and second portions are received by the R1 system for processing. From the step 1210, control proceeds to the step 1212.

At the step 1212, processing can be performed to restore the merged, sorted list of entries (as generated or determined as a result of the step 1210 processing) as the replication queue. The step 1212 can include storing the merged, sorted list from the step 1210 in the volatile memory of the R1 system.

Subsequent to the step 1212, the R1 system can use the restored replication queue to resume performing processing in accordance with the techniques of the present disclosure.

Figure 12B:
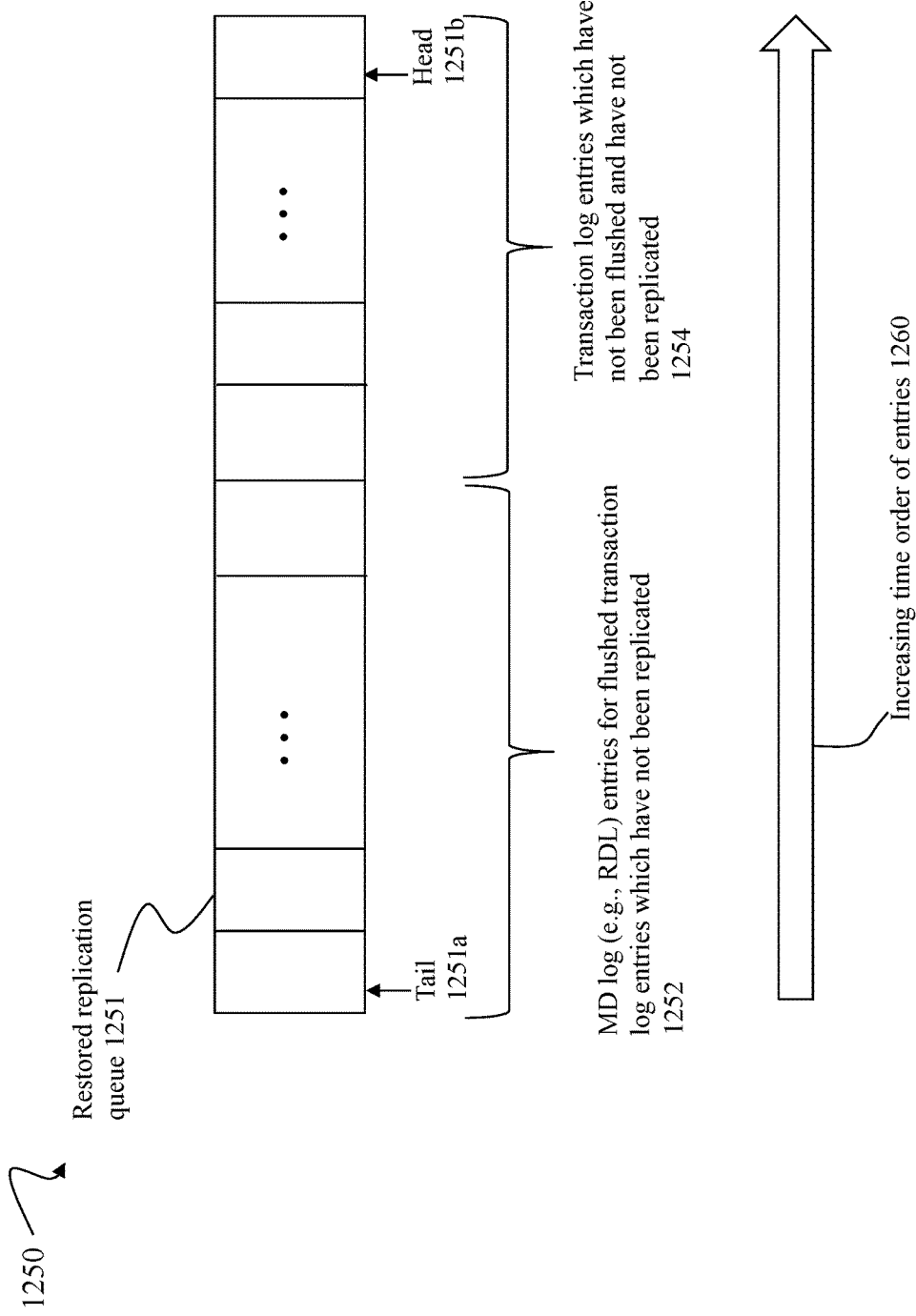

Referring to FIG. 12B, shown is an example 1250 representing the restored replication queue 1251 in at least one embodiment in accordance with the techniques of the present disclosure.

The restored replication queue 1251 (e.g., representing unreplicated write data or modified content written by write operations each having a corresponding entry on the restored replication queue) is illustrated as including the MD log entries (1252) for flushed transaction log entries which have not been replicated, and including the transaction log entries (1254) which have not been flushed and have also not been replicated. The example 1250 illustrates a simplistic illustration and representation of the restored replication queue 1251 where there is no time order overlap between the MD log entries 1252 and the transaction log entries 1254 which have been aggregated in time order as discussed above. More generally, however, there may be time overlap between entries of the 1252 and 1254. However in at least one embodiment, it can be expected that a large portion or majority of the transaction log entries 1252 are the most recent of all entries of the restored replication queue 1251, and it can be expected that a large portion or majority of the MD log entries are the oldest of all entries of the restored replication queue 1251. In at least one embodiment, the restored replication queue 1251 can be implemented as a FIFO queue where entries of the queue 1251 appear in an increasing time order from the tail 1251*a* (denoting the oldest entry in the queue 1251) to the head 1251*b* (denoting the youngest or most recent entry in the queue 1251). The arrow 1260 illustrates the increased time order of entries of the restored replication queue 1251 where entries of the queue 1251 can be processed in a FIFO order as described above, for example, in connection with processing of entries of the replication queue 801, 901 in connection with the FIGS. 8, 9, 10 and 11. Consistent with discussion above in at least one embodiment, entries can be removed and reclaimed from the tail 1251*a* of the queue 1251 and new entries can be added to the head 1251*b* of the queue 1251 for processing in accordance with the techniques of the present disclosure.

What will now be described in connection with FIGS. 13, 14A, 14B, 15A, and 15B are flowcharts of processing steps that can be performed in at least one embodiment in accordance with the techniques of the present disclosure. The flowcharts summarize processing described above.

Figure 13:
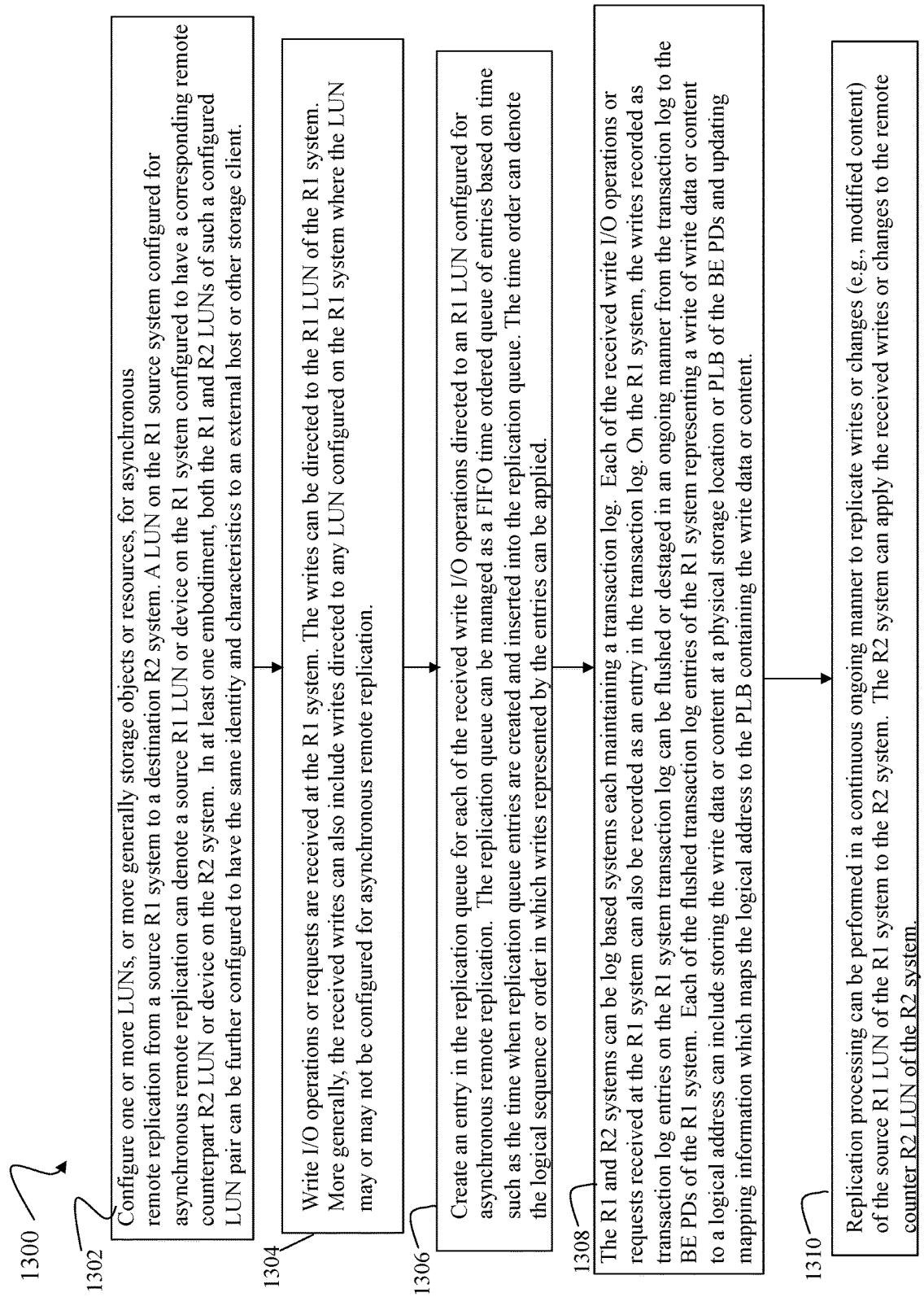

Referring to FIG. 13, shown is a flowchart 1300 of processing that can be performed in at least one embodiment in accordance with the techniques of the present disclosure.

At a step 1302, processing can be performed to configure one or more LUNs, or more generally storage objects or resources, for asynchronous remote replication from a source R1 system to a destination R2 system. A LUN on the R1 source system configured for asynchronous remote replication can denote a source R1 LUN or device on the R1 system configured to have a corresponding remote counterpart R2 LUN or device on the R2 system. In at least one embodiment, both the R1 and R2 LUNs of such a configured LUN pair can be further configured to have the same identity and characteristics to an external host or other storage client. From the step 1302, control proceeds to the step 1304.

At the step 1304, write I/O operations or requests are received at the R1 system. The writes can be directed to the R1 LUN of the R1 system. More generally, the received writes can also include writes directed to any LUN configured on the R1 system where the LUN may or may not be configured for asynchronous remote replication. From the step 1304, control proceeds to the step 1306.

At the step 1306, processing can be performed to create an entry in the replication queue for each of the received write I/O operations directed to an R1 LUN configured for asynchronous remote replication. The replication queue can be managed as a FIFO time ordered queue of entries based on time such as the time when replication queue entries are created and inserted into the replication queue. The time order can denote the logical sequence or order in which writes, or more generally the replication queue entries, can be applied. From the step 1306, control proceeds to the step 1308.

The R1 and R2 systems can be log based systems each maintaining a transaction log. As such, at the step 1308, for each of the write I/O operations or requests received at the R1 system, the step 1308 can include recording the write I/O operation as an entry in the transaction log. On the R1 system, the writes recorded as transaction log entries on the R1 system transaction log can be flushed or destaged in an ongoing manner from the transaction log to the BE PDs of the R1 system. Each of the flushed transaction log entries of the R1 system representing a write of write data or content to a logical address can include storing the write data or content at a physical storage location or PLB of the BE PDs and updating mapping information which maps the logical address to the PLB containing the write data or content. From the step 1308, control proceeds to the step 1310.

At the step 1310, replication processing can be performed in a continuous ongoing manner to replicate writes or changes (e.g., modified content) of the source R1 LUN of the R1 system to the R2 system. The R2 system can apply the received writes or changes to the remote counter R2 LUN of the R2 system.

Figure 14A:
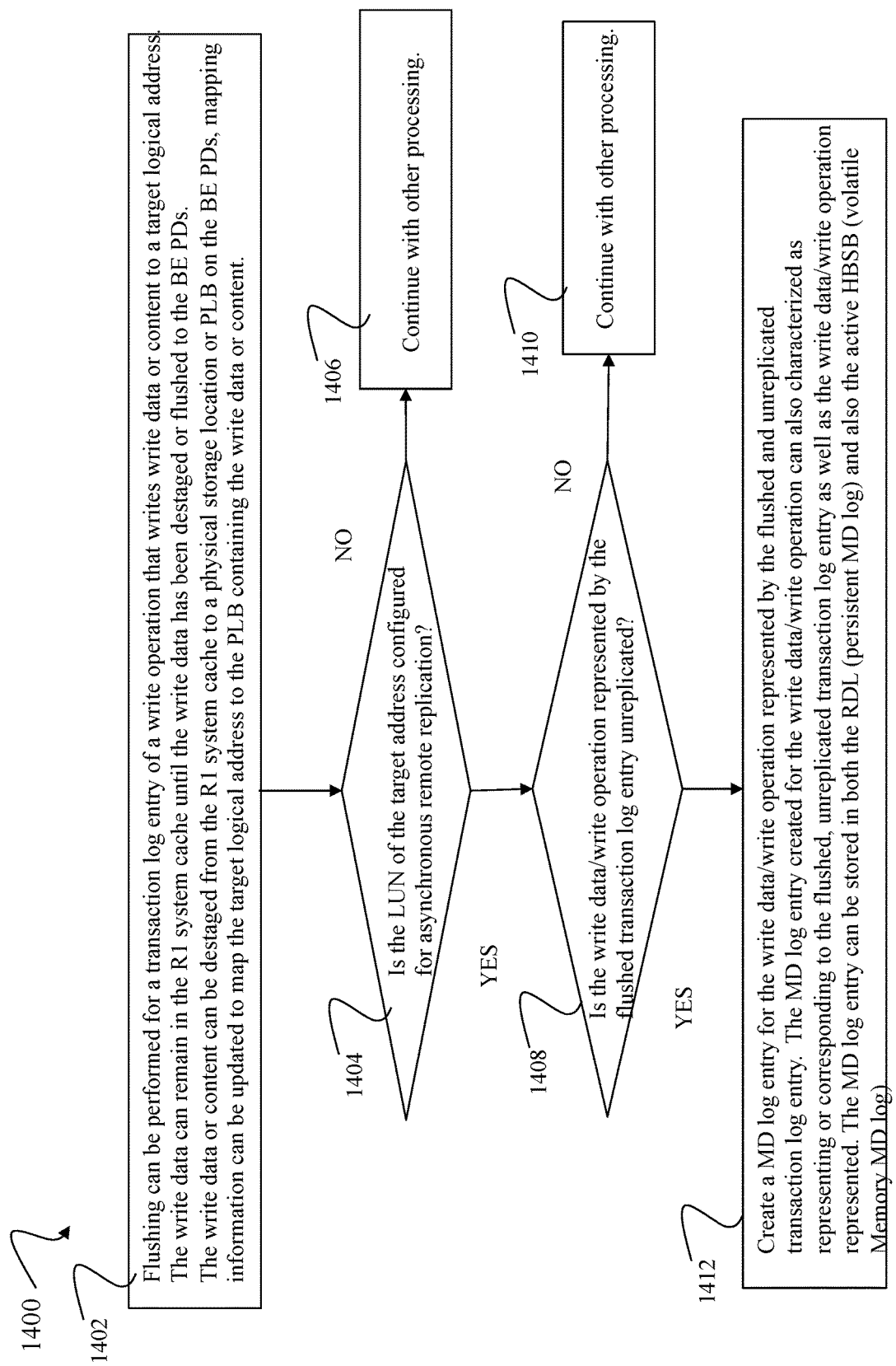

Referring to FIG. 14A, shown is another flowchart 1400 of processing steps that can be performed in at least one embodiment in accordance with the techniques of the present disclosure. The flowchart 1400 provides additional detail regarding processing that can be performed in connection with flushing entries for write operations from the transaction log in at least one embodiment.

At the step 1402, flushing can be performed for a transaction log entry of a write operation that writes write data or content to a target logical address. The write data can remain in the R1 system cache until the write data has been destaged or flushed to the BE PDs. The write data or content can be destaged from the R1 system cache to a physical storage location or PLB on the BE PDs, mapping information can be updated to map the target logical address to the PLB containing the write data or content. From the step 1402, control proceeds to the step 1404.

At the step 1404, a determination can be made as to whether the LUN of the target logical address of the write operation represented by the transaction log entry is configured for asynchronous remote replication. If the step 1404 evaluates to no, control proceeds to the step 1406 to continue with other processing. If the step 1404 evaluates to yes, control proceeds to the step 1408. At the step 1408, a determination can be made as to whether the write data/write operation represented by the transaction log entry being processed/flushed is unreplicated. If the step 1408 evaluates to no, control proceeds to the step 1410 to continue with other processing. If the step 1408 evaluates to yes, control proceeds to the step 1412.

At the step 1412, processing can be performed to create a MD log entry for the write data/write operation represented by the flushed and unreplicated transaction log entry. The MD log entry created for the write data/write operation can also characterized as representing or corresponding to the flushed, unreplicated transaction log entry as well as the write data/write operation represented.

Figure 14B:
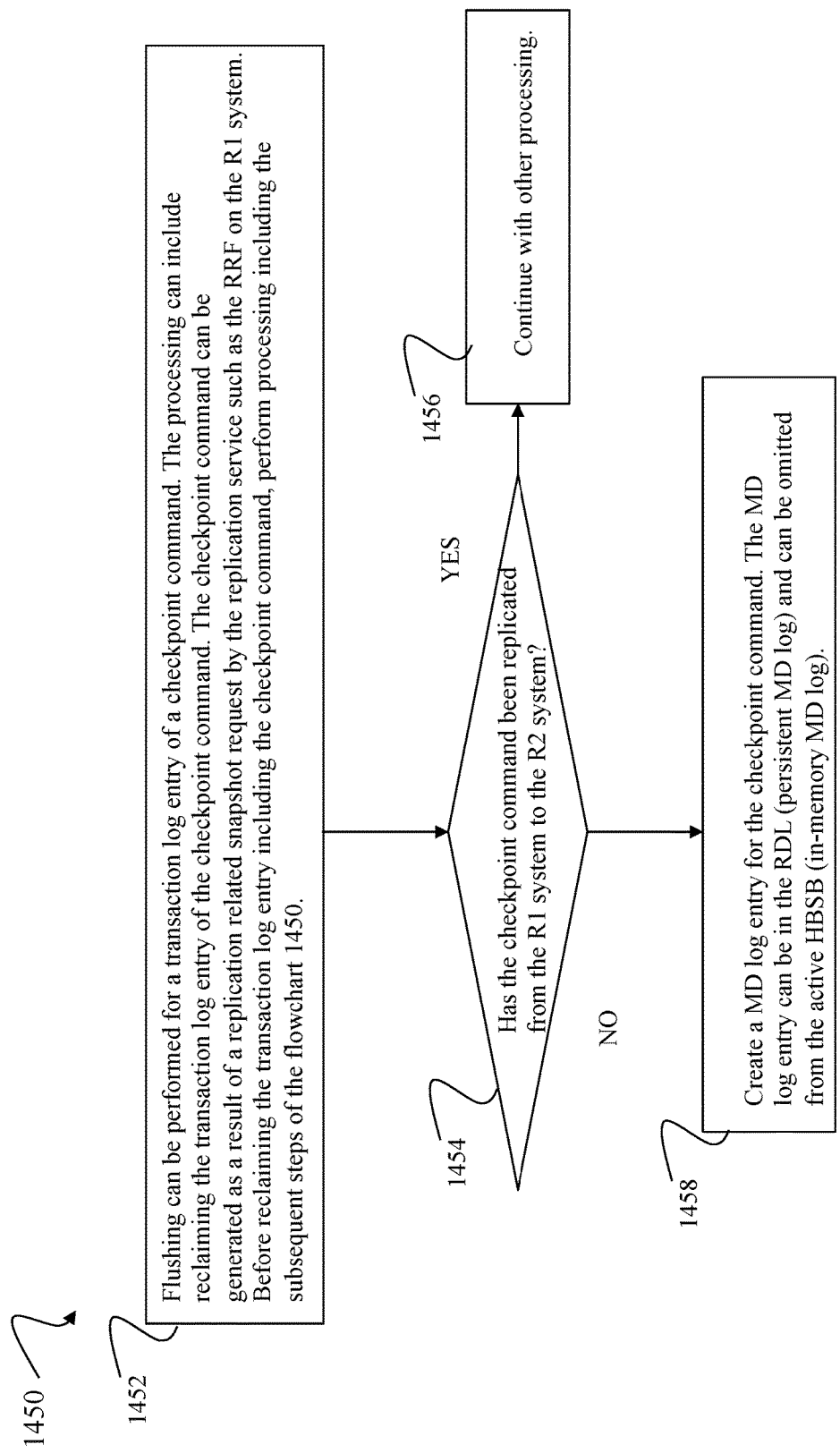

Referring to FIG. 14B, shown is another flowchart 1450 of processing steps that can be performed in at least one embodiment in accordance with the techniques of the present disclosure. The flowchart 1450 provides additional detail regarding processing that can be performed in connection with flushing entries that are checkpoint records from the transaction log in at least one embodiment.

At the step 1452, flushing can be performed for a transaction log entry of a checkpoint record. The processing can include reclaiming the transaction log entry of the checkpoint record. The checkpoint record can be generated as a result of a replication related snapshot request by the replication service such as the RRF on the R1 system. Before reclaiming the transaction log entry including the checkpoint record, perform processing including the subsequent steps of the flowchart 1450. From the step 1452, control proceeds to the step 1454.

At the step 1454, a determination can be made as to whether the checkpoint record of the transaction log being processed has already been replicated from the R1 system to the R2 system. If the step 1454 evaluates to yes, control proceeds to the step 1456 to continue with other processing. If the step 1454 evaluates to no, control proceeds to the step 1458. At the step 1458, processing can be performed to create a MD log entry for the checkpoint record or command. The MD log entry can be in the RDL (persistent MD log) and can be omitted from the active HBSH (in-memory MD log).

Figure 15A:
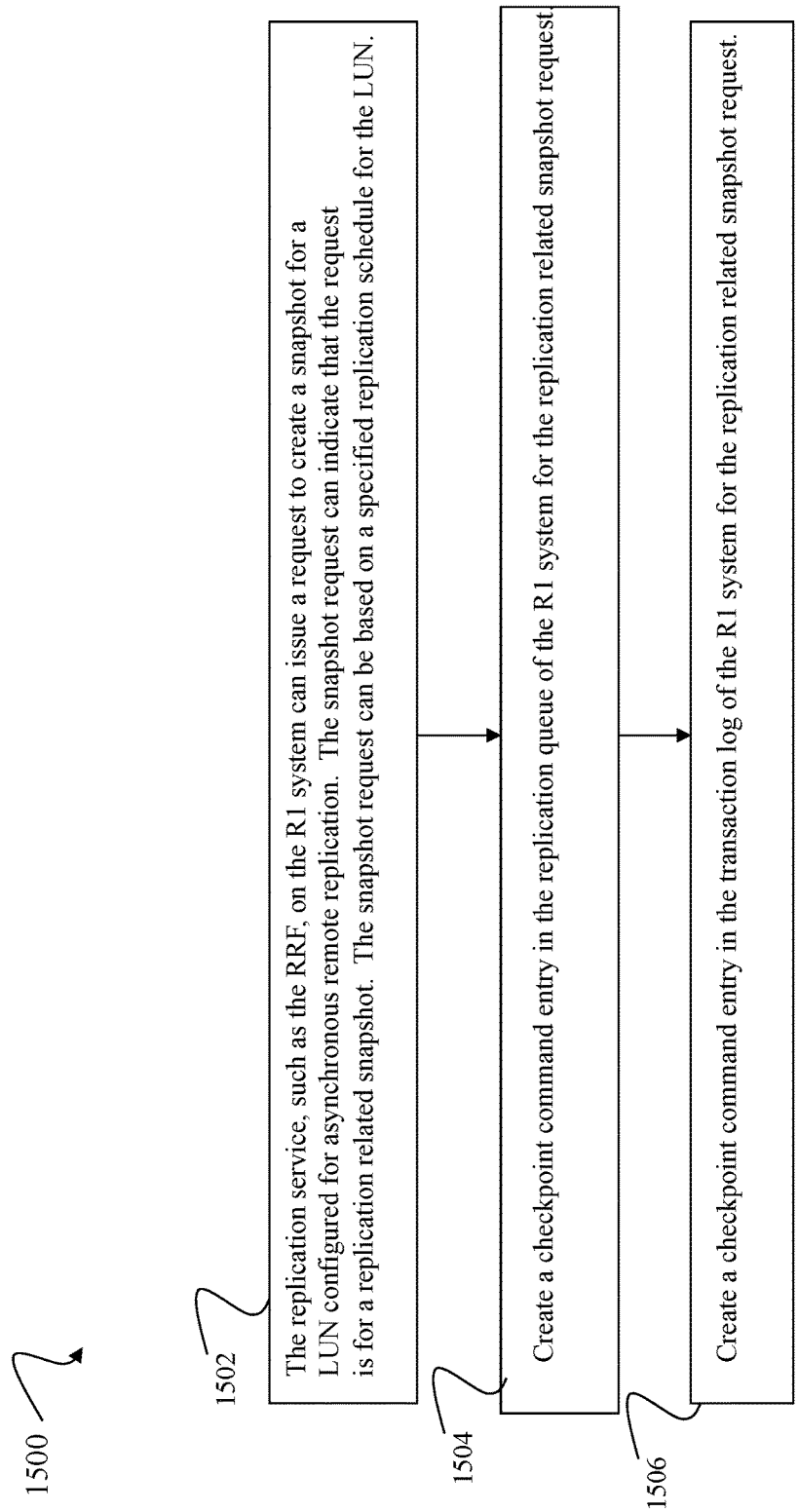

Referring to FIG. 15A, shown is another flowchart 1500 of processing steps that can be performed in at least one embodiment in accordance with the techniques of the present disclosure. The flowchart 1500 provides additional detail regarding replication processing that can be performed on the R1 system in at least one embodiment.

At the step 1502, the replication service, such as the RRF, on the R1 system can issue a request to create a snapshot for a LUN configured for asynchronous remote replication. The snapshot request can indicate that the request is for a replication related snapshot. The snapshot request can be based, for example, on a specified replication schedule for the LUN. From the step 1502, control proceeds to the step 1504.

At the step 1504, processing can be performed to create a checkpoint or barrier entry in the replication queue of the R1 system for the replication related snapshot request. From the step 1504, control proceeds to the step 1506.

At the step 1506, processing can be performed to create a checkpoint or barrier entry in the transaction log of the R1 system for the replication related snapshot request.

Figure 15B:
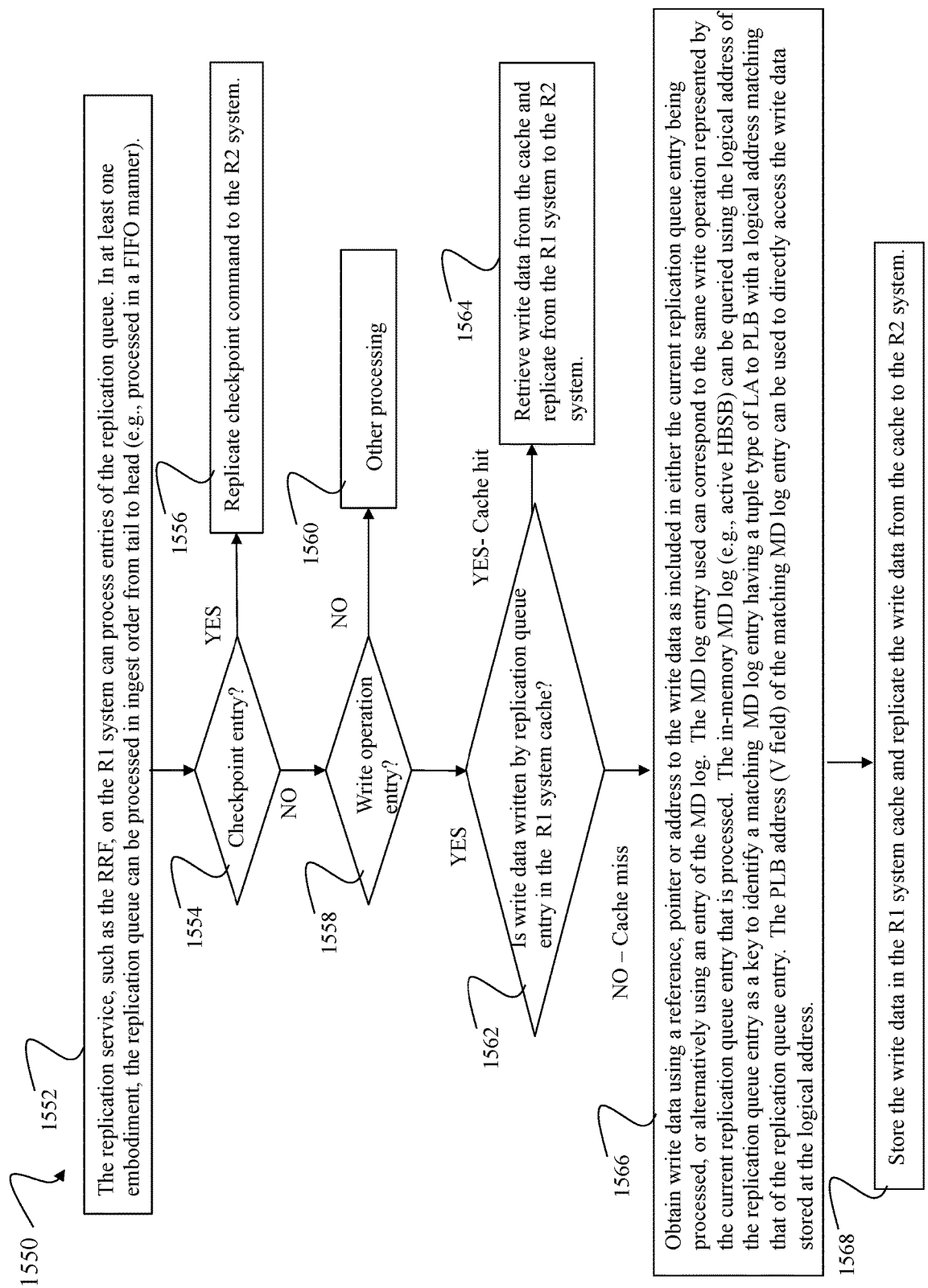

Referring to FIG. 15B, shown is another flowchart 1550 of processing steps that can be performed in at least one embodiment in accordance with the techniques of the present disclosure. The flowchart 1550 provides additional detail regarding replication processing that can be performed on the R1 system in at least one embodiment.

At the step 1552, the replication service, such as the RRF, on the R1 system can process entries of the replication queue and generally replicate write data and checkpoint records denoted by the replication queue entries from the R1 system to the R2 system. In at least one embodiment, the replication queue can be processed in ingest order from tail to head (e.g., processed in a FIFO manner). From the step 1552, control proceeds to the step 1554. The following steps of FIG. 15B provide detail regarding processing a single replication queue entry. More generally, the replication service can repeat such processing for other replication queue entries.

At the step 1554, a determination can be made as to whether the current replication queue entry being processed is a checkpoint entry. If the step 1554 evaluates to yes, control proceeds to the step 1556. At the step 1556, processing can be performed to replicate the checkpoint record from the R1 system to the R2 system If the step 1554 evaluates to no, control proceeds to the step 1558.

At the step 1558, a determination can be made as to whether the current replication queue entry represents a received, recorded write operation. If the step 1558 evaluates to no, control proceeds to the step 1560 where other processing can be performed. If the step 1558 evaluates to yes, control proceeds to the step 1562.

At the step 1562, a determination can be as to whether the write data or content written by the current replication queue entry is in the R1 system cache. If the step 1562 evaluates to yes indicating a cache hit, control proceeds to the step 1564. At the step 1564, processing can be performed to retrieve the write data from the R1 system cache and replicate the write data from the R1 system to the R2 system. Generally, when replicating the write data or modified content, additional information can also be replicated. For example, the additional information can include the target logical address at which the write data is stored on the R1 system.

If the step 1562 evaluates to no indicating a cache miss, control proceeds to the step 1566. At the step 1566, processing can be performed to obtain the write data or content written by the replication queue entry using a reference, pointer or address to the write data, The reference, pointer or address can be included in either the current replication queue entry being processed, or alternatively using an entry of the MD log. The MD log entry used can correspond to the same write operation represented by the current replication queue entry that is processed. The in-memory MD log (e.g., active HBSB) can be queried using the logical address of the replication queue entry as a key to identify a matching MD log entry having a tuple type of LA to PLB with a logical address matching that of the replication queue entry. The PLB address (V field) of the matching MD log entry can be used to directly access the write data stored at the logical address. From the step 1566, control proceeds to the step 1568.

At the step 1568, processing can be performed to store the retrieved write data in the R1 system cache and replicate the write data from the R1 system cache to the R2 system.

Based on the above-noted description, the techniques of the present disclosure in comparison to other existing methods provides for efficient asynchronous replication with a high RPO and minimal adverse impact to performance and complexity. In comparison to existing techniques using snapshots for asynchronous replication, overhead costs are reduced using the techniques of the present disclosure. Using the techniques of the present disclosure, processing costs associated with accessing data to be replicated can be reduced by avoiding use of chains of MD pages to access data for replication in instances, for example, where such data is not in the source system cache and needs to be read from the BE PDs. The techniques of the present disclosure can be used to sustain long replication link delays or failures as well as general system failures requiring restoration of the replication queue stored in volatile memory.

The techniques described in the present disclosure can be performed by any suitable hardware and/or software. For example, techniques herein can be performed by executing code which is stored on any one or more different forms of computer-readable media, where the code is executed by one or more processors, for example, such as processors of a computer or other system, an ASIC (application specific integrated circuit), and the like. Computer-readable media includes different forms of volatile (e.g., RAM) and non-volatile (e.g., ROM, flash memory, magnetic or optical disks, or tape) storage, where such storage includes be removable and non-removable storage media.

While the present disclosure provides various embodiments shown and described in detail, their modifications and improvements will become readily apparent to those skilled in the art. It is intended that the specification and examples be considered as exemplary only with the true scope and spirit of the present disclosure indicated by the following claims.

What is claimed is:

1. A computer-implemented method comprising:
   receiving, at a source system, a first write directed to a source logical device configured for asynchronous remote replication to a target logical device of a destination system;
   performing first processing on the source system that flushes a first transaction log entry of a transaction log of the source system, said first processing including:
      determining for the first transaction log entry, which represents the first write storing first content to a target logical address, that the first write is directed to the source logical device configured for asynchronous remote replication and that the first content has not been replicated from the source system to the destination system; and
   creating a first metadata (MD) log entry for the first write and the first content in a MD log of the source system, wherein the first MD log entry includes a reference to a first storage location of the first content, wherein the first MD log entry includes a first type indicating that the first MD log entry identifies a mapping between a logical address and a storage location including content stored at the logical address, wherein the MD log includes entries corresponding to other entries of the transaction log which have been flushed from the transaction log and which represent content and checkpoint commands that have not been replicated from the source system to the destination system; and
   performing replication processing that uses a replication queue including a first replication queue entry corresponding to the first write that stores the first content to the target logical address, the replication processing including:
      determining, for the first replication queue entry, that the first content written to the target logical address is not in a cache of the source system thereby resulting in a cache miss;
      responsive to the cache miss, retrieving the first content from the first storage location using the reference to the first storage location, wherein the reference to the first storage location is obtained from the first MD log entry or the first replication queue entry corresponding to the first write; and
      replicating the first content stored at the target logical address by the first written operation from the source system to the destination system.

2. The computer-implemented method of claim 1, wherein the transaction log includes a second transaction log entry for a first checkpoint command.

3. The computer-implemented method of claim 2, further comprising:
   issuing, by a replication service of the source system, a request to create a snapshot for the source logical device configured for asynchronous remote replication; and
   responsive to said issuing, creating the second transaction log entry in the transaction log and creating a second replication queue entry in the replication queue for the first checkpoint command.

4. The computer-implemented method of claim 2, further comprising:
   performing second processing on the source system that flushes the second transaction log entry, said second processing including:
      determining the first checkpoint command of the second transaction log entry has not been replicated from the source system to the destination system; and
      creating a second MD log entry for the first checkpoint command in the MD log.

5. The computer-implemented method of claim 4, further comprising:
   replicating, in accordance with the second replication queue entry, the first checkpoint command from the source system to the target system.

6. The computer-implemented method of claim 1, wherein said replication processing further comprises:
   replicating a first checkpoint command and a second checkpoint command from the source system to the destination system;
   replicating a plurality of writes from the source system to the destination system, wherein each of the plurality of writes is included between the first checkpoint command and the second checkpoint command, and wherein the second plurality of writes are directed to the source logical device; and
   creating, on the destination system in accordance with the first checkpoint command and the second checkpoint command, a first snapshot of the target logical device on the destination system, wherein the first snapshot includes the plurality of writes.

7. The computer-implemented method of claim 1, wherein the replication queue is stored in volatile memory of the source system, the MD log includes a first MD log persistently stored on the source system, and the transaction log is persistently stored on the source system.

8. The computer-implemented method of claim 7, further comprising:
   performing restoration processing that restores the replication queue using the MD log and the transaction log.

9. The computer-implemented method of claim 8, wherein said restoration processing that restores the replication queue further comprises:
   identifying a plurality of unreplicated transaction log entries, wherein the plurality of unreplicated transaction log entries includes at least one entry of the transaction log for a write operation that writes content which has not been replicated from the source system to the target system, and wherein the plurality of unreplicated transaction log entries includes at least one entry of the transaction log for a checkpoint operation or command corresponding to a snapshot creation command in accordance with a replication schedule; and
   constructing the replication queue which includes the plurality of unreplicated transaction log entries and one or more entries from the MD log, wherein the one or more entries of the MD log each denote a flushed entry of the transaction log which has also not been replicated from the source system to the target system.

10. The computer-implemented method of claim 9, where the restoration processing further comprises:
   sorting, based on a time order, the plurality of the unreplicated transaction log entries and the one or more entries of the MD log.

11. The computer-implemented method of claim 10, wherein the time order indicates a relative logical ordering in which to process entries of the replication queue.

12. The computer-implemented method of claim 11, wherein the restoration processing is performed responsive to rebooting the source system.

13. The computer-implemented method of claim 11, wherein the restoration processing is included in recovery processing, and wherein the recovery processing is performed on the source system responsive to an event causing the source system to become unavailable or go offline.

14. The computer-implemented method of claim 1, further comprising:
   receiving a plurality of writes at the source system, wherein each of the plurality of writes is directed to a logical device of the source system configured for asynchronous remote replication;
   creating a plurality of replication queue entries in the replication queue of the source system for the plurality of write operations; and
   creating a plurality of transaction log entries in the transaction log of the source system for the plurality of write operations.

15. The computer-implemented method of claim 1, wherein the MD log includes a second MD log entry for a first checkpoint command which has been flushed from the transaction log and which has not been replicated from the source system to the destination system, and wherein the second MD log entry includes a second type indicating that the second MD log entry represents a checkpoint command.

16. A system comprising:
   one or more processors; and
   a memory comprising code stored thereon that, when executed, performs a method comprising:
      receiving, at a source system, a first write directed to a source logical device configured for asynchronous remote replication to a target logical device of a destination system;
      performing first processing on the source system that flushes a first transaction log entry of a transaction log of the source system, said first processing including:
         determining for the first transaction log entry, which represents the first write storing first content to a target logical address, that the first write is directed to the source logical device configured for asynchronous remote replication and that the first content has not been replicated from the source system to the destination system; and
         creating a first metadata (MD) log entry for the first write and the first content in a MD log of the source system, wherein the first MD log entry includes a reference to a first storage location of the first content, wherein the first MD log entry includes a first type indicating that the first MD log entry identifies a mapping between a logical address and a storage location including content stored at the logical address, wherein the MD log includes entries corresponding to other entries of the transaction log which have been flushed from the transaction log and which represent content and checkpoint commands that have not been replicated from the source system to the destination system; and
      performing replication processing that uses a replication queue including a first replication queue entry corresponding to the first write that stores the first content to the target logical address, the replication processing including:
         determining, for the first replication queue entry, that the first content written to the target logical address is not in a cache of the source system thereby resulting in a cache miss;
         responsive to the cache miss, retrieving the first content from the first storage location using the reference to the first storage location, wherein the reference to the first storage location is obtained from the first MD log entry or the first replication queue entry corresponding to the first write; and
         replicating the first content stored at the target logical address by the first written operation from the source system to the destination system.

17. A non-transitory computer readable medium comprising code stored thereon that, when executed, performs a method comprising:
- receiving, at a source system, a first write directed to a source logical device configured for asynchronous remote replication to a target logical device of a destination system;
- performing first processing on the source system that flushes a first transaction log entry of a transaction log of the source system, said first processing including:
  - determining for the first transaction log entry, which represents the first write storing first content to a target logical address, that the first write is directed to the source logical device configured for asynchronous remote replication and that the first content has not been replicated from the source system to the destination system; and
  - creating a first metadata (MD) log entry for the first write and the first content in a MD log of the source system, wherein the first MD log entry includes a reference to a first storage location of the first content, wherein the first MD log entry includes a first type indicating that the first MD log entry identifies a mapping between a logical address and a storage location including content stored at the logical address, wherein the MD log includes entries corresponding to other entries of the transaction log which have been flushed from the transaction log and which represent content and checkpoint commands that have not been replicated from the source system to the destination system; and
- performing replication processing that uses a replication queue including a first replication queue entry corresponding to the first write that stores the first content to the target logical address, the replication processing including:
  - determining, for the first replication queue entry, that the first content written to the target logical address is not in a cache of the source system thereby resulting in a cache miss;
  - responsive to the cache miss, retrieving the first content from the first storage location using the reference to the first storage location, wherein the reference to the first storage location is obtained from the first MD log entry or the first replication queue entry corresponding to the first write; and
  - replicating the first content stored at the target logical address by the first written operation from the source system to the destination system.

18. The non-transitory computer readable medium of claim 17, wherein the transaction log includes a second transaction log entry for a first checkpoint command.

19. The non-transitory computer readable medium of claim 18, wherein the method further comprises:
- issuing, by a replication service of the source system, a request to create a snapshot for the source logical device configured for asynchronous remote replication; and
- responsive to said issuing, creating the second transaction log entry in the transaction log and creating a second replication queue entry in the replication queue for the first checkpoint command.

* * * * *

UNITED STATES PATENT AND TRADEMARK OFFICE
CERTIFICATE OF CORRECTION

| | | |
|---|---|---|
| PATENT NO. | : 12,204,412 B2 | Page 1 of 1 |
| APPLICATION NO. | : 18/095159 | |
| DATED | : January 10, 2023 | |
| INVENTOR(S) | : Shveidel et al. | |

It is certified that error appears in the above-identified patent and that said Letters Patent is hereby corrected as shown below:

On the Title Page

Item (57) ABSTRACT:
The abstract "obtained from the MID log entry or the replication queue" should read -- obtained from the MD log entry or the replication queue --

Signed and Sealed this
Eighteenth Day of February, 2025

Coke Morgan Stewart
*Acting Director of the United States Patent and Trademark Office*